US008665504B2

(12) United States Patent
Awatsuji et al.

(10) Patent No.: US 8,665,504 B2
(45) Date of Patent: Mar. 4, 2014

(54) DIGITAL HOLOGRAPHY DEVICE AND PHASE PLATE ARRAY

(75) Inventors: Yasuhiro Awatsuji, Kyoto (JP); Atsushi Kaneko, Kyoto (JP); Takamasa Koyama, Kyoto (JP); Tatsuki Tahara, Kyoto (JP); Takeshi Wakamatsu, Kyoto (JP)

(73) Assignee: National University Corporation Kyoto Institute of Technology, Kyoto (JP)

( * ) Notice: Subject to any disclaimer, the term of this patent is extended or adjusted under 35 U.S.C. 154(b) by 701 days.

(21) Appl. No.: 12/734,743

(22) PCT Filed: Nov. 21, 2008

(86) PCT No.: PCT/JP2008/071246
§ 371 (c)(1),
(2), (4) Date: Jun. 15, 2010

(87) PCT Pub. No.: WO2009/066771
PCT Pub. Date: May 28, 2009

(65) Prior Publication Data
US 2010/0253986 A1    Oct. 7, 2010

(30) Foreign Application Priority Data

Nov. 22, 2007  (JP) ................................. 2007-303127
Feb. 13, 2008  (JP) ................................. 2008-031965

(51) Int. Cl.
G03H 1/12 (2006.01)
(52) U.S. Cl.
USPC ........................................... 359/11; 359/489
(58) Field of Classification Search
None
See application file for complete search history.

(56) References Cited

U.S. PATENT DOCUMENTS

| 6,246,495 B1 | 6/2001 | Yamaguchi |
| 6,249,349 B1 * | 6/2001 | Lauer ............................. 356/450 |
| 6,281,993 B1 * | 8/2001 | Bernal et al. ..................... 359/29 |
| 2006/0193235 A1 | 8/2006 | Murata et al. |

FOREIGN PATENT DOCUMENTS

| JP | 3471556 | 9/2003 |
| JP | 2005-283683 | 10/2005 |
| JP | 2006-098705 | 4/2006 |

OTHER PUBLICATIONS

Yasuhiro Awatsuji et al (Aug. 9, 2004/vol. 85, No. 6/Applied Physics Letters, pp. 1069-1071).*
Yasuhiro Awatsuji, et al., "Single-Shot Phase-Shifting Color Digital Holography," IEEE, Oct. 1, 2007, pp. 84-85.

(Continued)

Primary Examiner — Stephone B Allen
Assistant Examiner — Jyotsna Dabbi
(74) Attorney, Agent, or Firm — Harness, Dickey & Pierce, P.L.C.

(57) ABSTRACT

A digital holography device includes a light source that emits light, the light source being provided for supply of object light beams formed by radiation, transmission, scattering, reflection, or diffraction of the emitted light from a subject, an array device that splits the light emitted from the light source into two kinds of reference light beams having different phases in a plane perpendicular to a direction in which the light emitted from the light source travels, a CCD camera having an image-capturing plane on which two kinds of interference fringe patterns are recorded, the interference fringe patterns being formed by interferences between the two kinds of reference light beams, and the object light beams, and an image reconstruction device that generates a reconstructed image of the subject from the two kinds of interference fringe patterns recorded on the image-capturing plane.

10 Claims, 48 Drawing Sheets

(56) References Cited

OTHER PUBLICATIONS

European Search Report for corresponding European Application No. 08851644.8.

Yasuhiro Awatsuji et al., "Parallel three-step phase-shifting digital holography," May 1, 2006/vol. 45, No. 13/Applied Optics, pp. 2995-3002.

Takanori Nomura et al., "Phase-shifting digital holography with a phase difference between orthogonal polarizations," Jul. 10, 2006/vol. 45, No. 20/Applied Optics, pp. 4873-4877.

X.F. Meng et al., "Two-step phase shifting interferometry and its application in image encryption," Optics Letters/vol. 31, No. 10/May 15, 2006, pp. 1414-1416.

Yan Zhang et al., "Reconstruction of in-line digital holograms from two intensity measurements," Aug. 1, 2004/vol. 29, No. 15.Optics Letters, pp. 1787-1789.

Daniel Parshall et al., "Digital holographic microscopy with dual-wavelength phase unwrapping," Jan. 20, 2006/vol. 45, No. 3/Applied Optics, pp. 451-459.

International Search Report dated Feb. 24, 2009.

Awatsuji, Y. et al., "Parallel quasi-phase shifting digital holography," Applied Physics Letters, vol. 85, No. 6, pp. 1069-1071, Aug. 9, 2004.

"In-line phase-shifting digital holography," Aug. 4, 2003. (partial translation).

Chinese Office Action and English translation thereof dated Jan. 31, 2013.

Japanese Office Action and English translation thereof dated Mar. 5, 2013.

\* cited by examiner

Correlation Coefficient Values

|  | Amplitude Distribution | Phase Distribution |
|---|---|---|
| Conventional Method | 0.991722 | 0.999676 |
| Present Invention | 0.996347 | 0.999800 |

Graph Of Correlation Coefficient Values

Two Interference Fringe Patterns Obtained
At Different Distances For Reconstruction Amount Of Phase Shift: 0

Amount Of Phase Shift: π/2

Amount Of Phase Shift: π

Amount Of Phase Shift: 3π/2

Complex Amplitude Distribution
Found By Phase Shift Calculation

Amount Of Phase Shift: 0

Amount Of Phase Shift: $\pi/2$

Complex Amplitude Distribution
Found By Phase Shift Calculation

Amount Of Phase Shift: $\pi$

Amount Of Phase Shift: $3\pi/2$

Wavelength Plate Array

Polarizer

1/4 Wavelength Plate Array

DIGITAL HOLOGRAPHY DEVICE AND PHASE PLATE ARRAY

TECHNICAL FIELD

The present invention relates to: a digital holography device that generates a reconstructed image of a subject according to interference fringes formed by interferences between object light beams and reference light beams; and a phase plate array used in the digital holography device.

BACKGROUND ART

Hereinafter, phases and angles are expressed in radians. The inventors of the present application have suggested a digital holography device including a phase-shifting array element that splits incoming light into four kinds of reference light beams with mutually different phases and emits the reference light beams (Patent Literature 1). FIG. 23 is an explanatory diagram showing the configuration of a conventional digital holography device 101. The digital holography device 101 includes a light source 104 that emits laser light. The laser light emitted from the light source 104 is split into laser light beams by a beam splitter BS. One of the separate laser light beams is reflected from a mirror M. The reflected laser light beam passes through a beam expander BE and is collimated by a collimator lens CL. The collimated light beam is projected to a subject 106 and reflected from the subject 106 to turn into object light beams. The object light beams pass through another beam splitter BS and then enter an image-capturing plane 100 provided in a CCD camera 103.

The other of the separate laser light beams into which the laser light has been split by the beam splitter BS is reflected from another mirror M. The reflected light beam passes through another beam expander BE and is collimated by another collimator lens CL. The collimated light beam is directed into an array device 102.

The array device 102 has four kinds of regions 107a, 107b, 107c, and 107d all of which are arranged in a checkerboard pattern in a plane perpendicular to a direction from which the laser light is directed into the array device 102. The four kinds of regions 107a, 107b, 107c, and 107d are arranged to respectively correspond to pixels of the CCD camera 103. The laser light beam having passed through the region 107a of the array device 102 becomes a reference light beam having a phase that serves as a reference phase for phase shift measuring means. The laser light beam having passed through the region 107b is converted into a reference light beam that is phase-shifted by $-\pi$ relative to the phase of the reference light beam passing through the region 107a. The laser light beam having passed through the region 107c is converted into a reference light beam that is phase-shifted by $-\pi/2$ relative to the phase of the reference light beam passing through the region 107a. The laser light beam having passed through the region 107d is converted into a reference light beam that is phase-shifted by $-3\pi/2$ relative to the phase of the reference light beam passing through the region 107a.

The four types of reference light beams generated by the array device 102 are reflected from still another mirror M. The reflected light beams pass through an imaging optical system, are reflected from another beam splitter BS, and then enter the image-capturing plane 100 provided in the CCD camera 103.

On the image-capturing plane 100 are recorded the four kinds of interference fringe patterns formed by interferences between the four kinds of reference light beams and the object light beams. An image reconstruction device 105 generates a reconstructed image of a subject 106 in accordance with the four kinds of interference fringe patterns recorded on the image-capturing plane 100.

Further, the technique of a single-shot phase-shifting digital holography by polarization wavefront segmentation is known (Non-Patent Literature 2). This arrangement uses a polarization imaging camera to concurrently record two interference fringe patterns whose phases are different from a phase of an object light beam on an image-capturing plane of the polarization imaging camera. Therefore, it is possible to obtain complex amplitude distribution of a stationary subject at one recording. However, it is impossible to obtain complex amplitude distribution of a moving subject since intensity distribution of the object light beam needs to be obtained each time the subject moves. Further, as compared with the arrangement shown in FIG. 23, this arrangement eliminates the need for the imaging optical system and eliminates the need for setting the optical system by micrometers. Moreover, the array device 102 is not used, causing no dependence upon wavelengths.

A phase distribution obtained by digital holography is folded into a range of $-\pi < \phi \leq \pi$. To get it back to the original phase distribution, it is necessary to perform phase unwrapping. As methods for the phase unwrapping, the followings have been suggested.

First, dual-wavelength phase unwrapping (Non-Patent Literature 5) is known. According to this method, it is possible to change a length of a synthetic wavelength to a desired length by virtue of a combination of two wavelengths. In addition, as compared with a single-wavelength phase unwrapping method, it is possible to obtain a phase distribution that is equal to a phase distribution obtained by recording with an extremely long synthetic wavelength, and a phase folding is small.

Further, the technique of parallel phase-shifting digital holography is known. This technique requires only one exposure for recording by virtue of spatial segmentation multiplexing, although other normal digital holography requires a plurality of shots for recording. Moreover, since a reconstructed image of the subject can be obtained instantaneously, the subject may be a moving object.

Patent Literature 1
Japanese Patent Application Publication, Tokukai, No. 2005-283683 A (Publication Date: Oct. 13, 2005) Non-Patent Literature 1
Yasuhiro Awatsuji et al., "Parallel three-step phase-shifting digital holography", 1 Mat 2006/Vol. 45, No. 13/APPLIED OPTICS, pp. 2995-3002
Non-Patent Literature 2
Takanori Nomura et al., "Phase-shifting digital holography with a phase difference between orthogonal polarizations", 10 Jul. 2006/Vol. 45, No. 20/APPLIED OPTICS, pp. 4873-4877
Non-Patent Literature 3
X. F. Meng et al., "Two-step phase-shifting interferometry and its application in image encryption", OPTICS LETTERS/Vol. 31, No. 10/May 15, 2006, pp. 1414-1416
Non-Patent Literature 4
Yan Zhang et al., "Reconstruction of in-line digital holograms from two intensity measurements", Aug. 1, 2004/Vol. 29, No. 15/OPTICS LETTERS, pp. 1787-1789
Non-Patent Literature 5
Daniel Parshall et al., "Digital holographic microscopy with dual-wavelength phase unwrapping", 20 Jan. 2006/Vol. 45, No. 3/APPLIED OPTICS, pp. 451-459

SUMMARY OF INVENTION

However, as for the arrangement shown in FIG. 23, there is a strong demand for improvement in quality of a reconstructed image of a subject.

Also, the arrangement shown in FIG. 23 requires an imaging optical system, resulting in the problem caused by aberration. In addition, diffraction occurs due to a phase-shifting array device. This requires the setting of the optical system in micrometers, resulting in the difficulty in alignment of the array device. Moreover, the phase-shifting array device has a dependence upon wavelength, resulting in the problem that the phase-shifting array device is used only at a particular wavelength.

The above-described single-shot phase-shifting digital holography based on polarization wavefront segmentation, requires the special camera and also depends on polarization characteristics and wavelength.

The above-described dual-wavelength phase unwrapping method uses two wavelengths. This requires two or more exposures.

An object of the present invention is to provide a digital holography device that realizes improvement in image quality.

A digital holography device according to the present invention comprises: a light source that emits light, the light source being provided for supply of object light beams formed by radiation, transmission, scattering, reflection, or diffraction from a subject according to the emitted light; a phase-shifting element that splits the light emitted from the light source into two kinds of reference light beams having different phases in a plane perpendicular to a direction in which the light emitted from the light source travels; image-capturing means having an image-capturing plane on which two kinds of interference fringe patterns are recorded, the interference fringe patterns being formed by interferences between the two kinds of reference light beams and the object light beams; and an image reconstruction device that generates a reconstructed image of the subject according to the two kinds of interference fringe patterns recorded on the image-capturing plane.

According to this feature, the phase-shifting element splits the light emitted from the light source into two kinds of reference light beams having different phases in a plane perpendicular to a direction in which the light emitted from the light source travels. With this arrangement, the number of phase shifting steps can be reduced to two steps from four steps in the conventional arrangement. Therefore, it is possible to realize a better quality of a reconstructed image of the subject than that of a reconstructed image obtained by a digital holography device in the conventional arrangement. Moreover, the phase-shifting element becomes easier to manufacture than a phase-shifting element for the conventional digital holography device.

The digital holography device according to the present invention is preferably such that the phase-shifting element is an array device that has two kinds of regions arranged in a checkerboard pattern in the plane perpendicular to the direction in which the light emitted from the light source travels.

According to the above arrangement, the phase-shifting element that splits the light emitted from the light source into two kinds of reference light beams having different phases in the plane perpendicular to the direction in which the light emitted from the light source travels can be realized by a simple configuration.

The digital holography device according to the present invention is preferably such that the image-capturing means is a CCD camera or a CMOS image sensor camera, and the two kinds of regions are arranged to respectively correspond to pixels of the image-capturing means.

According to the above arrangement, the two kinds of interference fringe patterns formed by interferences between the two kinds of reference light beams into which the light is split by the phase-shifting element and the object light beams formed by radiation, transmission, scattering, reflection, or diffraction from a subject can be recorded with a simple configuration.

The digital holography device according to the present invention is preferably such that the phase-shifting element splits the light into a first reference light beam having a phase that serves as a reference phase for phase shift measuring means and a second reference light beam that is out of phase with the first reference light beam in an amount of more than 0 and less than or equal to $\pi$ radians.

According to the above arrangement, it is possible to realize a parallel two-step phase-shifting digital holography device with a simple configuration.

The digital holography device according to the present invention is preferably such that the light source emits light polarized in a first direction, one of the two kinds of reference light beams is polarized in a second direction, and the other reference light beam is polarized in a third direction, the digital holography device further comprises a polarizer array device that transmits the object light beams and the two kinds of reference light beams, and the polarizer array device has: first regions that each transmits the one reference light beam polarized in the second direction and a component of the object light beam which component is orthogonally projected in the second direction; and second regions that each transmits the other reference light beam polarized in the third direction and a component of the object light beam which component is orthogonally projected in the third direction. The polarizer array device is a device having polarizers in an array.

The digital holography device according to the present invention is preferably such that the polarizer array device is integral with the image-capturing means.

The digital holography device according to the present invention is preferably such that the phase-shifting element is a ¼ wavelength plate.

The digital holography device according to the present invention is preferably such that the light source emits linearly polarized light having first-direction polarized components and second-direction polarized components, the digital holography device further comprises a polarization beam splitter that converts the object light beam into light beams having the first-direction polarized components, and converts the light emitted from the light source into light beams having the second-direction polarized components, and the phase-shifting element has: a wavelength-plate optical-medium array device that splits the light beams having the second-direction polarized components into two kinds of reference light beams having different phases in a plane perpendicular to a direction in which the light beams having the second-direction polarized components travel; and a polarizer that transmits third-direction polarized light components of the object light beams and third-direction polarized light components of the two kinds of reference light beams. The wavelength-plate optical-medium array device is a device having wavelength plates and optical media arranged alternately.

The digital holography device according to the present invention is preferably such that the phase-shifting element is integral with the image-capturing means.

The digital holography device according to the present invention is preferably such that the wavelength-plate optical-medium array device has: optical media that transmit the light beams having the second-direction polarized components; and ¼ wavelength plates that shift phases of the light beams having the second-direction polarized components and transmit the light beams thus phase-shifted.

Another digital holography device according to the present invention comprises: a light source that emits light beams, the light source being provided for supply of an object light beam formed by radiation, transmission, scattering, reflection, or diffraction of the light emitted from the light source from a subject; a differential optical path generating element that generates first optical-path object light beams and second optical-path object light beams, which are different in differential optical path from each other, according to the object light beams, and generates first optical-path reference light beams and second optical-path reference light beams, which are different in differential optical path from each other, according to the light beams emitted from the light source; image-capturing means having an image-capturing plane on which first and second interference fringe patterns are recorded, the first interference fringe pattern being formed by interferences between the first optical-path object light beams and the first optical-path reference light beams, both of which have been generated by the differential optical path generating element, the second interference fringe pattern being formed by interferences between the second optical-path object light beams and the second optical-path reference light beams, both of which have been generated by the differential optical path generating element; and an image reconstruction device that generates a reconstructed image of the subject according to the first and second interference fringe patterns recorded on the image-capturing plane.

According to this feature, the differential optical path generating element generates first optical-path object light beams and second optical-path object light beams, which are different in differential optical path from each other, according to the object light beam, and generates first optical-path reference light beams and second optical-path reference light beams, which are different in differential optical path from each other, according to the light beams emitted from the light source. With this arrangement, it is possible to concurrently obtain first and second interference fringe patterns formed with different differential optical paths by single image-capturing means. Therefore, it is possible to provide a digital holography device that realizes instantaneous recording of a three-dimensional image.

Another digital holography device according to the present invention is preferably such that the differential optical path generating element has two kinds of regions arranged in a checkerboard pattern in a plane perpendicular to a direction in which the object light beams and the light beams emitted from the light source travels.

According to the above arrangement, the two kinds of regions enable the object light beams and the light emitted from the light source to be provided with differential optical paths.

Another digital holography device according to the present invention is preferably such that the image-capturing means is a CCD camera or a CMOS image sensor camera, one of the two kinds of regions generates the first optical-path object light beam and the first optical-path reference light beam according to the object light beam and the light beam emitted from the light source, respectively, and the other of the two kinds of regions generates the second optical-path object light beam and the second optical-path reference light beam according to the object light beam and the light beam emitted from the light source, respectively.

According to the above arrangement, the two kinds of regions enable obtaining of interference fringe patterns with different differential optical paths.

Another digital holography device according to the present invention is preferably such that the array device is formed of an optical medium having an equal refractive index with respect to the object light beam and the reference light beam, and the one of the two kinds of regions is different in thickness from the other of the two kinds of regions.

According to the above arrangement, it is possible to easily realize the array device having the two kinds of regions for obtaining interference fringe patterns with different differential optical paths.

Another digital holography device according to the present invention is preferably such that the array device is formed of a first optical medium having a first refractive index with respect to the incoming object light beam and reference light beam and a second optical medium having a second refractive index with respect to the incoming object light beam and reference light beam, the first refractive index is different from the second refractive index, and the first optical medium is equal in thickness to the second optical medium.

According to the above arrangement, it is possible to easily realize the array device having the two kinds of regions for obtaining interference fringe patterns with different differential optical paths.

Yet another digital holography device according to the present invention comprises: a light source unit that emits light beams having first-direction polarized components, the light source unit being provided for supply of object light beams formed by radiation, transmission, scattering, reflection, or diffraction from a subject according to the emitted light; a phase-shifting element having: first regions that shifts phases of the object light beams and the light beams having the first-direction polarized components emitted from the light source unit, and transmit both of the light beams thus phase-shifted; and second regions that transmit the object light beams and the light beams having the first-direction polarized components emitted from the light source unit; image-capturing means having an image-capturing plane on which first and second interference fringe patterns are recorded, the first interference fringe pattern being formed by interferences between the object light beams and the light beams both of which have been phase-shifted and passed through the first regions, the second interference fringe pattern being formed by interferences between the object light beams and the light beams both of which have passed through the second regions; and an image reconstruction device that generates a reconstructed image of the subject according to the first and second interference fringe patterns recorded on the image-capturing plane.

Another digital holography device according to the present invention is preferably such that the first regions of the phase-shifting element each comprises a ½ wavelength plate, and the second regions thereof each comprises glass, and the phase-shifting element is realized by the first and second regions arranged in a checkerboard pattern.

Another digital holography device according to the present invention is preferably such that the phase-shifting element is integral with the image-capturing means.

Still another digital holography device according to the present invention comprises: a light source unit that emits light beams having first-direction polarized components, the light source unit being provided for supply of object light beams formed by radiation, transmission, scattering, reflection, or diffraction from a subject according to the emitted light beams; extracting means that extracts reference light beams from the light beams emitted from the light source; a polarizer array device having first polarizers and second polarizers arranged alternately, each of the first polarizers being inclined +45 degrees relative to the first direction, each of the second polarizers being inclined −45 degrees with respect to the first direction; a phase-shifting element having a fast axis inclined +45 degrees relative to the first direction and a slow axis inclined −45 degrees with respect to the first direction; image-capturing means having an image-capturing plane on which first and second interference fringe patterns are recorded, the first interference fringe pattern being formed by interferences between the object light beams and the reference light beams both of which have passed through the first polarizers, the second interference fringe pattern being formed by interferences between the object light beams and the reference light beams both of which have passed through the second polarizers; and an image reconstruction device that generates a reconstructed image of the subject according to the first and second interference fringe patterns recorded on the image-capturing plane.

The still another digital holography device according to the present invention is preferably such that the phase-shifting element is a ½ wavelength plate.

The still another digital holography device according to the present invention is preferably such that the polarizer array device and the phase-shifting element are integral with the image-capturing means.

Another digital holography device according to the present invention comprises: a first light source and a second light source that respectively emit first wavelength light beams with a first wavelength and second wavelength light beams with a second wavelength, the first wavelength and the second wavelength being different from each other, the first light source and second light source being provided for supply of object light beams formed by radiation, transmission, scattering, reflection, or diffraction from a subject according to the emitted first wavelength light beams and second wavelength light beams, respectively; a phase-shifting wavelength-selecting element that splits the first and second wavelength light beams respectively emitted from the first and second light sources into: first-phase first-wavelength reference light beams corresponding to both a first phase and the first wavelength; second-phase first-wavelength reference light beams corresponding to both a second phase, which is different from the first phase, and the first wavelength; first-phase second-wavelength reference light beams corresponding to both the first phase and the second wavelength; and second-phase second-wavelength reference light beams corresponding to the second phase and the second wavelength, in a plane perpendicular to a direction from which the first and second wavelength light beams are directed into the phase-shifting wavelength-selecting element; image-capturing means having an image-capturing plane that has recorded thereon first-phase first-wavelength interference fringes, second-phase first-wavelength interference fringes, first-phase second-wavelength interference fringes, and second-phase second-wavelength interference fringes, all of the interference fringes being respectively formed by interferences between the object light beams and the first-phase first-wavelength reference light beams, the second-phase first-wavelength reference light beams, the first-phase second-wavelength reference light beams, and the second-phase second-wavelength reference light beams; and an image reconstruction device that generates a reconstructed image of the subject according to the first-phase first-wavelength interference fringes, the second-phase first-wavelength interference fringes, the first-phase second-wavelength interference fringes, and the second-phase second-wavelength interference fringes, all of which have been recorded on the image-capturing plane.

According to this feature, it is possible to concurrently record on the image-capturing plane the first-phase first-wavelength interference fringes, second-phase first-wavelength interference fringes, first-phase second-wavelength interference fringes, and second-phase second-wavelength interference fringes, all of which correspond to mutually different first and second wavelengths. This makes it possible to calculate accurate phase distribution by single exposure and to perform dual-wavelength phase unwrapping with respect to a moving subject.

The another digital holography device according to the present invention is preferably such that the phase-shifting wavelength-selecting element has: a phase-shifting array device having (i) first phase regions corresponding to the first phase and (ii) second phase regions corresponding to the second phase, the first and second phase regions being arranged in a stripe manner along a first direction perpendicular to a direction from which the first and second wavelength light beams are directed into the array device; and a wavelength-selecting array device having (i) first wavelength regions that transmit light beams having the first wavelength and (ii) second wavelength regions that transmit light beams having the second wavelength, the first and second wavelength regions being arranged in a stripe manner along a direction orthogonal to the first direction. The wavelength-selecting array device is a device having wavelength filters arranged in an array.

According to the above arrangement, it is possible to easily realize, with the phase-shifting array device and the wavelength-selecting array device, the phase-shifting wavelength-selecting element that splits the first and second wavelength light beams respectively emitted from the first and second light sources into: the first-phase first-wavelength reference light beams corresponding to both the first phase and the first wavelength; the second-phase first-wavelength reference light beams corresponding to both the second phase, which is different from the first phase, and the first wavelength; the first-phase second-wavelength reference light beams corresponding to both the first phase and the second wavelength; and the second-phase second-wavelength reference light beams corresponding to the second phase and the second wavelength, in a plane perpendicular to a direction from which the first and second wavelength light beams are directed into the phase-shifting wavelength-selecting element.

The another digital holography device according to the present invention is preferably such that the image-capturing means is a CCD camera or a CMOS image sensor camera, and the first and second phase regions and the first and second wavelength regions are arranged to respectively correspond to pixels of the image-capturing means.

According to the above arrangement, it is possible to record, with a simple configuration, the first-phase first-wavelength interference fringes, second-phase first-wavelength interference fringes, first-phase second-wavelength interference fringes, and second-phase second-wavelength interference fringes, all of the interference fringes being respectively formed by interferences between the object light beams and the first-phase first-wavelength reference light beams, the second-phase first-wavelength reference light beams, the first-phase second-wavelength reference light beams, and the second-phase second-wavelength reference light beams.

The another digital holography device according to the present invention is preferably such that the phase-shifting wavelength-selecting element further has: third phase regions corresponding to a third phase that is different from the first and second phases; and fourth phase regions corresponding to a fourth phase that is different from the first, second, and third phases.

According to the above arrangement, it is possible to obtain interference fringes based on four different phases.

The another digital holography device according to the present invention is preferably such that the digital holography device further comprises: a third light source that emits third wavelength light beams with a third wavelength, the third wavelength being different from the first and second wavelengths, the third light source being provided for supply of object light beams formed by radiation, transmission, scattering, reflection, or diffraction from the subject according to the first, second, and third wavelength light beams.

The another digital holography device according to the present invention is preferably such that the digital holography device further comprises: a fourth light source that emits fourth wavelength light beams with a fourth wavelength, the fourth wavelength being different from the first, second, and third wavelengths, the fourth light source being provided for supply of object light beams formed by radiation, transmission, scattering, reflection, or diffraction from the subject according to the first, second, third, and fourth wavelengths.

The another digital holography device according to the present invention is preferably such that the first wavelength light beams and the second wavelength light beams, which are respectively emitted from the first light source and the second light source, are first-direction polarized light beams, the phase-shifting wavelength-selecting element has: a first ($\frac{1}{4}$) wavelength plate, into which the first wavelength light beams are directed, having a fast axis corresponding to the first phase and a slow axis corresponding to the second phase; a second ($\frac{1}{4}$) wavelength plate, into which the second wavelength light beams are directed, having the fast axis and the slow axis; and a wavelength-selecting array device having (i) first wavelength regions that transmit the first wavelength light beams and (ii) a second wavelength regions that transmit the second wavelength light beams, and the digital holography device further comprises a polarizer array having: fast axis transmission regions that transmit polarized light beams parallel to the fast axis; and slow axis transmission regions that transmit polarized light beams parallel to the slow axis.

The another digital holography device according to the present invention is preferably such that the wavelength-selecting array device and the polarizer array are integral with the image-capturing means.

The another digital holography device according to the present invention is preferably such that the first wavelength light beams and the second wavelength light beams, which are respectively emitted from the first light source and the second light source, are first-direction polarized light beams, and the phase-shifting wavelength-selecting element has: a wavelength-selecting array device having arranged therein first wavelength regions that transmit the first wavelength light beams and second wavelength regions that transmit the second wavelength light beams; a phase-shifting array device having arranged therein (a) first ($\frac{1}{4}$) wavelength plates each having a fast axis corresponding to the first phase and a slow axis corresponding to the second phase, the first ($\frac{1}{4}$) wavelength plates corresponding to the first wavelength light beams, and (b) second ($\frac{1}{4}$) wavelength plates each having a fast axis corresponding to the first phase and a slow axis corresponding to the second phase, the second ($\frac{1}{4}$) wavelength plates corresponding to the first wavelength light beams; and a polarizer transmitting the first-direction polarized components.

The another digital holography device according to the present invention is preferably such that the phase-shifting wavelength-selecting element is integral with the image-capturing means.

A phase plate array according to the present invention comprises: first regions being each realized by a ½ wavelength plate to transmit an incoming light beam and shift a phase of the light beam; and second regions being each realized by glass to transmit an incoming light beam, the first and second regions being arranged in a checkerboard pattern.

Another digital holography device according to the present invention comprises: a light source unit that emits light beams having first-direction polarized components, the light source unit being provided for supply of object light beams formed by radiation, transmission, scattering, reflection, or diffraction from a subject according to the emitted light beams; extracting means that extracts reference light beams from the light beams emitted from the light source; a wavelength plate array device having ¼ wavelength plates and ½ wavelength plates arranged alternately; a polarizer being inclined with respect to the first direction; image-capturing means having an image-capturing plane on which first and second interference fringe patterns are recorded, the first interference fringe pattern being formed by interferences between the object light beams and the reference light beams both of which have passed through the ¼ wavelength plates, the second interference fringe pattern being formed by interferences between the object light beams and the reference light beams both of which have passed through the ½ wavelength plates; and an image reconstruction device that generates a reconstructed image of the subject according to the first and second interference fringe patterns recorded on the image-capturing plane.

The wavelength plate array device is a device having wavelength plates arranged in an array.

Yet another digital holography device comprises: a light source unit that emits light beams having first-direction polarized components, the light source unit being provided for supply of object light beams formed by radiation, transmission, scattering, reflection, or diffraction from a subject according to the emitted light beams; extracting means that extracts reference light beams from the light beams emitted from the light source; a wavelength plate array device having first and second wavelength plate elements arranged alternately, the first wavelength plate elements each having a first fast axis and a first slow axis both of which are orthogonal to each other, the second wavelength plate elements each having a second slow axis parallel to the first fast axis and a second fast axis parallel to the first slow axis, image-capturing means having an image-capturing plane on which first and second interference fringe patterns are recorded, the first interference fringe pattern being formed by interferences between the object light beams and the reference light beams both of which have passed through the first wavelength plate elements, the second interference fringe pattern being formed by interferences between the object light beams and the reference light beams both of which have passed through the second wavelength plate elements; and an image reconstruction device that generates a reconstructed image of the subject according to the first and second interference fringe patterns recorded on the image-capturing plane.

Another digital holography device comprises: a light source unit that emits light beams having first-direction polarized components, the light source unit being provided for supply of object light beams formed by radiation, transmission, scattering, reflection, or diffraction from a subject according to the emitted light beams; extracting means that extracts reference light beams from the light beams emitted from the light source; a ¼ wavelength plate having a fast axis and a slow axis whose respective directions are different from a first polarization direction; a polarizer array device having first polarizers and second polarizers arranged alternately, the first polarizers each having a second polarization direction parallel to the fast axis or the slow axis of the ¼ wavelength plate, the second polarizers each having a third polarization direction orthogonal to the second polarization direction; image-capturing means having an image-capturing plane on which first and second interference fringe patterns are recorded, the first interference fringe pattern being formed by interferences between the object light beams and the reference light beams both of which have passed through the first polarizers, the second interference fringe pattern being formed by interferences between the object light beams and the reference light beams both of which have passed through the second polarizers; and an image reconstruction device that generates a reconstructed image of the subject according to the first and second interference fringe patterns recorded on the image-capturing plane.

As described above, a digital holography device according to the present invention includes the phase-shifting element that splits the light emitted from the light source into two kinds of reference light beams having different phases in a plane perpendicular to a direction in which the light emitted from the light source travels. This yields the effect of realizing a better quality of a reconstructed image of the subject than that of a reconstructed image obtained by a digital holography device in the conventional arrangement and the effect of making the phase-shifting element easier to manufacture than a phase-shifting element for the conventional digital holography device.

As described above, another digital holography device according to the present invention includes a differential optical path generating element that generates the first optical-path object light beams and second optical-path object light beams, which are different in differential optical path from each other, according to the object light beams, and generates the first optical-path reference light beams and second optical-path reference light beams, which are different in differential optical path from each other, according to the light beams emitted from the light source. With this arrangement, it is possible to concurrently obtain first and second interference fringe patterns formed with different differential optical paths by single image-capturing means. This yields the effect of providing a digital holography device that realizes instantaneous recording of a three-dimensional image.

As described above, still another digital holography device according to the present invention includes the phase-shifting wavelength-selecting element that splits the first and second wavelength light beams respectively emitted from the first and second light sources into: the first-phase first-wavelength reference light beams corresponding to both the first phase and the first wavelength; second-phase first-wavelength reference light beams corresponding to both the second phase, which is different from the first phase, and the first wavelength; the first-phase second-wavelength reference light beams corresponding to both the first phase and the second wavelength; and the second-phase second-wavelength reference light beams corresponding to the second phase and the second wavelength, in a plane perpendicular to a direction from which the first and second wavelength light beams are directed into the phase-shifting wavelength-selecting element. This yields the effect of calculating accurate phase distribution by single exposure and performing dual-wavelength phase unwrapping with respect to a moving subject.

Figure 1:
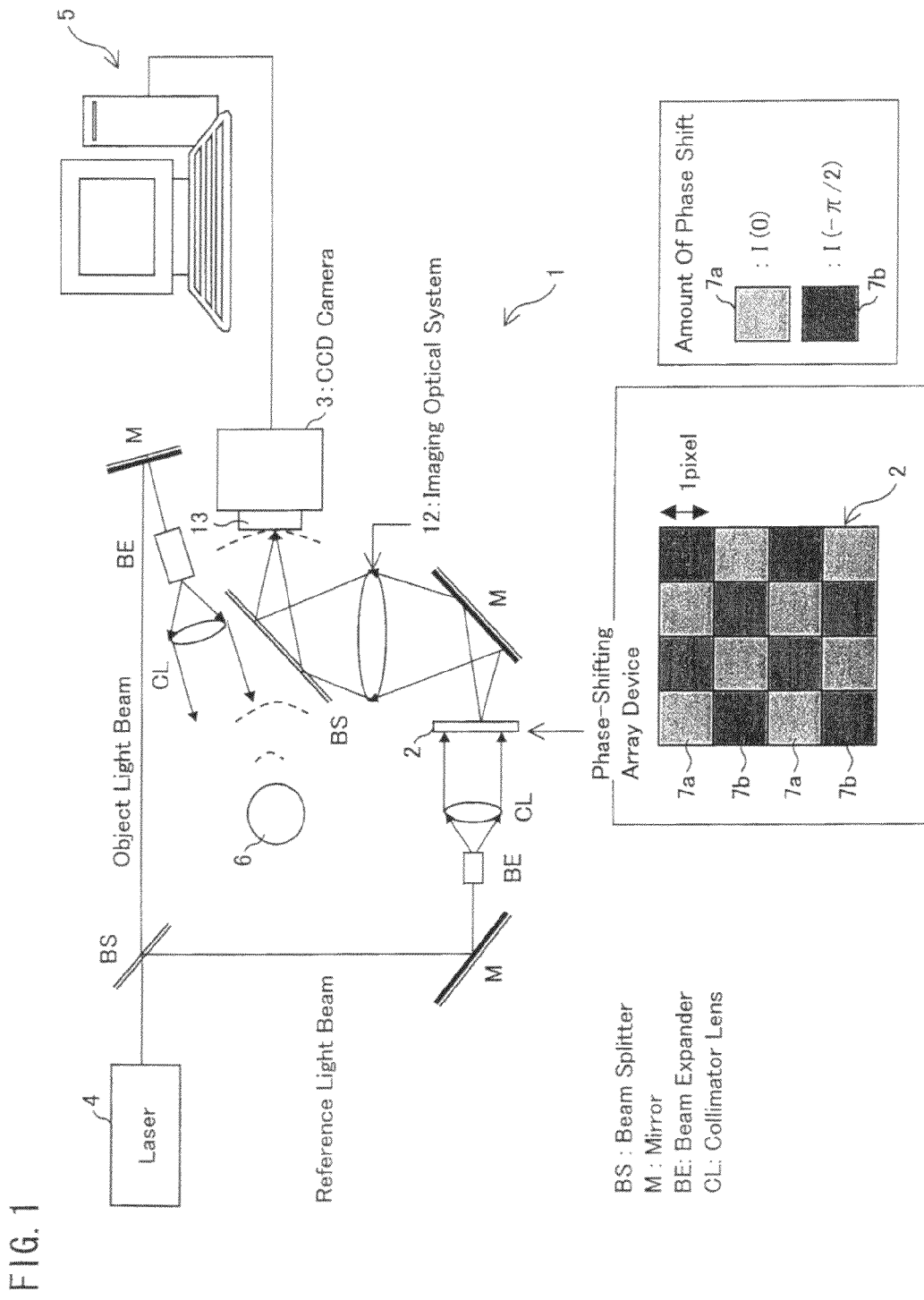
FIG. 1 is an explanatory diagram schematically showing the configuration of a digital holography device according to First Embodiment.

| Reference Signs List | |
|---|---|
| 1, 1c-1m | digital holography devices |
| 2 | array device (phase-shifting element) |
| 3 | CCD camera (image-capturing means) |
| 4 | light source |
| 5 | image reconstruction device |
| 6 | subject |
| 7a, 7b | regions |
| 8 | interference fringe |
| 9a, 9b | regions |
| 10a, 10b, 11a, 11b | interference fringe data |
| 12 | imaging optical system |
| 13 | image-capturing plane |
| 14 | array device (differential optical path generating element) |
| 15a, 15b | regions |
| 16 | interference fringe |
| 17a, 17b | regions |
| 18a, 18b, 19a, 19b | interference fringe data |
| 20 | array device (phase-shifting wavelength-selecting element) |

-continued

| Reference Signs List | |
|---|---|
| 21 | phase-shifting array device |
| 22 | wavelength-selecting array device |
| 23a-23d | phase regions |
| 24a, 24b | wavelength regions |
| 25a-25h | interference fringe patterns |
| 26a-26c | wavelength regions |
| 27a-27l | interference fringe patterns |
| 28a, 28b, 28c | light sources (first light source, second light source, third light source) |
| 31, 31a | light sources |
| 32 | ¼ wavelength plate (phase-shifting element) |
| 33 | polarizer array device |
| 34a, 34b | regions (first and second regions) |
| 35 | phase-shifting array device (phase-shifting element) |
| 36 | wavelength-plate optical-medium array device |
| 37 | polarizer |
| 38 | optical medium |
| 39 | ¼ wavelength plate |
| 40 | fast axis |
| 41 | slow axis |
| 31b | light source unit |
| 42 | phase plate array (phase-shifting element) |
| 43, 44 | regions (first and second regions) |
| 45 | ¼ wavelength plate |
| 46 | fast axis |
| 47 | slow axis |
| 48 | light source |
| 49 | polarizing plate |
| 50 | polarizer array device |
| 51a, 51b | polarizers |
| 52 | ¼ wavelength plate (phase-shifting element) |
| 53 | fast axis |
| 54 | slow axis |
| 55a, 55b, 55c | light sources |
| 56 | phase-shifting wavelength-selecting element |
| QWP1 | ¼ wavelength plate (first (¼) wavelength plate) |
| QWP2 | ¼ wavelength plate (second (¼) wavelength plate) |
| QWP3 | ¼ wavelength plate (third (¼) wavelength plate) |
| 57, 61 | wavelength-selecting array devices |
| 58a, 62a | wavelength regions (first wavelength regions) |
| 58b, 62b | wavelength regions (second wavelength regions) |
| 59 | polarizer array |
| 62c | wavelength regions (third wavelength regions) |
| 60a | fast axis transmission region |
| 60b | slow axis transmission region |
| 63, 72 | fast axes |
| 64, 73 | slow axes |
| 65a, 65b, 65c | light sources |
| 66, 74 | phase-shifting wavelength-selecting elements |
| 67, 75 | wavelength-selecting array devices |
| 68a, 76a | wavelength regions (first wavelength regions) |
| 68b, 76b | wavelength regions (second wavelength regions) |
| 76c | wavelength regions (third wavelength regions) |
| 69, 77 | phase-shifting array devices |
| 71 | polarizer |
| 70a, 78a | ¼ wavelength plates (first (¼) wavelength plates) |
| 70b, 78b | ¼ wavelength plates (second (¼) wavelength plates) |
| 78c | ¼ wavelength plate (third (¼) wavelength plate) |
| 80 | wavelength plate array device |
| 81a | ¼ wavelength plate |
| 81b | ½ wavelength plate |
| 82 | polarizing plate |
| 83 | polarizer |
| 84 | wavelength plate array device |
| 85 | first wavelength plate element |
| 86a | first fast axis |
| 86b | first slow axis |
| 87 | second wavelength plate element |
| 88a | second fast axis |
| 88b | second slow axis |
| 89 | polarizer array device |
| 90a | first polarizer |
| 90b | second polarizer |
| 91 | ¼ wavelength plate |
| BS1, BS2 | beam splitters |
| PBS1, PBS2 | polarization beam splitters |

DESCRIPTION OF EMBODIMENTS

Figure 55:
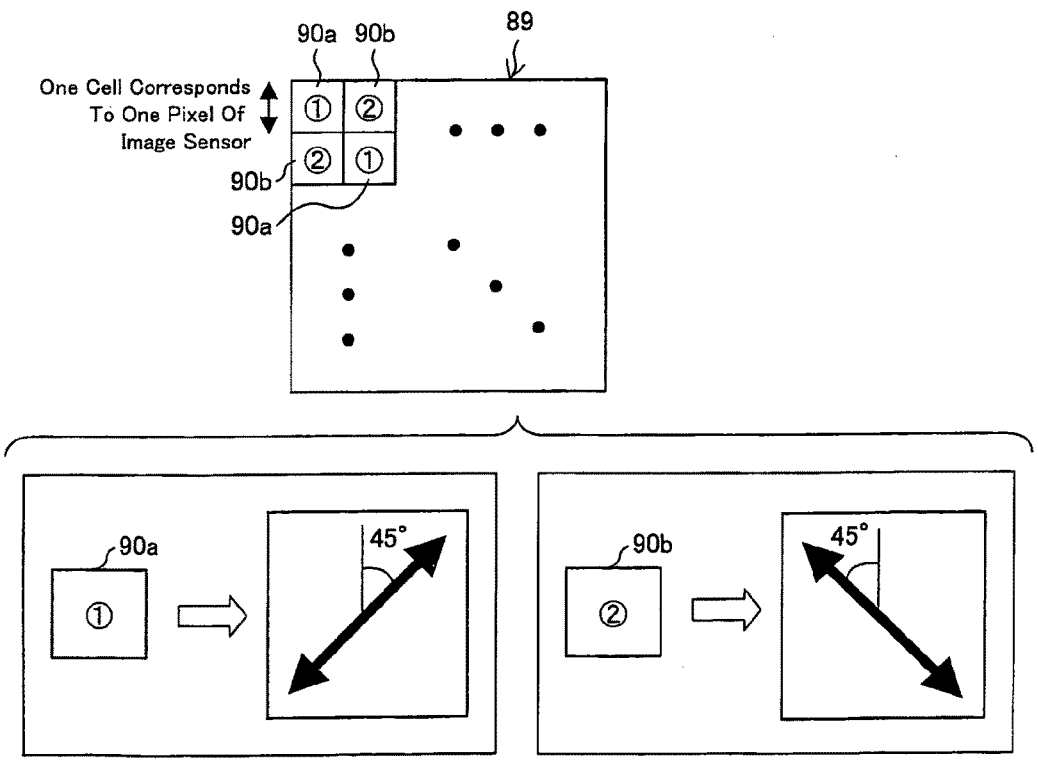
FIG. 55 is a diagram showing the configuration of the polarizer array device.

One embodiment of the present invention will be described below with reference to FIGS. 1 through 55.

First Embodiment

FIG. 1 is an explanatory diagram schematically showing the configuration of a digital holography device 1 according to First Embodiment. The digital holography device 1 includes a light source 4 that emits laser light. The laser light emitted from the light source 4 is split into two light beams by a beam splitter BS. One of the separate light beams is reflected from a mirror M, passes through a beam expander BE, and then collimated by a collimator lens CL to turn into collimated light beams. The collimated light beams illuminate a subject 6 and are scattered from the subject 6 to turn into object light beams. The object light beams pass through another beam splitter BS and enter an image-capturing plane 13 of the CCD camera 3.

Meanwhile, the other of the separate light beams into which the laser light has been split by the beam splitter BS is reflected from another mirror M. The reflected light beam passes through another beam expander BE and is collimated by another collimator lens CL. The collimated light beams are directed into the array device 2.

The array device 2 has two kinds of regions 7a and 7b both of which are arranged in a checkerboard pattern in a plane perpendicular to a direction from which the laser light beams are directed into the array device 2. The two kinds of regions 7a and 7b are arranged corresponding to the respective pixels of the CCD camera 3. The laser light beam having passed through the region 7a of the array device 2 becomes a reference light beam that serves as a reference for phase shift measuring means. The laser light beam having passed through the region 7b is converted into a reference light beam that is phase-shifted by −π/2 relative to the laser light beam having passed through the region 7a.

These two kinds of reference light beams produced by the array device 2 are reflected from still another mirror M, pass through an imaging optical system 12, and are reflected from another beam splitter BS to thereby enter the image-capturing plane 13 provided in the CCD camera 3.

Figure 2:
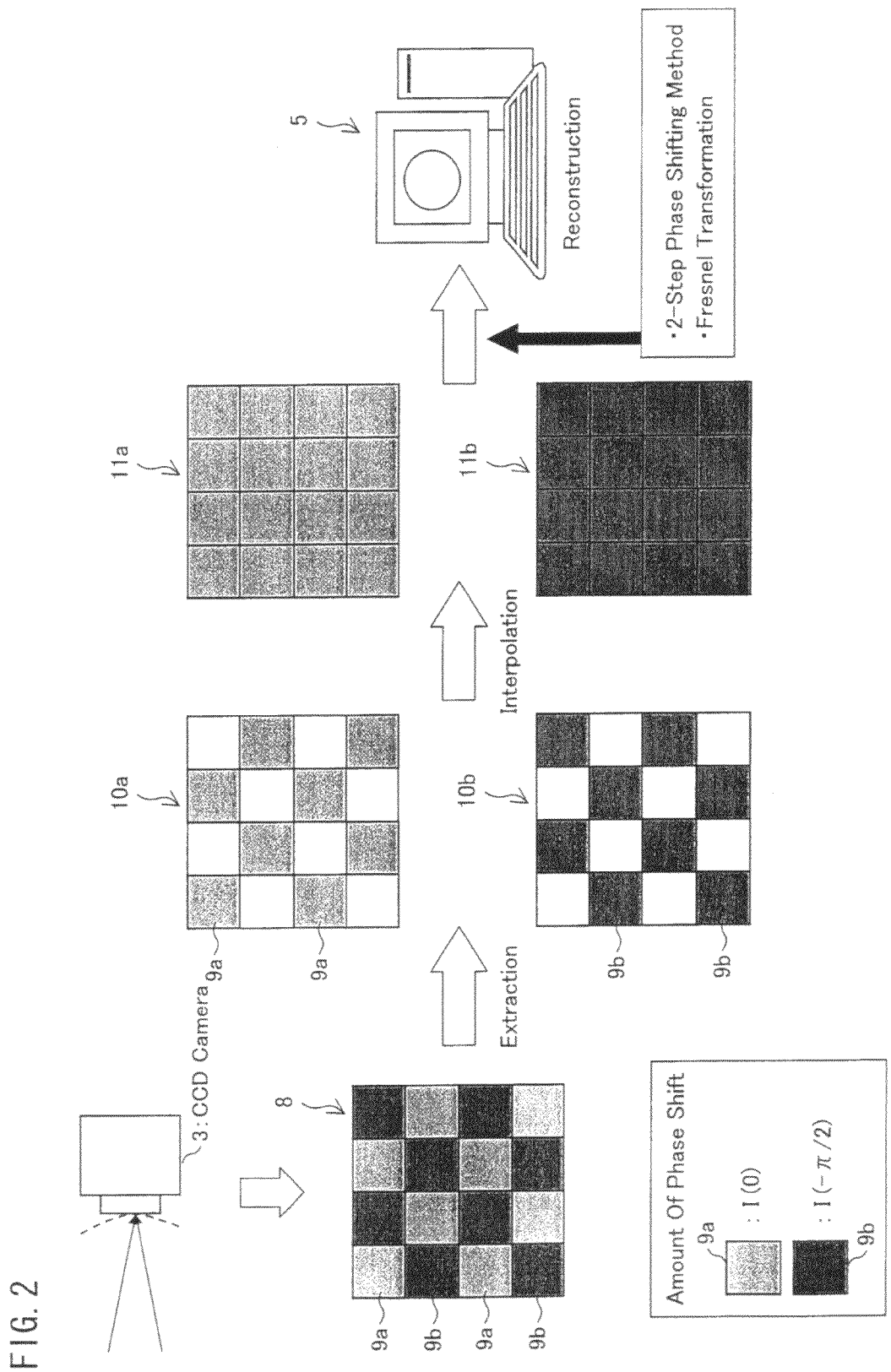
FIG. 2 is an explanatory view of a process for reconstructing a holographic image of a subject in the digital holography device.

FIG. 2 is an explanatory view of a process for reconstructing a holographic image of the subject 6 in the digital holography device 1. On the image-capturing plane 13 of the CCD camera 3 are recorded interference fringe patterns 8 that are formed by interferences between two kinds of reference light beams and object light beams. The interference fringe patterns 8 have regions 9a and regions 9b both of which are arranged alternately in a checkerboard pattern. The regions 9a are regions for recording interference fringes formed by interference between the object light beam and the reference light beam produced by passage through the region 7a of the array device 2 and having a phase that serves as a reference phase for the phase shift measuring means. The regions 9b are regions for recording interference fringes formed by interference between the object light beam and the reference light beam produced by passage through the region 7b of the array device 2 and having a phase shifted by $-\pi/2$ from a phase of the reference light beam produced by passage through the region 7a.

An image reconstruction device 5 extracts interference fringe data 10a and interference fringe data 10b, which are respectively made up of the regions 9a and the regions 9b, from the interference fringe patterns 8. Then, the image reconstruction device 5 subjects the interference fringe data 10a to interpolation to generate interference fringe data 11a, and subjects the interference fringe data 10b to interpolation to generate interference fringe data 11b. Subsequently, the image reconstruction device 5 Fresnel-transforms the interference fringe data 11a and 11b to generate a reconstructed image of the subject 6.

The intensities of the reference light beams are preferably sufficiently high, and preferably more than twice higher than the intensity of the object light beam, which are requirements for establishment of Equations (3) through (5) used in the holographic image reconstruction process performed in the image reconstruction device 5.

Next, the following will describe the principle on which the reconstructed image of the subject 6 is generated. By finding complex amplitude distribution of the object light beam on the image-capturing plane 13 of the CCD camera 3, three-dimensional information of the object is calculated. Calculation of the complex amplitude distribution of the object requires the following information items:

Intensity distribution of the reference light beam;
Interference fringe pattern formed by the object light beam and one of the reference light beams; and
Interference fringe pattern formed by the object light beam and the other reference light beam that is phase-shifted by $-\pi/2$.

The following will show the theory of how to find, from these information items, the complex amplitude distribution of the object light beam on the image-capturing plane 13 of the CCD camera 3.

The object light beam is expressed by:

$$U_{(x,y)} = A_{o(x,y)} e^{j\theta_{(x,y)}}$$

where $A_{o(x,y)}$ is amplitude distribution of the object light beam, and $\theta_{(x,y)}$ is phase distribution of the object light beam.

The reference light beam is expressed by:

$$U_{\gamma(x,y)} = A_{\gamma(x,y)} e^{j\{\phi_{(x,y)}+\delta\}}$$

where $A_{\gamma(x,y)}$ is amplitude distribution of the reference light beam, $\phi_{(x,y)}$ is phase distribution of the reference light beam, and $\delta$ is phase shift amount of the reference light beam.

The intensity of the reference light beam is expressed by:

$$I_{\gamma(x,y)} = A_{\gamma(x,y)}^2 (A_{\gamma(x,y)} = \sqrt{I_{\gamma(x,y)}}).$$

The interference fringe pattern formed by the object light beam and the reference light beam is expressed by the following Equation (1):

$$I_{(x,y;\delta)} = |U_{(x,y)} + U_{\gamma(x,y)}|^2 = A_{o(x,y)}^2 + A_{\gamma(x,y)}^2 + 2A_{o(x,y)}A_{\gamma(x,y)} \cos[\theta_{(x,y)} - \{\phi_{(x,y)}+\delta\}]. \quad (1)$$

The interference fringe patterns produced when the amount of phase shift $\delta$ is 0 and $-\pi/2$ are as follows:

$$\delta = 0 : I_{(x,y;0)} = A_{o(x,y)}^2 + A_{\gamma(x,y)}^2 + 2A_{o(x,y)}A_{\gamma(x,y)}\cos[\theta_{(x,y)} - \phi_{(x,y)}]; \text{ and}$$

$$\delta = -\frac{\pi}{2} : I_{(x,y;-\frac{\pi}{2})} = A_{o(x,y)}^2 + A_{\gamma(x,y)}^2 - 2A_{o(x,y)}A_{\gamma(x,y)}\sin[\theta_{(x,y)} - \phi_{(x,y)}].$$

Here, let zeroth-order diffracted light component of the interference fringe pattern be defined as:

$$a_{(x,y)} = A_{O(x,y)}^2 + A_{\gamma(x,y)}^2.$$

and, let initial phase of the reference light beam be $\phi_{(x,y)} = 0$.

The above two equations are rewritten as:

$$A_{o(x,y)}\cos\theta_{(x,y)} = \frac{I_{(x,y;0)} - a_{(x,y)}}{2\sqrt{I_{\gamma(x,y)}}}, \text{ and} \quad (2)$$

$$A_{o(x,y)}\sin\theta_{(x,y)} = -\frac{I_{(x,y;-\frac{\pi}{2})} - a_{(x,y)}}{2\sqrt{I_{\gamma(x,y)}}}.$$

The following shows a procedure for finding zeroth-order diffracted light component $a_{(x,y)}$ of the interference fringe pattern. Substitution of Equation (2) into the trigonometric function formula, $\sin^2\theta + \cos^2\theta = 1$, gives $$A_{o(x,y)}^2\{\cos^2\theta_{(x,y)} + \sin^2\theta_{(x,y)}\} = \left\{\frac{I_{(x,y;0)} - a_{(x,y)}}{2\sqrt{I_{\gamma(x,y)}}}\right\}^2 + \left\{\frac{-I_{(x,y;-\frac{\pi}{2})} + a_{(x,y)}}{2\sqrt{I_{\gamma(x,y)}}}\right\}^2.$$

This equation is rearranged as a quadratic equation for $a_{(x,y)}$ given by the following equation (3):

$$a_{(x,y)}^2 + v a_{(x,y)} + w = 0 \quad (3)$$

$$v = -\left(I_{(x,y;0)} + I_{(x,y;-\frac{\pi}{2})} + 2I_{\gamma(x,y)}\right)$$

$$w = \frac{1}{2}\left(I_{(x,y;0)}^2 + I_{(x,y;-\frac{\pi}{2})}^2\right) + 2I_{\gamma(x,y)}^2.$$

Solving for $a_{(x,y)}$, $$a_{(x,y)} = \frac{-v \pm \sqrt{v^2 - 4w}}{2}. \quad (4)$$

Because $a_{(x,y)} = A_{o(x,y)}^2 + A_{\gamma(x,y)}^2$, the expression under the radical sign becomes negative. Thus, $$a_{(x,y)} = \frac{-v - \sqrt{v^2 - 4w}}{2}. \quad (5)$$

Now, from the two interference fringe patterns and the information on intensity of the reference light beam, the complex amplitude distribution of the object light beam on the CCD surface can be found by the following steps.

First, the two interference fringe patterns and the intensity distribution of the reference light beam are recorded in the image sensor. Then, the two interference fringe patterns and the information on the intensity distribution of the reference light beam are substituted into Equation (5) to find a zeroth-order diffracted light component of the interference fringe pattern. Next, the two interference fringe patterns, the information on the intensity distribution of the reference light beam, and the zeroth-order diffracted light component thus found of the interference fringe pattern are substituted into Equation (2) to find the real part of the object light beam and the imaginary part of the object light beam.

Figure 3:
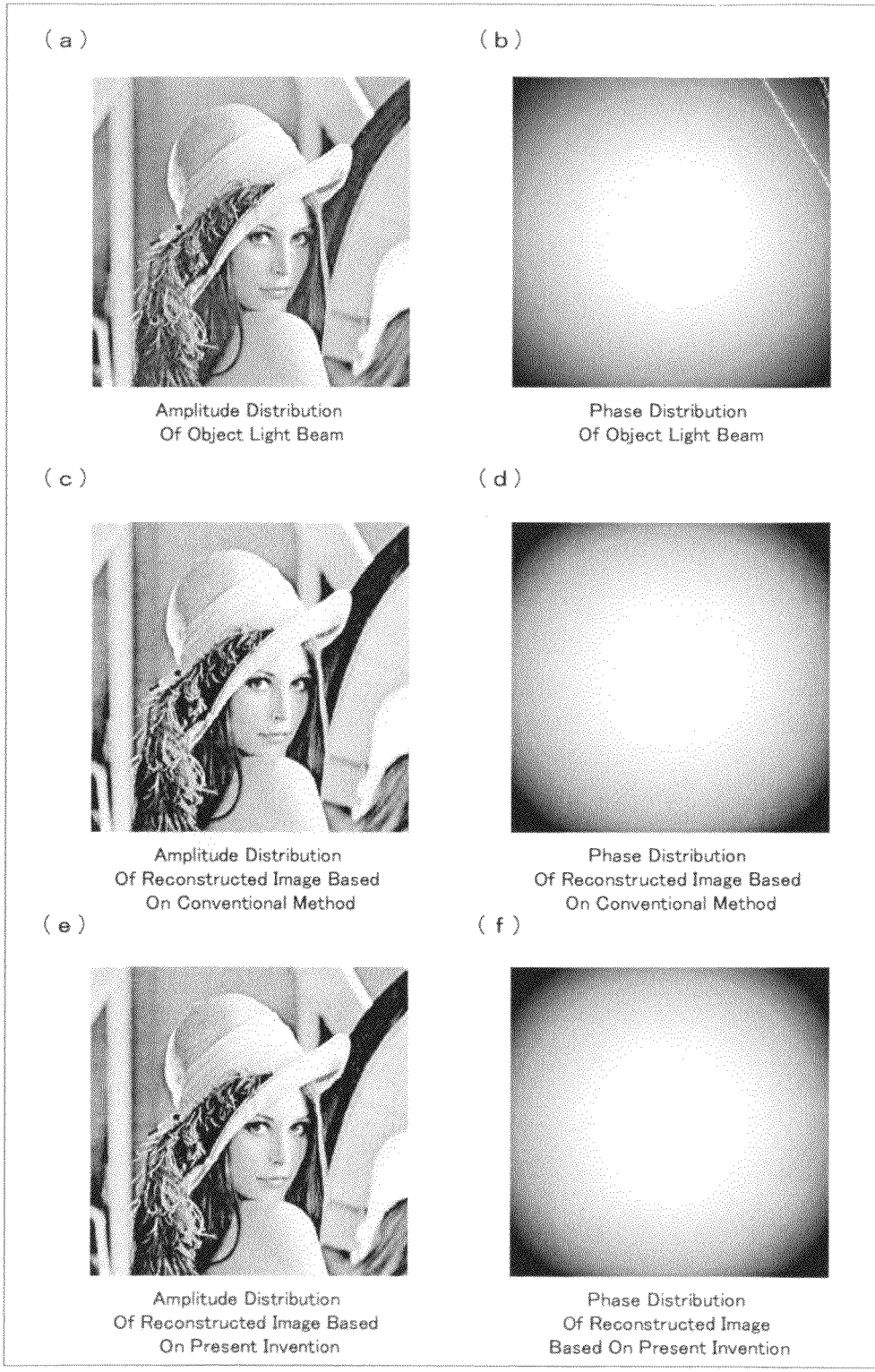
FIG. 3(a) of FIG. 3 is a view showing amplitude distribution of an object light beam. (b) of FIG. 3 is a view showing phase distribution of the object light beam. (c) of FIG. 3 is a view showing amplitude distribution of a reconstructed image formed by the conventional method. (d) of FIG. 3 is a view showing phase distribution of the reconstructed image formed by the conventional method. (e) of FIG. 3 is a view showing amplitude distribution of a reconstructed image according to the present invention. (f) of FIG. 3 is a view showing phase distribution of the reconstructed image according to the present invention.
Figures 4, 5:
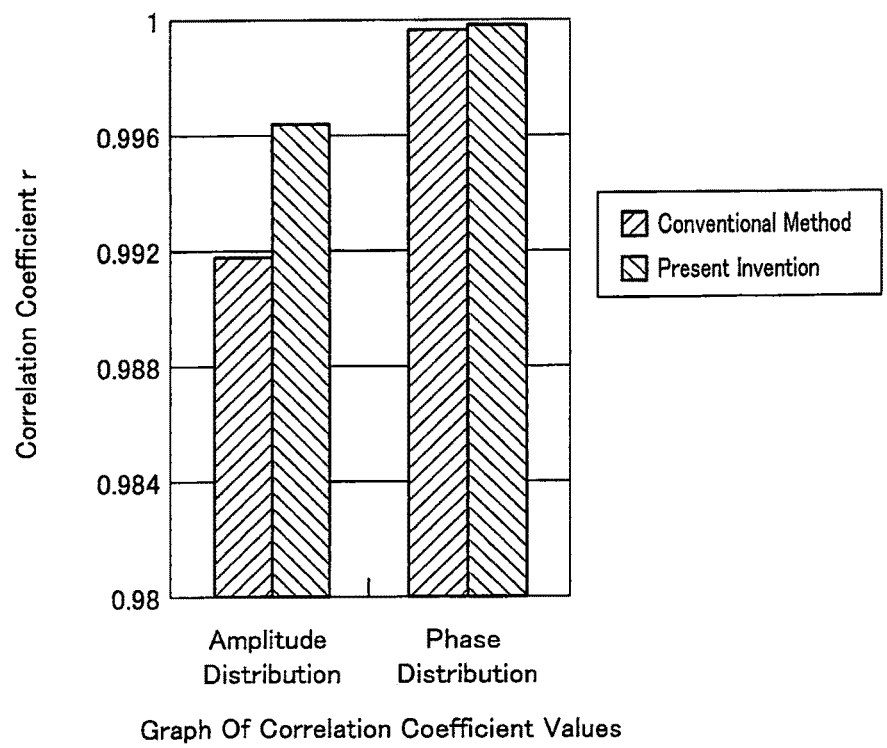
FIG. 4 is a view showing correlation coefficient values in the present invention and in the conventional method.
FIG. 5 is a graph showing the correlation coefficient values in the present invention and in the conventional method.

In order to verify the effectiveness of digital holography according to First Embodiment, simulation was done using a calculator. (a) of FIG. 3 is a view showing amplitude distribution of the object light beam. (b) of FIG. 3 is a view showing phase distribution of the object light beam. (c) of FIG. 3 is a view showing amplitude distribution of a reconstructed image formed by a digital holography device disclosed in Patent Literature 1 as the conventional method. (d) of FIG. 3 is a view showing phase distribution of the reconstructed image formed by a digital holography device disclosed in Patent Literature 1 as the conventional method. (e) of FIG. 3 is a view showing amplitude distribution of a reconstructed image according to the present invention. (f) of FIG. 3 is a view showing phase distribution of the reconstructed image according to the present invention. FIG. 4 is a view showing correlation coefficient values in the present invention and in the conventional method. FIG. 5 is a graph showing the correlation coefficient values in the present invention and in the conventional method.

The conditions for the simulation were as follows:

Wavelength of light for recording and reconstruction was 632.8 [nm];

Distance from the CCD surface at the reconstruction was 7 [nm];

The number of pixels in the CCD was 512 by 512 [pixels];

pitch between the pixels in the CCD was 10 [nm];

Image reconstruction method was convolution method; and $$Ar_{(x,y)}=2.$$

The reason why $Ar_{(x,y)}=2$ is because the intensity distribution of the object light beam was standardized, and a ratio between the intensity of the object light beam and the intensity of the reference light beam was assumed to be 1:4. As a control, simulation was done under the conditions similar to those for the digital holography disclosed in Patent Literature 1 as the conventional method. In both cases, interpolation was carried out in such a manner that values of missing pixels with some amounts of phase shifts on the CCD phase are interpolated. For comparison, correlation coefficient values were calculated using amplitude and phase distributions of the object light beam and amplitude and phase distributions of reconstructed images obtained by their respective methods shown in FIG. 3. From the correlation coefficient values thus obtained, effectiveness was verified. A correlation coefficient r is given by:

$$\gamma = \frac{\sum_{i=1}^{N_x}\sum_{j=1}^{N_y}(P_{(i,j)}-\overline{P})(Q_{(i,j)}-\overline{Q})}{\sqrt{\sum_{i=1}^{N_x}\sum_{j=1}^{N_y}(P_{(i,j)}-\overline{P})^2}\sqrt{\sum_{i=1}^{N_x}\sum_{j=1}^{N_y}(Q_{(i,j)}-\overline{Q})^2}}, \quad (6)$$

where $\overline{P} = \frac{1}{N_xN_y}\sum_{i=1}^{N_x}\sum_{j=1}^{N_y}P_{(i,j)}$ and $$\overline{Q} = \frac{1}{N_xN_y}\sum_{i=1}^{N_x}\sum_{j=1}^{N_y}Q_{(i,j)}.$$

In Equation (6) as above, assume that $P_{(i,j)}$ is a value of each pixel for data of a subject, $Q_{(i,j)}$ is a value of each pixel for data of a reconstructed image, $N_x$ is the number of pixels in the direction of x-axis, and $N_y$ is the number of pixels in the direction of y-axis. Data of amplitude and phase distributions of the subject are given to $P_{(i,j)}$, and data of amplitude and phase distributions of the reconstructed image are given to $Q_{(i,j)}$. FIG. 4 shows the correlation coefficient values, and FIG. 5 shows the graph of the correlation coefficient values. The simulation results confirmed the improvement in image quality.

First Embodiment has exemplified a case where the light source 4 emits the laser light. However, this is not the only possibility of the present invention. The use of the laser light may be replaced by the use of an ultrasound, x-rays, light from an LED, light from super-luminescent diode, light from a halogen lamp, light from a xenon lamp, light from a mercury lamp, light from a sodium lamp, microwaves, terahertz rays, electron rays, or radio waves. The same goes for the later-described embodiments.

The regions 7a and 7b of the array device 2 may be arranged with variations in thickness of a material for the array device 2. Alternatively, the regions 7a and 7b may be arranged with variations in orientation of liquid crystal molecules of a liquid crystal element optionally provided in the array device 2.

Further, First Embodiment has exemplified a case where the CCD camera is used as image-capturing means. However, this is not the only possibility of the present invention. The image-capturing means can be image sensors in general, and the use of the CCD camera may be replaced by the use of a CMOS image sensor camera. The same goes for the later-described embodiments.

Still further, First Embodiment has exemplified a case where the array device is made from glass. However, this is not the only possibility of the present invention.

Yet further, First Embodiment has exemplified a case where the laser light emitted from the light source is scattered from the subject so that the object light beams are formed. However, this is not the only possibility of the present invention. Alternatively, the object light beams may be formed by radiation, transmission, reflection, or diffraction from the subject. The same goes for the later-described embodiments.

Second Embodiment

Figure 6:
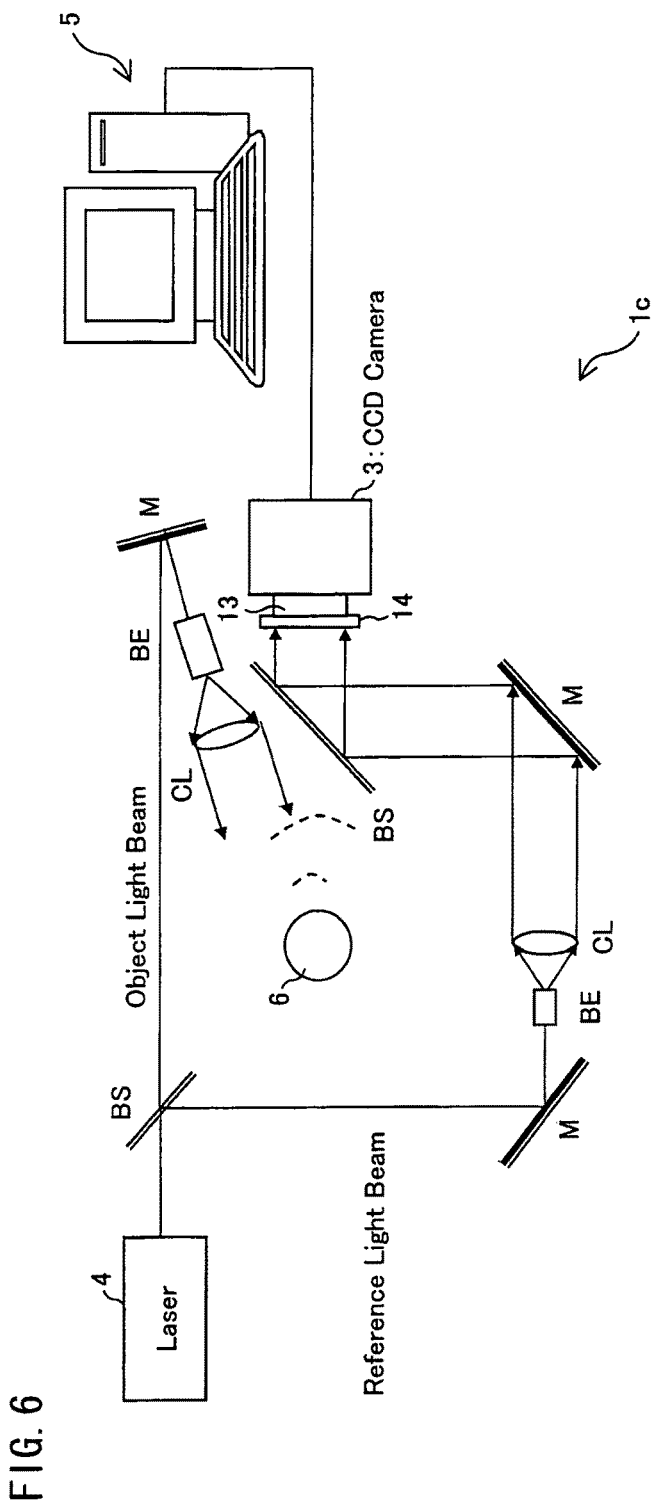
FIG. 6 is an explanatory diagram schematically showing the configuration of a digital holography device according to Second Embodiment.

FIG. 6 is an explanatory diagram schematically showing the configuration of a digital holography device 1c according to Second Embodiment. Components that are the same as those described in First Embodiment are given the same reference numerals, and detailed explanations thereof are omitted here.

The digital holography device 1c includes a light source 4 that emits laser light. The laser light emitted from the light source 4 is split into light beams by a first beam splitter BS. One of the separate light beams is reflected from a first mirror M, passes through a first beam expander BE, and then collimated by a first collimator lens CL to turn into a collimated light beam. The collimated light beam illuminates a subject 6 and is scattered from the subject 6 to turn into an object light beam. The object light beam passes through a second beam splitter BS and enters an array device 14.

Meanwhile, the other of the separate light beams, into which the laser light has been split by the beam splitter BS, is reflected from a second mirror M. The reflected light beam passes through a second beam expander BE and is collimated by a second collimator lens CL to turn into a collimated light beam. The collimated light beam is reflected from a third mirror M, reflected from the second beam splitter BS, and directed into the array device 14.

Figure 7:
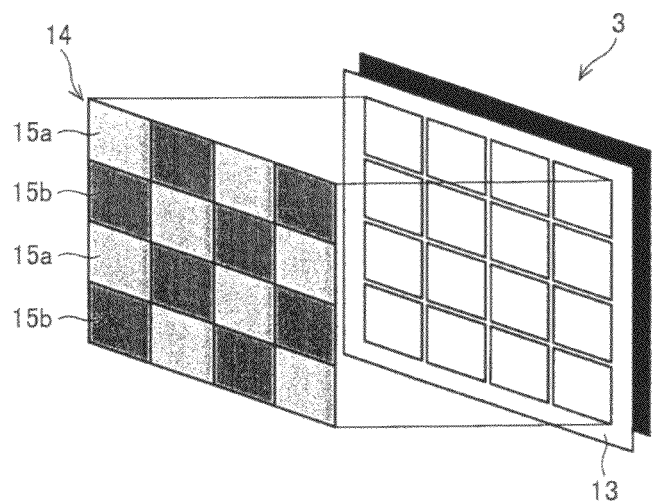
FIG. 7 is an explanatory oblique view schematically showing the configuration of an array device provided in the digital holography device.
Figure 8:
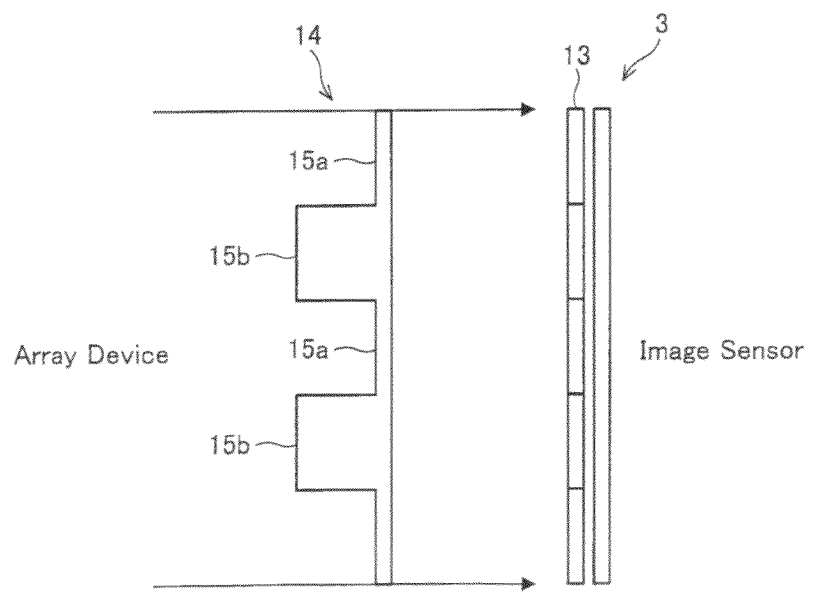
FIG. 8 is a cross-sectional view schematically showing the configuration of an array device provided in the digital holography device.

FIG. 7 is an explanatory oblique view schematically showing the configuration of the array device 14. FIG. 8 is a cross-sectional view thereof. The array device 14 has two kinds of regions 15a and 15b both of which are arranged alternately in a checkerboard pattern in a plane perpendicular to a direction from which the laser light beam is directed into the array device 14. The two kinds of regions 15a and 15b are arranged to respectively correspond to pixels of a CCD camera 3. The array device 14 is made from glass that has an equal refractive index with respect to the object light beam and the reference light beam, and the region 15a is arranged to be thinner than the region 15b, as shown in FIG. 8.

The region 15a produces a first optical-path object light beam and a first optical-path reference light beam from the object light beam from the subject 6 and the laser light beam reflected from the second beam splitter BS, so that the first optical-path object light beam and the first optical-path reference light beam enter an image-capturing plane 13. The region 15b produces a second optical-path object light beam and a second optical-path reference light beam from the object light beam from the subject 6 and the laser light beam reflected from the second beam splitter BS, so that the second optical-path object light beam and the second optical-path reference light beam enter the image-capturing plane 13. The array device 14 may be affixed onto the image-capturing plane 13 of the CCD camera 3. Such a configuration of the array device 14 causes differences in optical path between the pixels of the CCD camera 3, which enables two kinds of interference fringe patterns with different optical path lengths to be concurrently recorded at one time. Since no particular requirement to be satisfied is put on the difference in optical path, the thicknesses of the glass may be determined appropriately as long as each of the thicknesses are uniform.

The array device may be formed of a first optical medium and a second optical medium both of which have the same thickness. In such a case, the first optical medium is arranged to have a first refractive index with respect to the incoming object light beam and reference light beam, and the second optical medium is arranged to have a second refractive index, which is different from the first refractive index, with respect to the object light beam and reference light beam.

Figure 9:
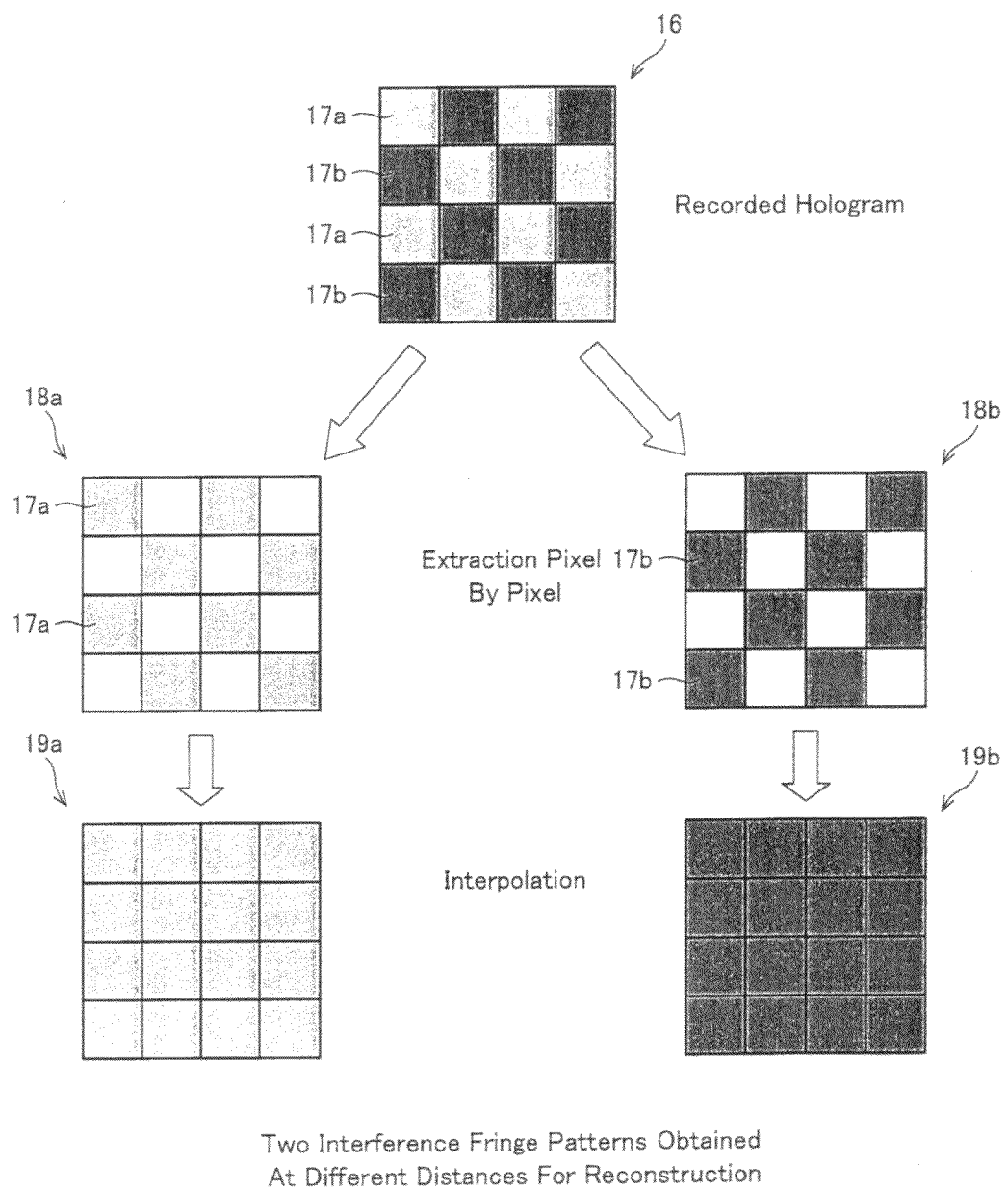
FIG. 9 is an explanatory view showing an image reconstruction algorithm of the digital holography device.

FIG. 9 is an explanatory view showing an image reconstruction algorithm of the digital holography device 1c. On the image-capturing plane 13 of the CCD camera 3, interference fringe patterns 16 are recorded. The interference fringe patterns 16 are recorded in two kinds of regions 17a and 17b, both of which are arranged alternately in a checkerboard pattern. The region 17a corresponds to the region 15a of the array device 14. The region 17b corresponds to the region 15b of the array device 14.

An image reconstruction device 5 extracts interference fringe data 18a and interference fringe data 18b, which are respectively made up of the regions 17a and the regions 17b, from the interference fringe patterns 16. Then, the image reconstruction device 5 subjects the interference fringe data 18a to interpolation to generate interference fringe data 19a, and subjects the interference fringe data 18b to interpolation to generate interference fringe data 19b. Subsequently, the image reconstruction device 5 Fresnel-transforms the interference fringe data 19a and 19b to generate a reconstructed image of the subject 6.

In this manner, information of the two interference fringe patterns having different optical path lengths are recorded by the image sensor of the present embodiment, and components are extracted, and missing pixels are interpolated. Then, according to the two interference fringe patterns thus obtained in the above process, the object light beam is found by image reconstruction calculation using a calculator to reproduce three-dimensional information.

As described above, it is possible to reproduce amplitude information of the subject at a given position, from two in-line holograms recorded at two positions of such that the image sensor (CCD camera 3) and the subject 6 are placed in line with each other at different distances. The following will describe the principle of such a method.

An object light beam scattered from the subject 6 when light is applied to the subject 6 is superimposed on a plane wave that serves as a reference light beam so that an interference fringe pattern is formed on the image sensor. The interference fringe pattern recorded by the image sensor is given by the following Equation (7):

$$I(x, y, z) = \left| A_0 \exp\left(-i\frac{2\pi d}{\lambda}\right)[1 + u(x, y, z)] \right|^2 \quad (7)$$

where $A_o$ is amplitude of the reference light beam (real number constant), and u(x,y,z) is amplitude and phase distributions of the object light beam.
where z is a distance between the image sensor and the subject.
Here, when the object light beam is sufficiently smaller than the reference light beam, an approximate expression of Equation (7) is given by the following Equation (8):

$$I(x, y, z) = \left| A_0 \exp\left(-i\frac{2\pi d}{\lambda}\right) \exp[u(x, y, z)] \right|^2 \quad (8)$$
$$= A_0^2 \exp[u(x, y, z) + u^*(x, y, z)].$$

Here, a function is defined as given by the following equation (9):

$$l(x,y,z) = \log\left[I(x,y,z)/A_0^2\right] = u(x,y,z) + u^*(x,y,z). \quad (9)$$

At this time, Fourier transformation of l(x,y,z) is given by the following Equation (10):

$$L(x, y, z) = \int\int l(x, y, z)\exp[-i2\pi(f_x x + f_y y)]dxdy \quad (10)$$
$$= U(f_x, f_y, 0)H(f_x, f_y, z) +$$
$$U^*(-f_x, -f_y, 0)H^*(f_x, f_y, z).$$

Here, $H(f_x, f_y, z)$ is a transfer function using the Rayleigh-Sommerfeld integral and given by the following Equation (11):

$$H(f_x, f_y, \Delta z) = \exp\left[-i\frac{2\pi z}{\lambda}(1 - \lambda^2 f_x^2 - \lambda^2 f_y^2)^{\frac{1}{2}}\right]. \quad (11)$$

In the equation (10), a function $L(x,y,z)$ includes Fourier-transformed image of both complex amplitude distributions of the object and its conjugate image.

Then, in order to reconstruct the complex amplitude distribution of the object and remove the conjugate image, an interference fringe pattern obtained at a distance of $z+\Delta z$ between the image sensor and the subject is recoded. From this interference fringe pattern, a function $L(x,y,z+\Delta z)$ is found.

From the functions $L(x,y,z)$ and $L(x,y,z+\Delta z)$ thus found, we establish the following Equation (12):

$$\Delta L(x, y, z) = L(x, y, z) - L(x, y, z + \Delta z)H(f_x, f_y, \Delta z) \quad (12)$$
$$= U(f_x, f_y, 0)H(f_x, f_y, z) \times [1 - H(f_x, f_y, 2\Delta z)].$$

Since it is possible to find a function $U(f_x, f_y, O)$ found by Fourier transformation of the object light beam from the Equation (12), it is possible to find $u(x, y, O)$ that is amplitude and phase information of the object which information is found by inverse Fourier transformation.

Figure 10:
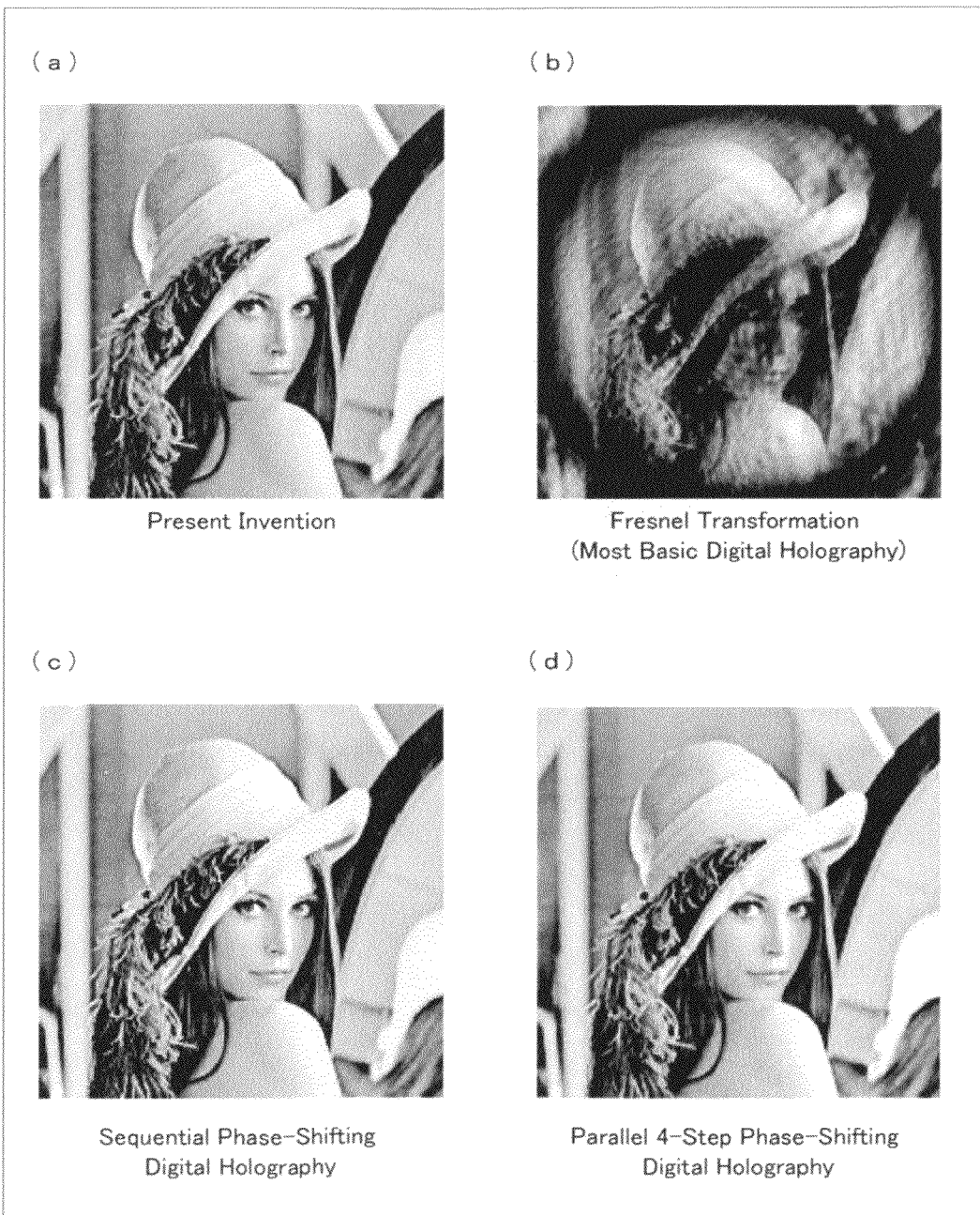
FIG. 10(a) of FIG. 10 is a view showing a reconstructed image of the subject by the digital holography device. (b) of FIG. 10 is a view showing a reconstructed image of the subject by the conventional Fresnel transformation. (c) of FIG. 10 is a view showing a reconstructed image of the subject by the conventional sequential phase-shifting digital holography. (d) of FIG. 10 is a view showing a reconstructed image of the subject by the digital holography device disclosed in Patent Literature 1 as the conventional method.

(*a*) of FIG. 10 is a view showing a reconstructed image of the subject by the digital holography device 1*c*. (*b*) of FIG. 10 is a view showing a reconstructed image of the subject by the conventional Fresnel transformation. (*c*) of FIG. 10 is a view showing a reconstructed image of the subject by the conventional sequential phase-shifting digital holography. (*d*) of FIG. 10 is a view showing a reconstructed image of the subject by the digital holography device disclosed in Patent Literature 1 as the conventional method.

It is clear that the digital holography device 1*c* of Second Embodiment realizes a reconstructed image of a quality equal to a reconstructed image obtained by the conventional sequential phase-shifting digital holography and the digital holography device disclosed in Patent Literature 1 as the conventional method.

Third Embodiment

Figure 11:
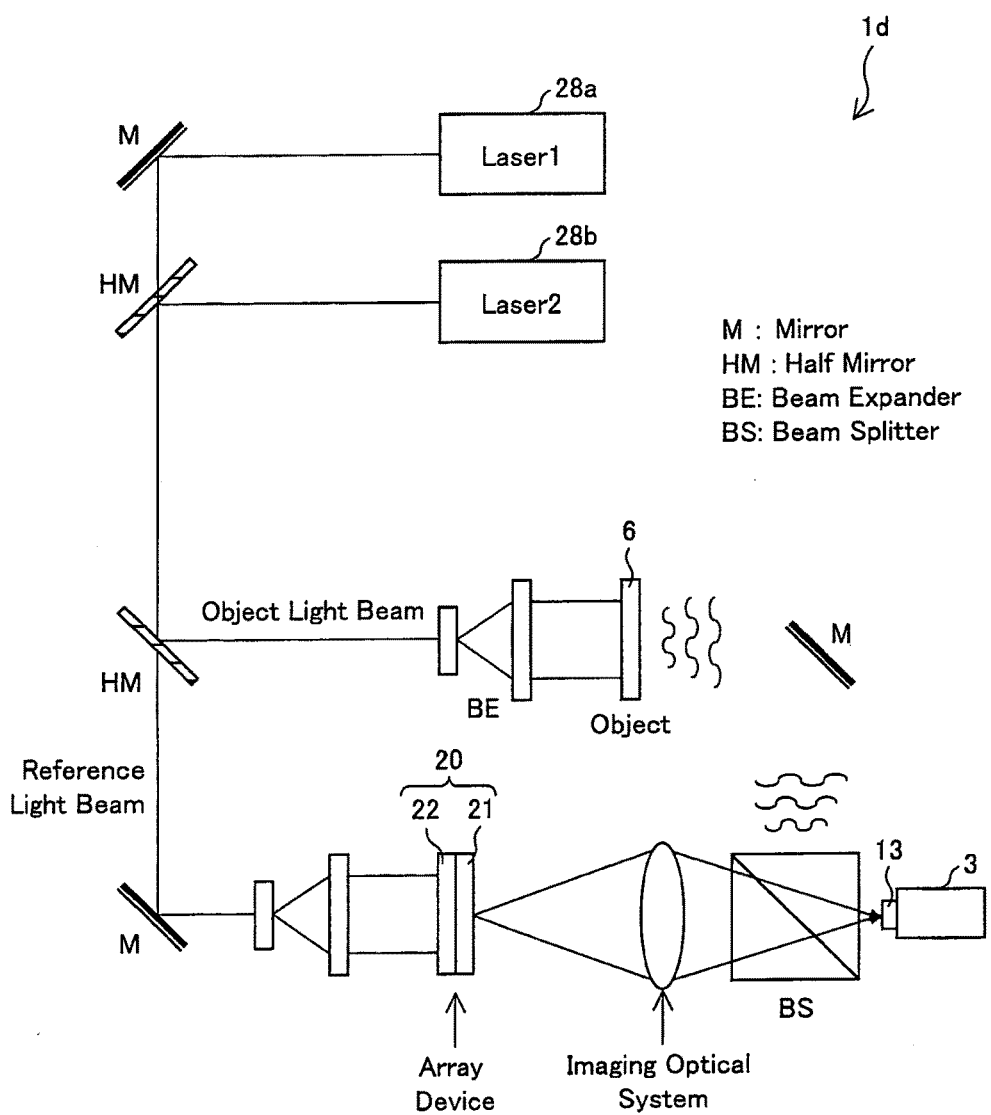
FIG. 11 is an explanatory diagram schematically showing the configuration of a digital holography device according to Third Embodiment.

FIG. 11 is an explanatory diagram schematically showing the configuration of a digital holography device 1*d* according to Third Embodiment. Components that are the same as those described in the foregoing embodiments are given the same reference numerals, and detailed explanations thereof are omitted here.

The digital holography device 1*d* includes a light source 28*a* that emits beams of green laser light with a wavelength corresponding to green and a light source 28*b* that emits beams of red laser light with a wavelength corresponding to red. The green laser light beam emitted from the light source 28*a* is reflected from a first mirror M. The reflected green laser light beams pass through a first half-mirror HM, and then enter a second half mirror HM. The red laser light beams emitted from the light source 28*b* are reflected from the first half mirror HM and then enter the second half mirror HM.

The green laser light beams and red laser light beams reflected from the second half mirror HM pass through a beam expander BE and illuminate a subject 6. Object light beams transmitted from the subject 6 is reflected from a second mirror M, reflected from a beam splitter BS, and then enter an image-capturing plane 13 of a CCD camera 3.

The green laser light beams and red laser light beams having passed through the second half mirror HM are reflected from a third mirror M, pass through a second beam expander BE, and then enter an array device 20.

Figure 12:
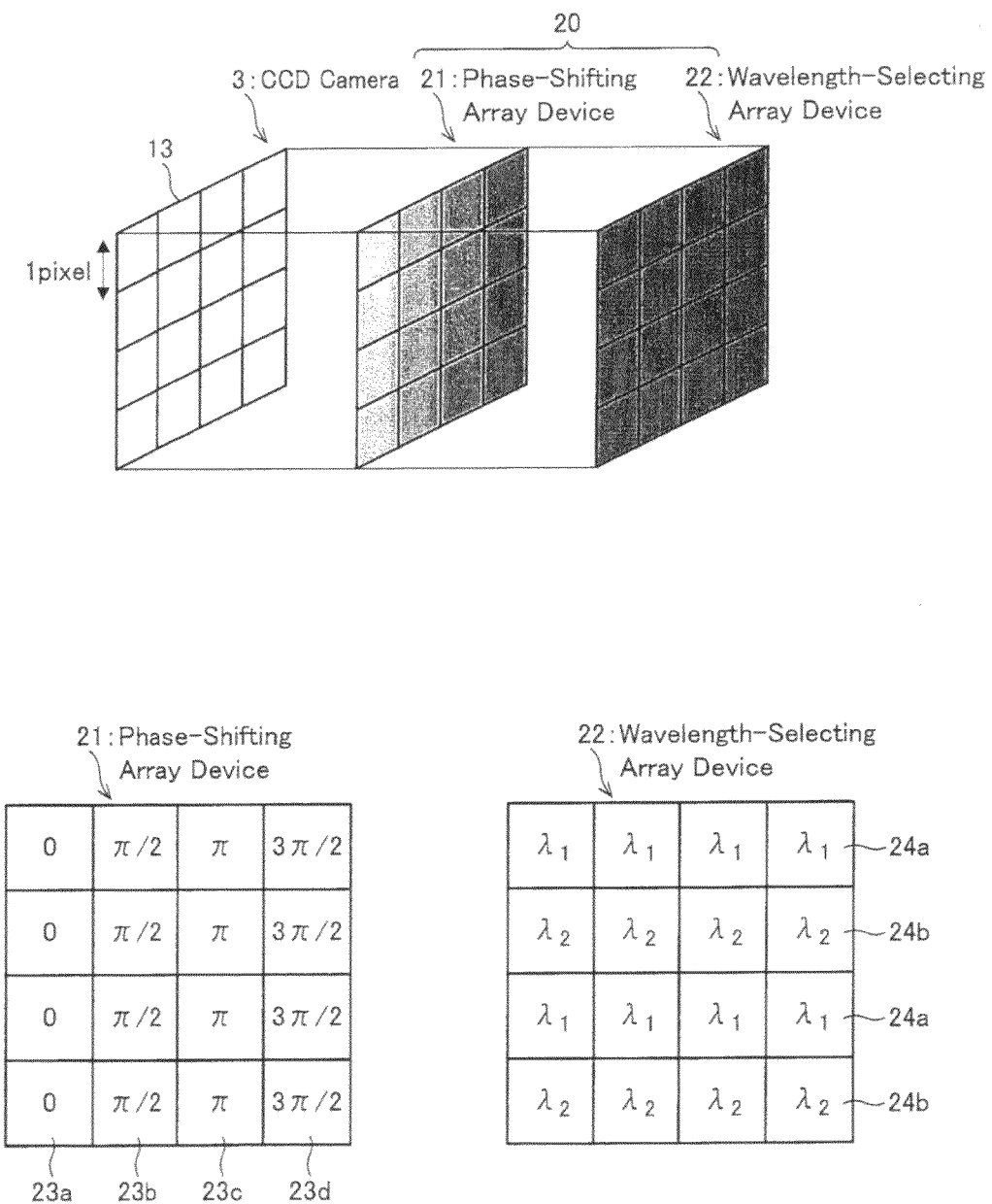
FIG. 12 is an explanatory view schematically showing the configuration of an array device provided in the digital holography device.

FIG. 12 is an explanatory view showing the configuration of the array device 20. The array device 20 has: (i) a phase-shifting array device 21 having phase regions 23*a* corresponding to a phase of 0, phase regions 23*b* corresponding to a phase of $\pi/2$, and phase regions 23*c* corresponding to a phase of $\pi$, and phase regions 23*d* corresponding to a phase of $3\pi/2$, all of which regions are arranged in a stripe manner along a first direction perpendicular to a direction from which the green laser light beams and red laser light beams are directed into the array device 20; and (ii) a wavelength-selecting array device 22 having wavelength regions 24*a* that transmit the green laser light beams with a wavelength corresponding to green and wavelength regions 24*b* that transmit the red laser light beams with a wavelength corresponding to red, both of which regions are arranged in a stripe manner along a direction orthogonal to the first direction.

The phase regions 23*a*, 23*b*, 23*c*, and 23*d* and the wavelength regions 24*a* and 24*b* are arranged to respectively correspond to pixels of the CCD camera 3.

In order to instantaneously obtain accurate phase distribution, a system that concurrently records interference fringe patterns corresponding to two wavelengths is needed. Further, obtaining of phase-shifted reference light beams for the respective wavelengths enables reduction of a zeroth-order diffracted light beam and the like effect. There are provided the array device 20 arranged as above and the CCD camera 3.

More specifically, there are provided: the phase-shifting array device 21 where the amount of phase shift for each pixel of the CCD camera 3 is 0, $\pi/2$, $\pi$, or $3\pi/2$; and the wavelength-selecting array device 22, which is provided in front of the phase-shifting array device 21, transmitting only particular wavelengths.

Thus, the array device 20 splits the green laser light beams and red laser light beams respectively emitted from the light sources 28*a* and 28*b*, in a plane perpendicular to the direction from which the green laser light beam and red laser light beam are directed into the array device 20, into the following eight types of reference light beams: first phase green reference light beams corresponding to a phase of 0 and a green wavelength; second phase green reference light beams corresponding to a phase of $\pi/2$ and a green wavelength; third phase green reference light beams corresponding to a phase of $\pi$ and a green wavelength; fourth phase green reference light beams corresponding to a phase of $3\pi/2$ and a green wavelength; first phase red reference light beams corresponding to a phase of 0 and a red wavelength; second phase red reference light beams corresponding to a phase of $\pi/2$ and a red wavelength; third phase red reference light beams corresponding to a phase of $\pi$ and a red wavelength; and fourth phase red reference light beams corresponding to a phase of $3\pi/2$ and a red wavelength.

Figure 13:
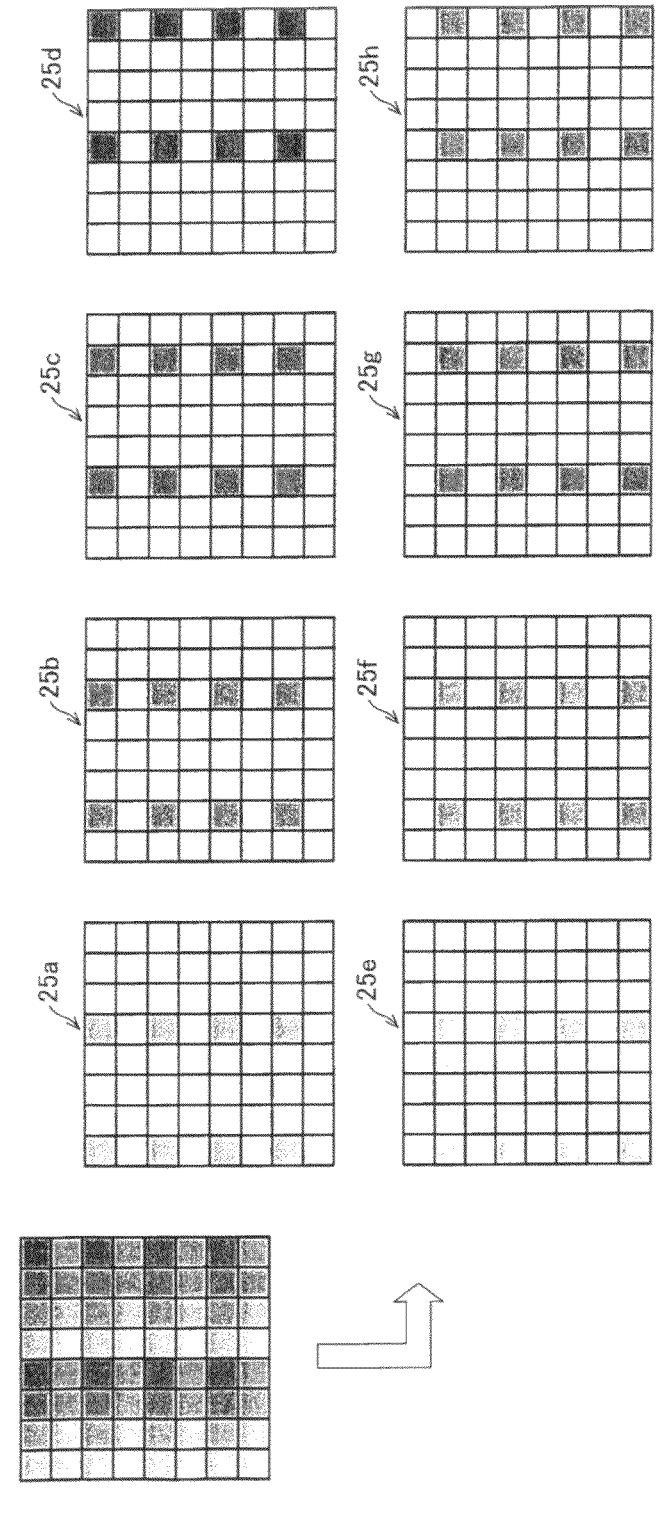
FIG. 13 is an explanatory view showing an image reconstruction algorithm of the digital holography device.

FIG. 13 is an explanatory view showing an image reconstruction algorithm of the digital holography device 1*d*. From interference fringes (i) formed by interferences between the object light beams and the first phase green reference light beams, the second phase green reference light beams, the third phase green reference light beams, the fourth phase green reference light beams, the first phase red reference light beams, the second phase red reference light beams, the third phase red reference light beams, and the fourth phase red reference light beams, and (ii) recorded on the image-capturing plane 13, pixels that are recorded with the same wavelength and the same amount of phase shift are extracted to obtain eight interference fringe patterns 25a, 25b, 25c, 25d, 25e, 25f, 25g, and 25h.

Figure 14:
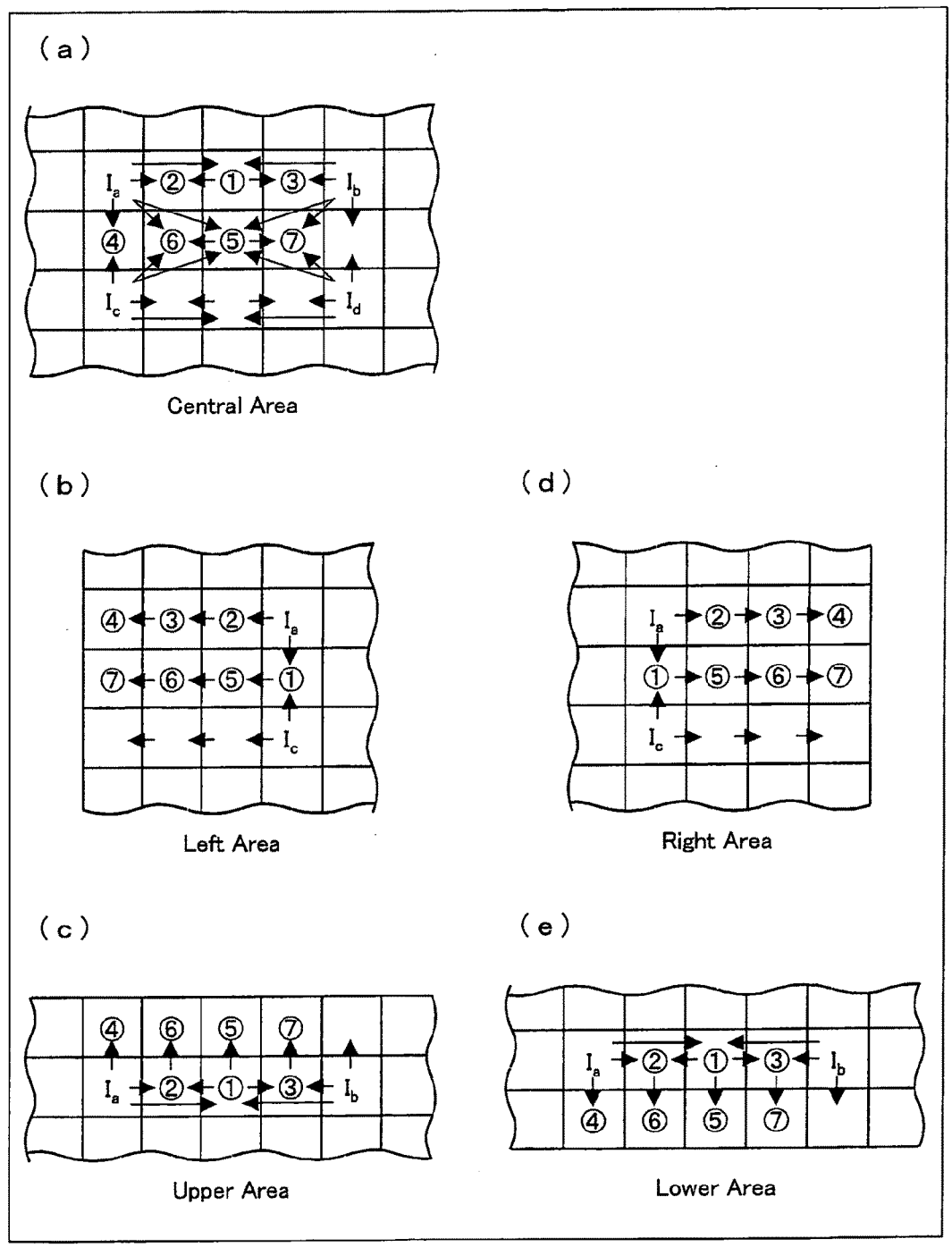
FIG. 14(a) through (e) of FIG. 14 are explanatory views showing a method of interpolating pixels in the digital holography device.

(a) through (e) of FIG. 14 are explanatory views showing a method of interpolating pixels in the digital holography device 1d. Missing pixels for each of the eight interference fringe patterns 25a through 25h are interpolated as shown in (a) through (e) of FIG. 14. For a pixel located on the perimeter of the interference fringe pattern, a value of an adjacent pixel is copied. Eight pixels as one group are interpolated in the order starting from ① to ⑦ shown in (a) through (e) of FIG. 14.

Figure 15:
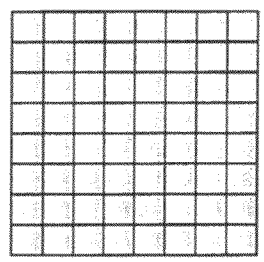
FIG. 15 is an explanatory view showing how to find complex amplitude in the digital holography device.
Figure 15:
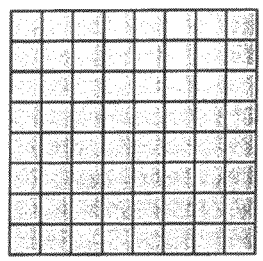
Figure 15:
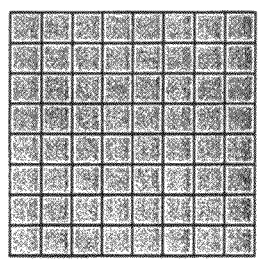
Figure 15:
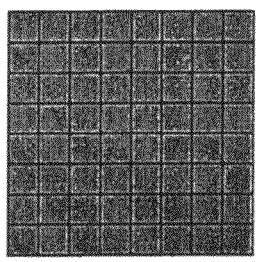
Figure 15:
Figure 15:
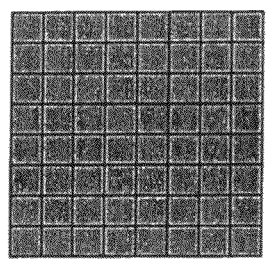

FIG. 15 is an explanatory view showing how to find complex amplitude in the digital holography device 1d. Using the eight interference fringe patterns 25a through 25h subjected to interpolation, phase shift calculations are carried out for the respective wavelengths by means of the image reconstruction device 5 to find their respective complex amplitude distributions. Then, on the basis of the complex amplitude distributions corresponding to the two wavelengths, their respective phase distributions are calculated. Next, subtraction is carried out to find differences in value between the respective pixels located at the same positions in images of the respective phase distributions for the two wavelengths. Subsequently, $2\pi$ is added to the pixels that take negative values in consequence of the subtraction.

The following describes the principle of a digital holography according to Third Embodiment. When U is complex amplitude distribution of the object, a phase distribution φ of the object is found from the complex amplitude distribution U as follows:

$$\varphi = \arctan\frac{\Im[U]}{\Re[U]}.$$

The phase distribution observed, which is found by arctan, is folded into a range of $-\pi < \phi \le \pi$. Therefore, it is impossible to obtain accurate phase distribution. To obtain accurate phase distribution, phase unwrapping is performed.

A phase unwrapping method using two wavelengths is referred to as a dual-wavelength phase unwrapping method. The principle thereof is shown below.

When phase distribution relative to a wavelength λm is φm, a corresponding surface shape $z_m$ of the object is expressed by:

$$Z_m = \frac{\varphi_m}{2\pi}\lambda_m.$$

Hereinafter, assume that the two wavelengths are λ1 and λ2 (λ1<λ2), φ1 is phase distribution for the wavelength λ1, and φ2 is phase distribution for the wavelength λ2. The difference φ₁₂ between the two phase distributions φ1 and φ2 is found by:

φ₁₂=φ₁−φ₂.

The phase difference φ₁₂ becomes $2\pi$ at the points corresponding to folding points of the phase distributions φ1 and φ2, and such points exist in large numbers. To reduce the number of points where the phase distribution difference is $2\pi$, $2\pi$ is added to the area that falls within φ₁₂<0. As a result, phase distribution φ'₁₂ obtained is expressed as follows:

$$\varphi'_{12} = \varphi_{12} + \begin{cases} 2\pi(\text{when } \varphi_{12} < 0) \\ 2\pi(\text{when } \varphi_{12} \ge 0). \end{cases}$$

The phase distribution φ'₁₂ corresponds to phase distribution obtained from a synthetic wavelength $\Lambda_{12}$ expressed by the following equation:

$$\Lambda_{12} = \frac{\lambda_1\lambda_2}{|\lambda_1 - \lambda_2|}.$$

Figure 16:
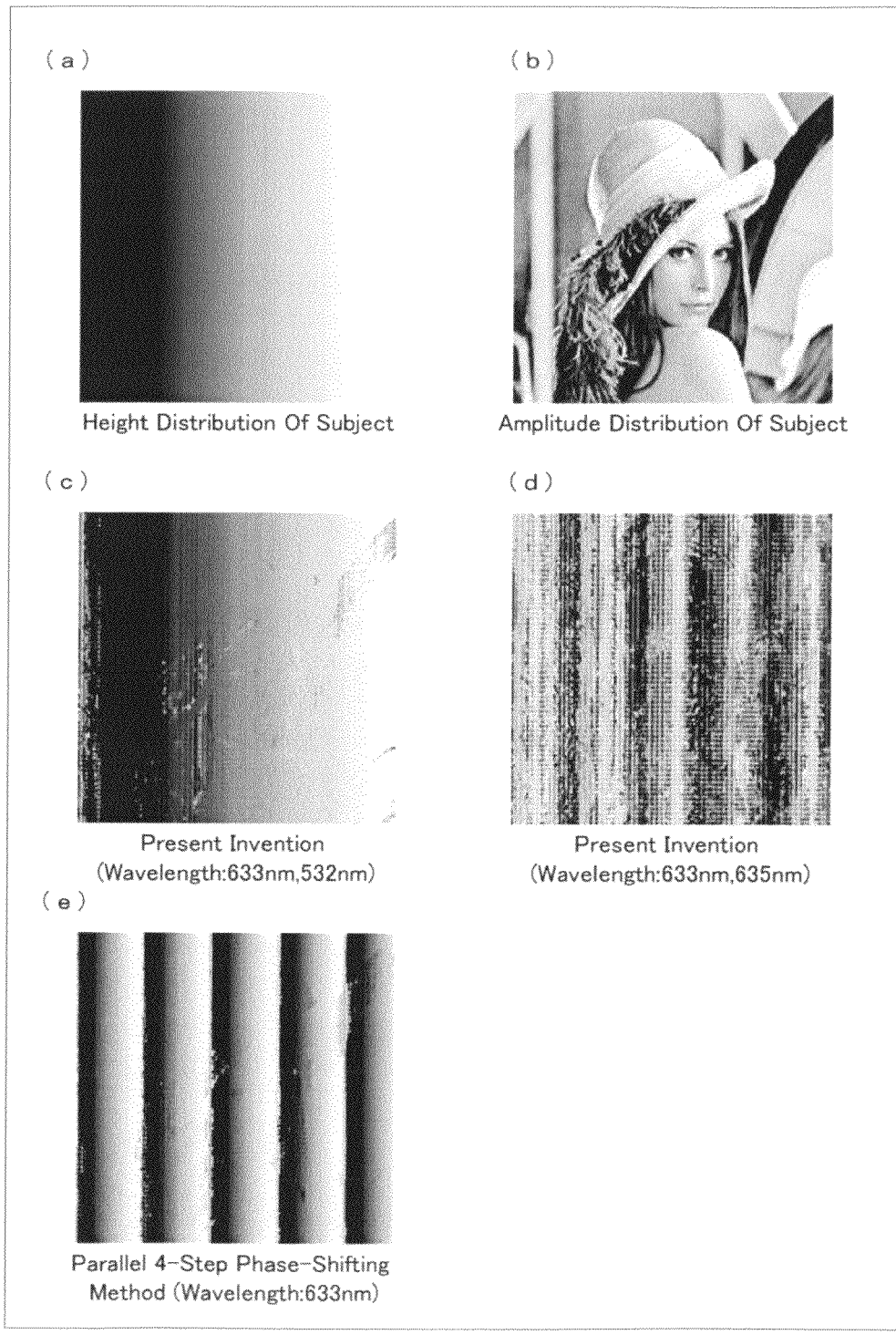
FIG. 16(a) of FIG. 16 is a view showing height distribution of the subject in the digital holography device. (b) of FIG. 16 is a view showing amplitude distribution of the subject. (c) of FIG. 16 shows the result of calculator simulation in a case where lasers operating respectively at wavelengths of 633 nm and 532 nm were used. (d) of FIG. 16 shows the result of calculator simulation in a case where lasers operating respectively at wavelengths of 633 nm and 635 nm were used. (e) of FIG. 16 shows the result of calculator simulation for the digital holography device (wavelength: 633 nm) disclosed in Patent Literature 1 as the conventional method.

(a) of FIG. 16 is a view showing height distribution of the subject 6 in the digital holography device 1d. (b) of FIG. 16 is a view showing amplitude distribution of the subject 6. (c) of FIG. 16 shows the result of calculator simulation in a case where lasers operating respectively at wavelengths of 633 nm and 532 nm were used. (d) of FIG. 16 shows the result of calculator simulation in a case where lasers operating respectively at wavelengths of 633 nm and 635 nm were used. (e) of FIG. 16 shows the result of calculator simulation for the digital holography device (wavelength: 633 nm) disclosed in Patent Literature 1 as the conventional method.

Conditions for the simulation were as follows:

distance between the object and a hologram plane (reconstruction distance): 10 cm;

wavelengths of the object light beam and the reference light beam: 633 nm and 532 nm or 633 nm and 635 nm;

pitch between the pixels in the hologram and reconstructed image: 10 μm;

the number of pixels in the hologram and reconstructed image: 512 by 512 pixels; and image reconstruction method: convolution method.

Further, a height of the subject 6 was 3 μm at the maximum. An image shown in FIG. 16 is standardized at values of 256-level gray scale where the lowest value is black (0) and the highest value is white (255).

FIGS. 16(c) through 16(e) shows the results of the calculator simulations. The laser operating at wavelengths of 633 nm and 532 nm produces a synthetic wavelength of approximately 3.3 μm. The laser operating at wavelengths of 633 nm and 635 nm produces a synthetic wavelength of approximately 200 μm.

Figure 17:
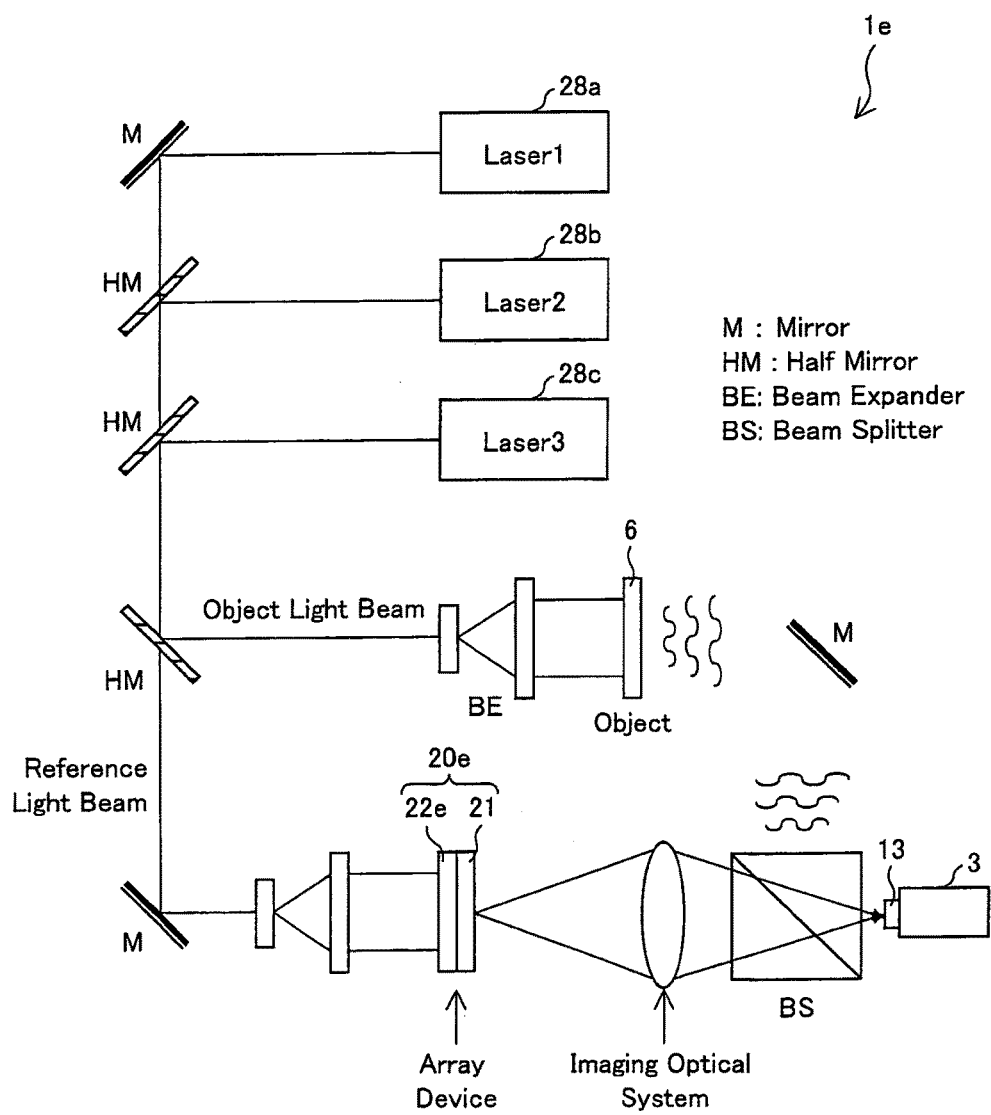
FIG. 17 is an explanatory diagram showing the configuration of another digital holography device according to Third Embodiment.

FIG. 17 is an explanatory diagram showing the configuration of a digital holography device 1e according to Third Embodiment. Components that are the same as those shown in FIG. 11 are given the same reference numerals, and detailed explanations thereof are omitted here.

The digital holography device 1e is different from the digital holography device 1d shown in FIG. 11 in that the digital holography device 1e additionally includes a light source 28c, and the digital holography device 1e is provided with an array device 20e, instead of the array device 20. The light source 28c emits blue laser light beams with a wavelength corresponding to blue.

Figure 18:
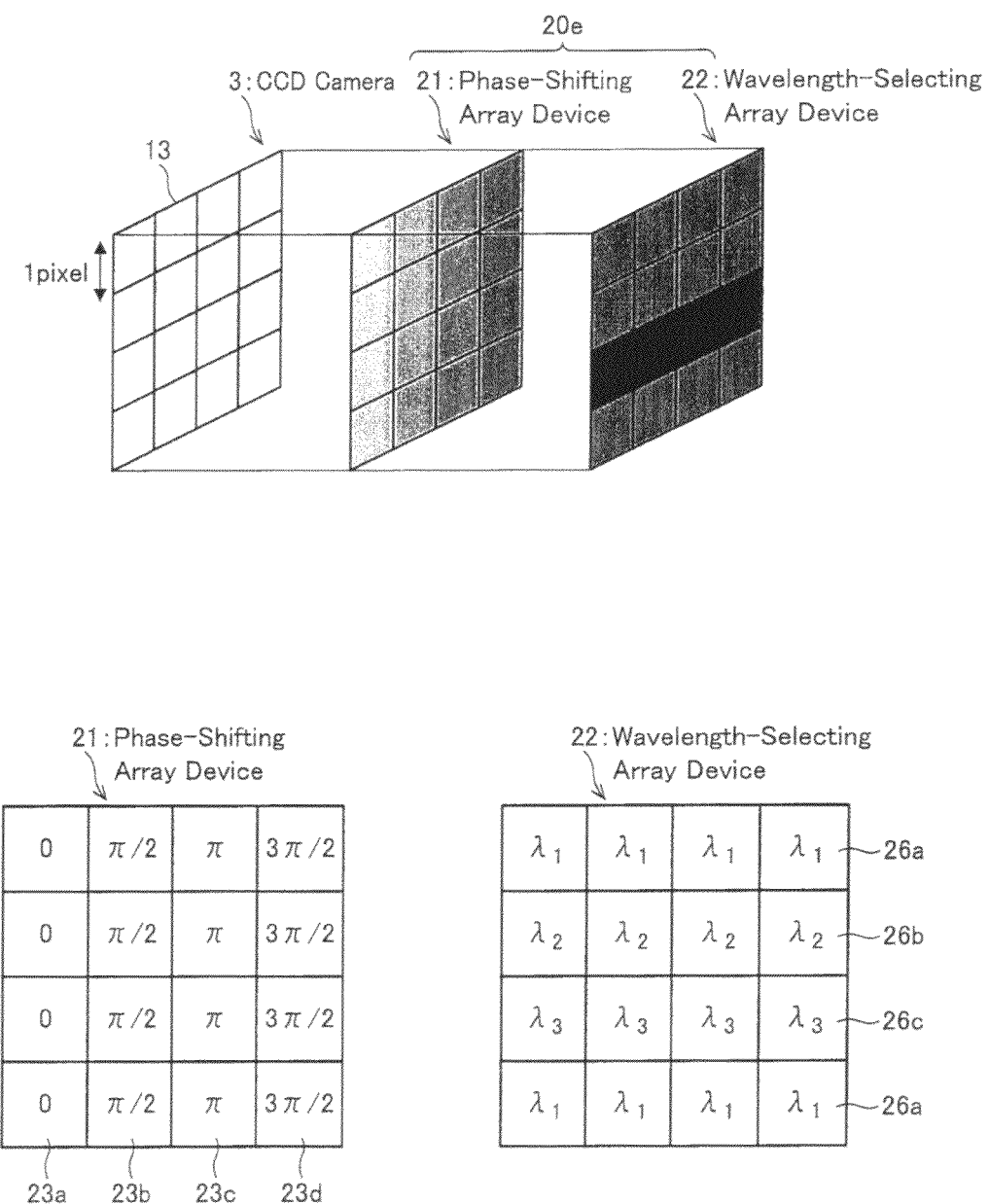
FIG. 18 is an explanatory view showing the configuration of an array device provided in the digital holography device.

FIG. 18 is an explanatory view showing the configuration of the array device 20e. The array device 20e has a phase-shifting array device 21 and a wavelength-selecting array device 22e.

The phase-shifting array device 21 has phase regions 23a corresponding to a phase of 0, phase regions 23b corresponding to a phase of $\pi/2$, phase regions 23c corresponding to a phase of $\pi$, and phase regions 23d corresponding to a phase of $3\pi/2$, all of which regions are arranged in a stripe manner along a first direction perpendicular to a direction from which the green laser light beam, the red laser light beam, and the blue laser light beam are directed into the array device 20e.

The wavelength-selecting array device 22e has wavelength regions 26a that transmit the green laser light beams with a wavelength corresponding to green, wavelength regions 26b that transmit the red laser light beams with a wavelength corresponding to red, and wavelength regions 26c that transmit the blue laser light beams with a wavelength corresponding to blue, all of which regions are arranged in a stripe manner along a direction orthogonal to the first direction. The phase regions 23a, 23b, 23c, and 23d and the wavelength regions 26a, 26b, and 26c are arranged corresponding to respective pixels of the CCD camera 3.

Figure 19:
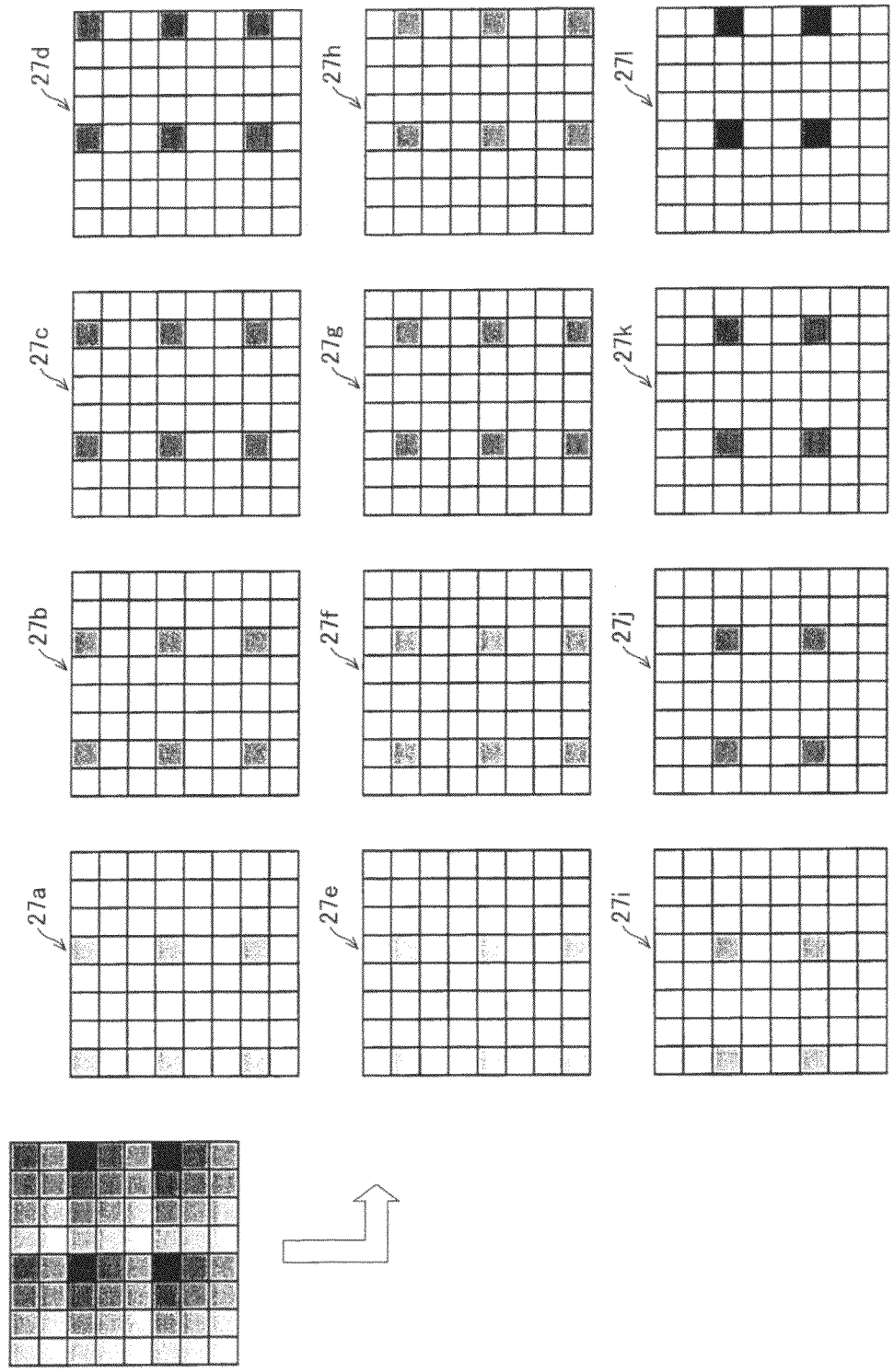
FIG. 19 is an explanatory view showing an image reconstruction algorithm of the digital holography device.

FIG. 19 is an explanatory view showing an image reconstruction algorithm of the digital holography device 1e. From an interference fringes (i) formed by interferences between the object light beams and the twelve kinds of reference light beams generated by means of the array device 20e, and (ii) recorded on the image-capturing plane 13, pixels that are recorded with the same wavelength and the same amount of phase shift are extracted to obtain twelve interference fringe patterns 27a through 27l.

Figure 20:
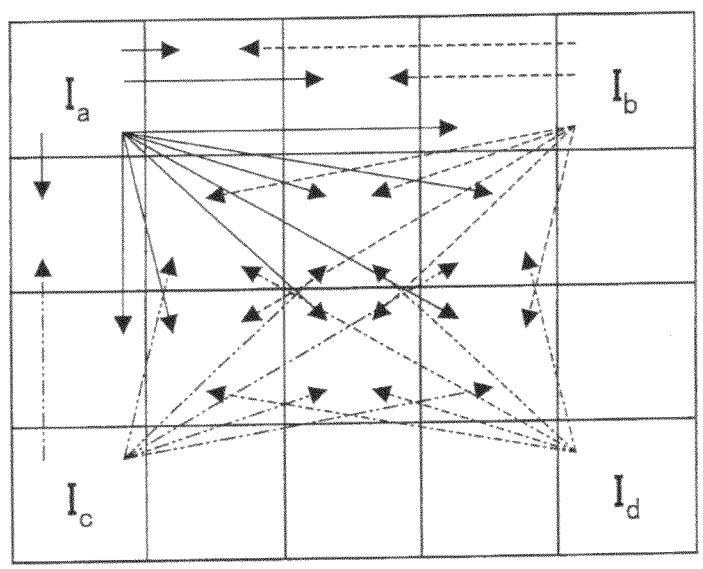
FIG. 20 is an explanatory view showing a method of interpolating pixels in the digital holography device.

FIG. 20 is an explanatory view showing a method of interpolating pixels in the digital holography device 1e. Missing pixels for each of the twelve interference fringe patterns 27a through 27l are interpolated as below. For a pixel located on the perimeter of the interference fringe pattern, a value of an adjacent pixel is copied. The interpolation is carried out by assignment of weights as follows:

Ex.) A case where a missing pixel is to be recorded from four effective pixels

Assume that there are four effective pixels A, B, C, and D, and a distance between the pixel A and a missing pixel is a, a distance between the pixel B and the mixing pixel is b, a distance between the pixel C and the missing pixel is c, and a distance between the pixel D and the missing pixel is d. Assuming that the missing pixel is a pixel F, a value of the pixel F is found by the following equation:

$$F = \frac{\frac{1}{a}A + \frac{1}{b}B + \frac{1}{c}C + \frac{1}{d}D}{\frac{1}{a} + \frac{1}{b} + \frac{1}{c} + \frac{1}{d}}.$$

Figure 21:
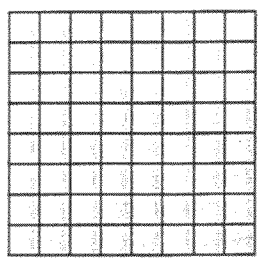
FIG. 21 is an explanatory view showing how to find complex amplitude in the digital holography device.
Figure 21:
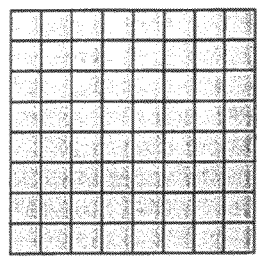
Figure 21:
Figure 21:
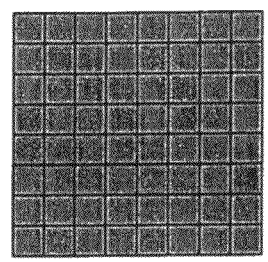
Figure 21:
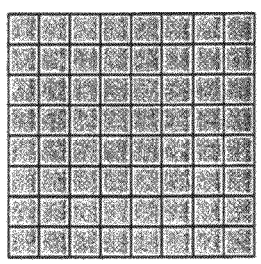
Figure 21:
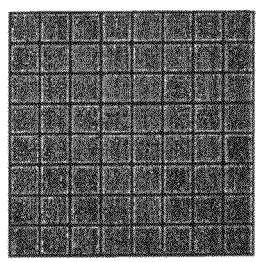

FIG. 21 is an explanatory view showing how to find complex amplitude in the digital holography device 1e. Using the twelve interference fringe patterns 27a through 27l which have been subjected to interpolation, calculations are carried out for the respective wavelengths to find their respective complex amplitude distributions by a phase shift measuring method. Then, from the complex amplitude distributions for the respective three types of wavelengths, respective phase distributions are calculated. Next, out of three wavelengths λ1, λ2, λ3 (λ2<λ3<λ1), the dual-wavelength phase unwrapping method is applied to two combinations of wavelengths, i.e. a combination of λ1 and λ3 and a combination of λ2 and λ3, so that two phase distributions are obtained. Thereafter, the dual-wavelength phase unwrapping method is further applied to the two phase distributions thus obtained.

Figure 22:
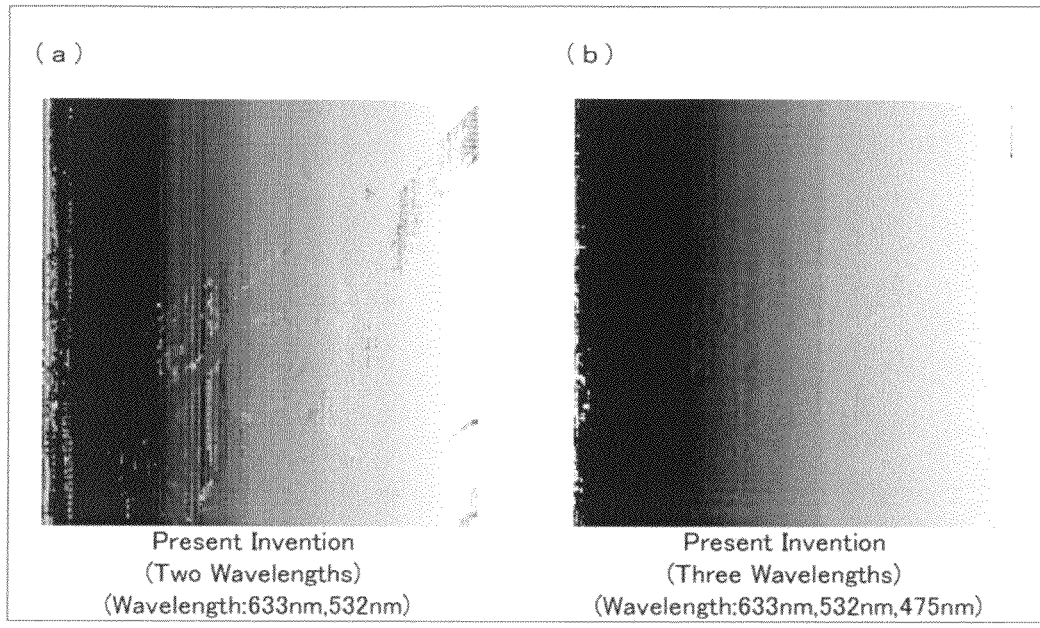
FIG. 22(*a*) of FIG. 22 is the result of calculator simulation in a case where lasers operating respectively at wavelengths of 633 nm and 532 nm were used. (*b*) of FIG. 22 shows the result of calculator simulation in a case where lasers operating respectively at wavelengths of 633 nm, 532 nm, and 475 nm were used.
Figure 23:
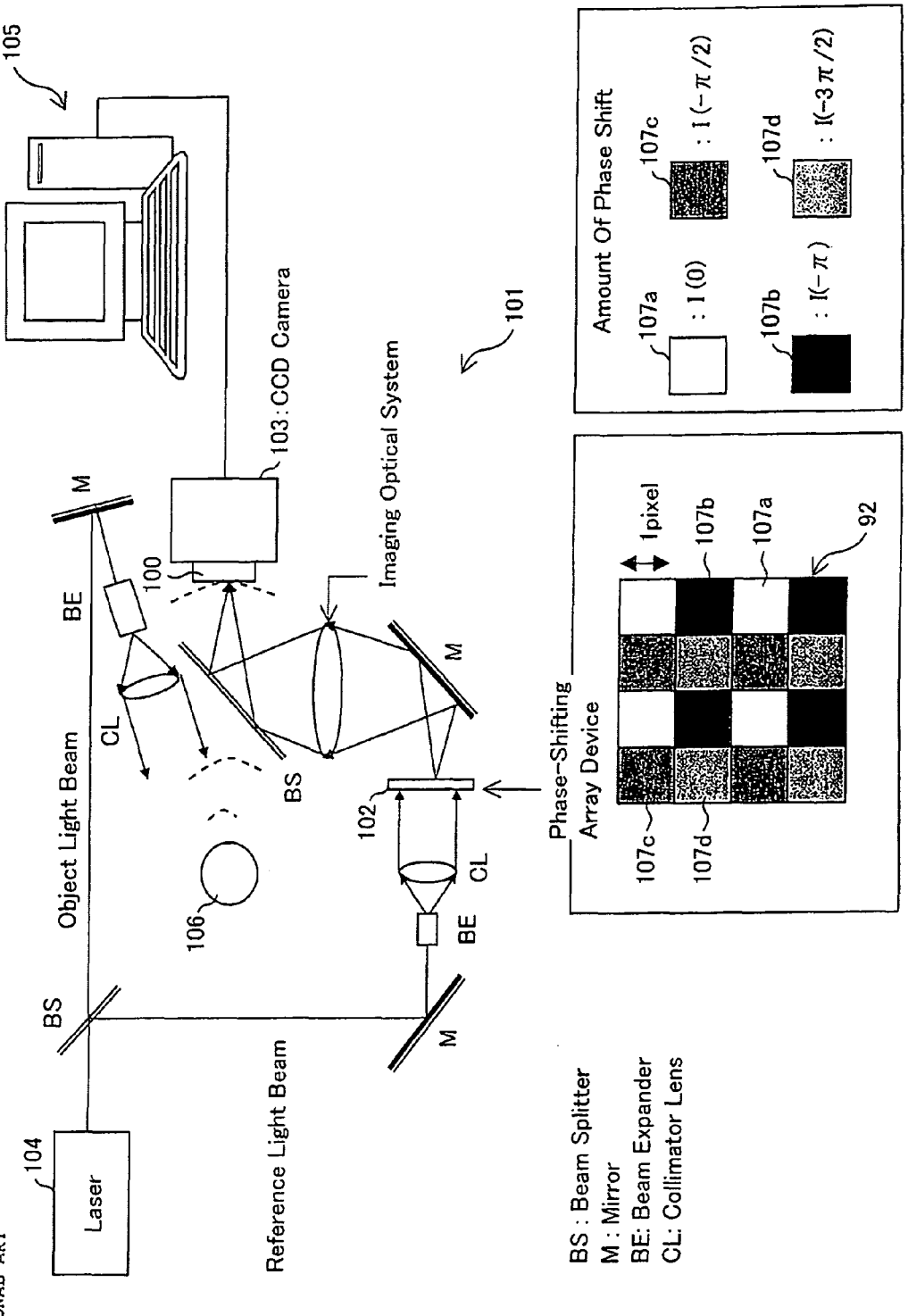
FIG. 23 is an explanatory diagram showing the configuration of a digital holography device disclosed in Patent Literature 1 as the conventional method.

(a) of FIG. 22 is the result of calculator simulation in a case where lasers operating respectively at wavelengths of 633 nm and 532 nm were used. (b) of FIG. 22 shows the result of calculator simulation in a case where lasers operating respectively at wavelengths of 633 nm, 532 nm, and 475 nm were used.

Conditions for the simulations and the subject, etc. are the same as those of the parallel dual-wavelength phase unwrapping method previously described with reference to FIG. 16. In the previously-described parallel dual-wavelength phase unwrapping method (wavelengths: 633 nm and 532 nm), a synthetic wavelength is approximately 3.3 μm. In a parallel triple-wavelength phase unwrapping method (wavelengths: 633 nm, 532 nm, and 475 nm), a synthetic wavelength is approximately 13.5 μm.

Next, the principle of a phase unwrapping method using three wavelengths is described. Assume that three wavelengths are λ1, λ2, and λ3 (λ2<λ3<λ1). First, the dual-wavelength phase unwrapping method is applied to a phase distribution for wavelengths λ1 and λ3 to obtain a phase distribution for a synthetic wavelength $\Lambda_{13}$. Next, the dual-wavelength phase unwrapping method is applied to a phase distribution for wavelengths λ2 and λ3 to obtain a phase distribution for a synthetic wavelength $\Lambda_{23}$. Thereafter, the dual-wavelength phase unwrapping method is applied to phase distributions for the synthetic wavelengths $\Lambda_{13}$ and $\Lambda_{23}$ to obtain a phase distribution for $\Lambda_{13\text{-}23}$.

The following derives the phase distribution for $\Lambda_{13\text{-}23}$.

The synthetic wavelengths $\Lambda_{13}$ and $\Lambda_{23}$ are given by:

$$\Lambda_{13} = \frac{\lambda_1 \lambda_3}{|\lambda_1 - \lambda_3|}, \Lambda_{23} = \frac{\lambda_2 \lambda_3}{|\lambda_2 - \lambda_3|}.$$

The synthetic wavelength for $\Lambda_{13\text{-}23}$ from the synthetic wavelengths $\Lambda_{13}$ and $\Lambda_{23}$ is calculated by:

$$\Lambda_{13-23} = \frac{\frac{\lambda_1\lambda_3}{|\lambda_1-\lambda_3|} \frac{\lambda_2\lambda_3}{|\lambda_2-\lambda_3|}}{\left|\frac{\lambda_1\lambda_3}{|\lambda_1-\lambda_3|} - \frac{\lambda_2\lambda_3}{|\lambda_2-\lambda_3|}\right|}$$

$$= \frac{\frac{\lambda_1\lambda_3\lambda_2\lambda_3}{|\lambda_1-\lambda_3||\lambda_2-\lambda_3|}}{\left|\frac{|\lambda_2-\lambda_3|\lambda_1\lambda_3 - |\lambda_1-\lambda_3|\lambda_2\lambda_3}{|\lambda_1-\lambda_3||\lambda_2-\lambda_3|}\right|}$$

$$= \frac{\frac{\lambda_1\lambda_3\lambda_2\lambda_3}{|\lambda_1-\lambda_3||\lambda_2-\lambda_3|}}{\frac{||\lambda_2-\lambda_3|\lambda_1\lambda_3 - |\lambda_1-\lambda_3|\lambda_2\lambda_3|}{|\lambda_1-\lambda_3||\lambda_2-\lambda_3|}}$$

$$= \frac{\lambda_1\lambda_3\lambda_2\lambda_3}{||\lambda_2-\lambda_3|\lambda_1\lambda_3 - |\lambda_1-\lambda_3|\lambda_2\lambda_3|}$$

$$= \frac{\lambda_1\lambda_3\lambda_2\lambda_3}{\lambda_3||\lambda_2-\lambda_3|\lambda_1 - |\lambda_1-\lambda_3|\lambda_2|}$$

$$= \frac{\lambda_1\lambda_2\lambda_3}{||\lambda_2-\lambda_3|\lambda_1 - |\lambda_1-\lambda_3|\lambda_2|} (\because \lambda_3 > 0).$$

Because $\lambda_2 < \lambda_3 < \lambda_1$, $$\Lambda_{13-23} = \frac{\lambda_1\lambda_2\lambda_3}{|(\lambda_3-\lambda_2)\lambda_1 - (\lambda_1-\lambda_3)\lambda_2|}$$

$$= \frac{\lambda_1\lambda_2\lambda_3}{|\lambda_1\lambda_3 - \lambda_1\lambda_2 - (\lambda_1\lambda_2 - \lambda_2\lambda_3)|}$$

$$= \frac{\lambda_1\lambda_2\lambda_3}{|\lambda_1\lambda_3 - \lambda_1\lambda_2 - \lambda_1\lambda_2 + \lambda_2\lambda_3|}$$

$$= \frac{\lambda_1\lambda_2\lambda_3}{|\lambda_1\lambda_3 + \lambda_2\lambda_3 - 2\lambda_1\lambda_2|}.$$

Fourth Embodiment

Figure 24:
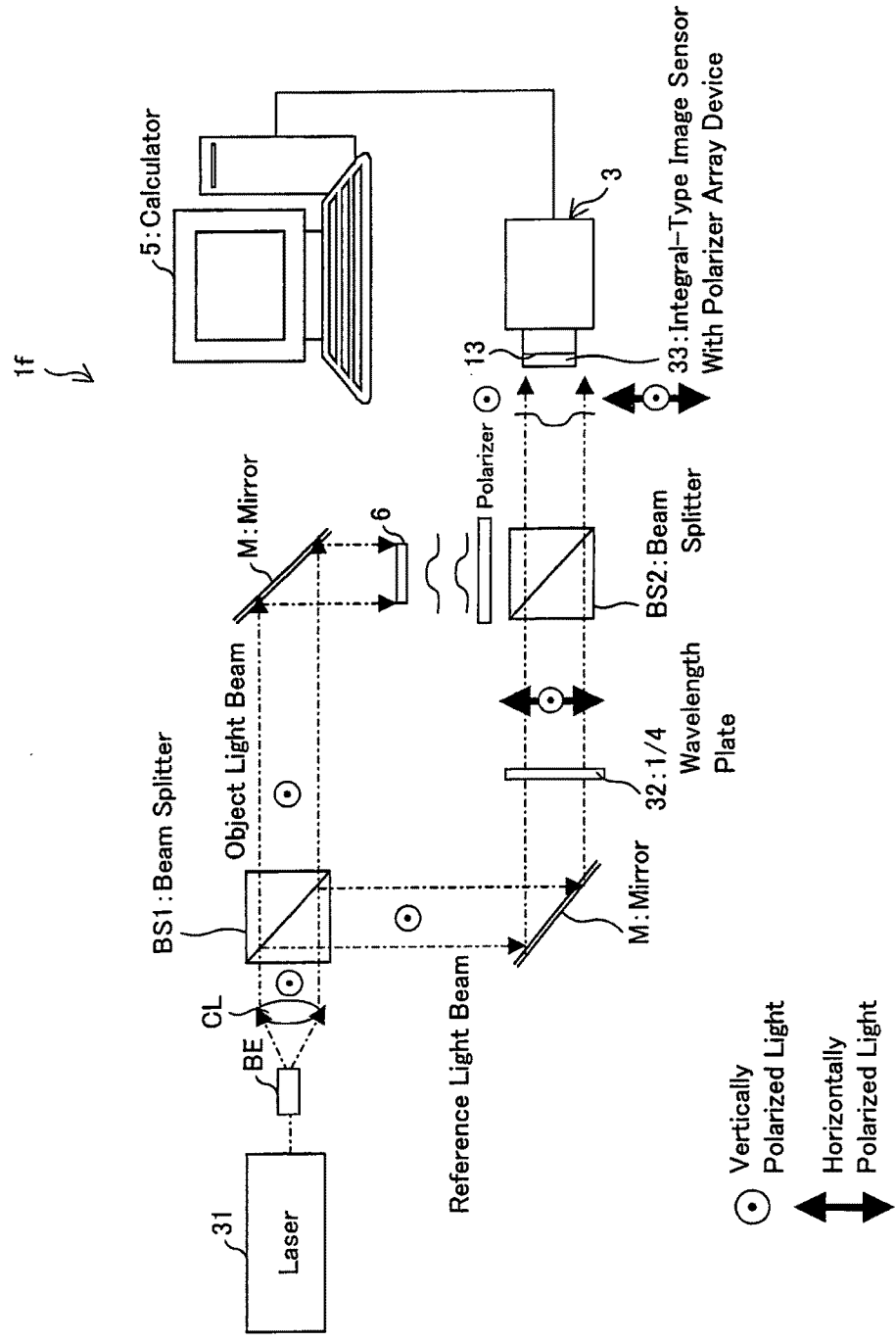
FIG. 24 is an explanatory diagram showing the configuration of a digital holography device according to Fourth Embodiment.

FIG. 24 is an explanatory diagram showing the configuration of a digital holography device 1f according to Fourth Embodiment. Components that are the same as those described previously are given the same reference numerals, and detailed explanations thereof are omitted here.

FIG. 24 is an exemplary optical system where a polarizer array device 33 is affixed onto an image-capturing plane 13 of a CCD camera 3. The following describes the optical system shown in FIG. 24. First, laser light emitted from a light source 31 is assumed to have vertically polarized light components only. The light emitted from the light source 31 passes through a beam expander BE and is collimated by an objective lens and a lens that forms collimated light (collimator lens CL) to turn into enlarged collimated light. The collimated light is split into object light beams and reference light beams by a beam splitter BS1. The object light beams are scattered from an object (subject 6), the resultant scattered light beams pass through a polarizer and a beam splitter BS2, and reach the CCD camera 3 (image sensor) that is integral with the polarizer array device 33. Meanwhile, the reference light beams pass through a ¼ wavelength plate 32 to turn into polarized light beams having vertically polarized light components and horizontally polarized light components. At this time, the reference light beams have components that are not phase-shifted and components that are phase-shifted by $-\pi/2$. Then, the reference light beams pass through the beam splitter BS2 and reach the CCD camera 3 that is integral with the polarizer array device 33.

Figure 25:
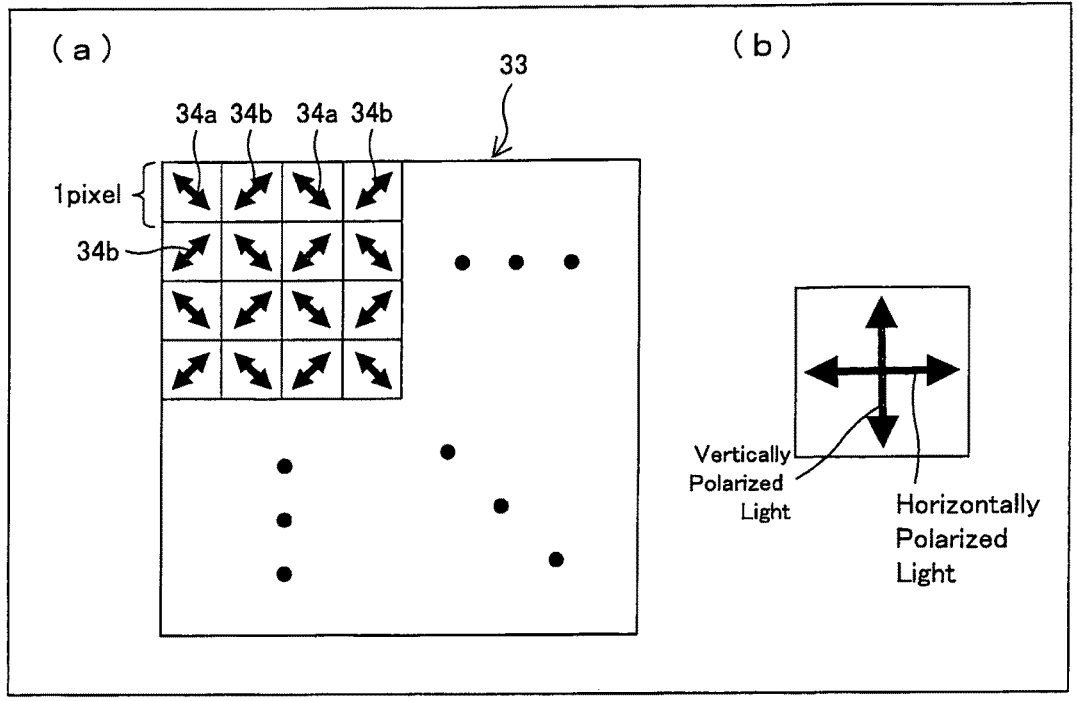
FIG. 25(*a*) of FIG. 25 is an explanatory diagram showing the configuration of a polarizer array device of the digital holography device, and (*b*) of FIG. 25 is a view showing directions of polarizations.

(a) of FIG. 25 is an explanatory diagram showing the configuration of the polarizer array device 33 of the digital holography device 1f. (b) of FIG. 25 is a view showing directions of polarizations. FIG. 25 shows a general outline of a phase-shifting array device where the polarizer array device 33 is affixed onto the image-capturing plane 13 of the CCD camera 3. In this case, the phase-shifting array device is the polarizer array device 33 as shown in FIG. 25. An arrow shown in FIG. 25 indicates that only a light beam polarized in a direction shown by the arrow in FIG. 25 can pass through the polarizer array device 33. A size of one segment of the polarizer array device 33 corresponds to a size of one pixel of the CCD camera 3, and the polarizer array device 33 is affixed onto the image-capturing plane 13 of the image sensor. The polarizer array device 33 splits the light emitted from the light source 31 into two kinds of reference light beams having different phases in a plane perpendicular to a direction in which the light emitted from the light source 31 travels.

Figure 26:
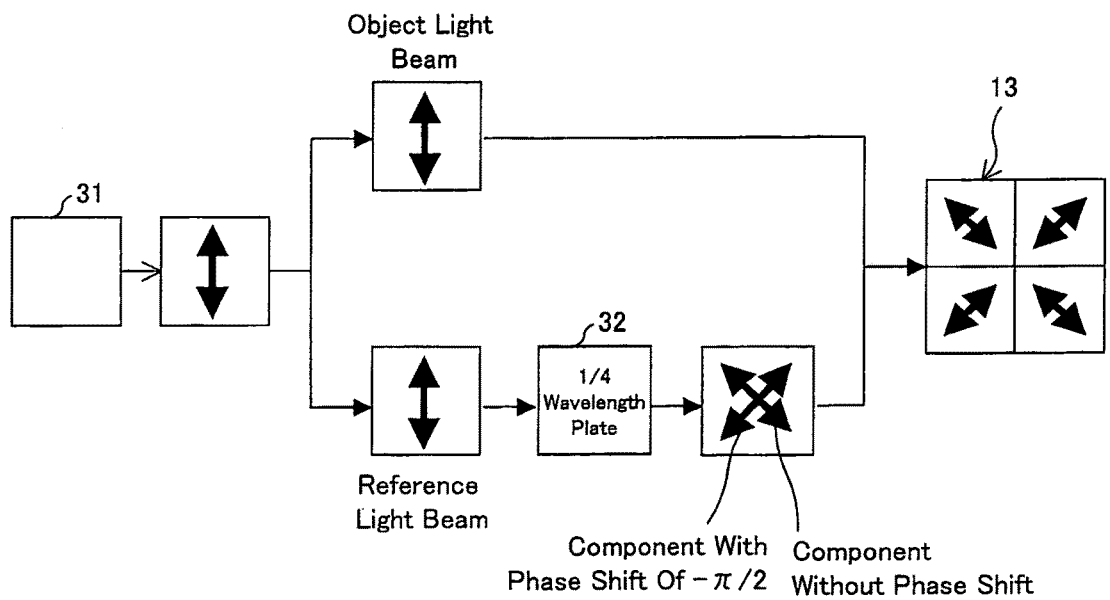
FIG. 26 is an explanatory view of changes in polarization directions in the digital holography device.

FIG. 26 is an explanatory view of changes in polarization directions in the digital holography device 1f. FIG. 26 shows changes in polarization directions of the object light beam and reference light beam in the optical system shown in FIG. 24. The object light beam is recorded on each pixel of the image-capturing plane 13 (image sensor) of the CCD camera 3, without being phase-shifted. Polarizations of the reference light beams, after passing through the ¼ wavelength plate 32, can be represented by two linear polarizations as shown in FIG. 26. One polarized reference light beam is not phase-shifted, whereas the other polarized reference light beam is phase-shifted by $-\pi/2$ by the ¼ wavelength plate 32. Then, through the polarizer array device 33 affixed onto the image-capturing plane 13, only the component that is not phase-shifted or only the component that is phase-shifted by $-\pi/2$ is recorded on each pixel.

Figure 27:
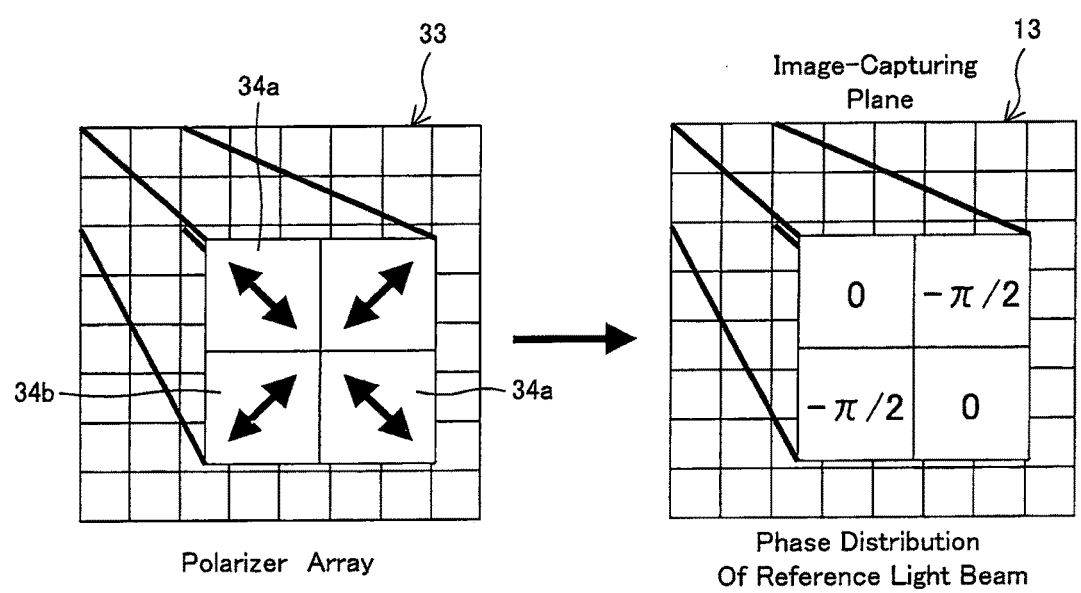
FIG. 27 is a view showing polarization directions and phase distribution of the reference light beams on an image-capturing plane of a CCD camera provided in the digital holography device.

FIG. 27 is a view showing polarization directions and phase distribution of the reference light beams on the image-capturing plane 13 of the CCD camera 3 provided in the digital holography device 1f. FIG. 27 shows polarization direction and phase distribution of the reference light beams on the image-capturing plane 13 in FIG. 26. The polarizer array device 33 is affixed onto the CCD camera 3 (image sensor), which transmits only polarized light beams determined by the polarizer array device 33. Therefore, a reference light beam with only a component that is not phase-shifted or a reference light beam with only a component that is phase-shifted by $-\pi/2$ is recorded on each pixel. Thus, the reference light beams that are phase-shifted in amounts as shown in FIG. 27 are recorded on the respective pixels. The phase of the object light beam is fixed; therefore, two kinds of interference fringe patterns are produced, one of which is such that the reference light beam is not phase-shifted, and the other of which is such that reference light beam is phase-shifted by $-\pi/2$. In this manner, information of the two interference fringe patterns are recorded by a single shot.

In this manner, the light source 31 emits light polarized in a vertical direction, and the ¼ wavelength plate 32 splits the incoming light into two kinds of reference light beams, one of which is polarized in a second direction that is inclined 45 degrees relative to the vertical direction, and the other of which is polarized in a third direction that is inclined −45 degrees relative to the vertical direction.

The polarizer array device 33, which transmits the object light beams and the two kinds of reference light beams, has regions 34a and 34b. The region 34a transmits one reference light beam polarized in the second direction and a component of the object light beam which component is orthogonally projected in the second direction. The region 34b transmits the other reference light beam polarized in the third direction and a component of the object light beam which component is orthogonally projected in the third direction.

Figure 28:
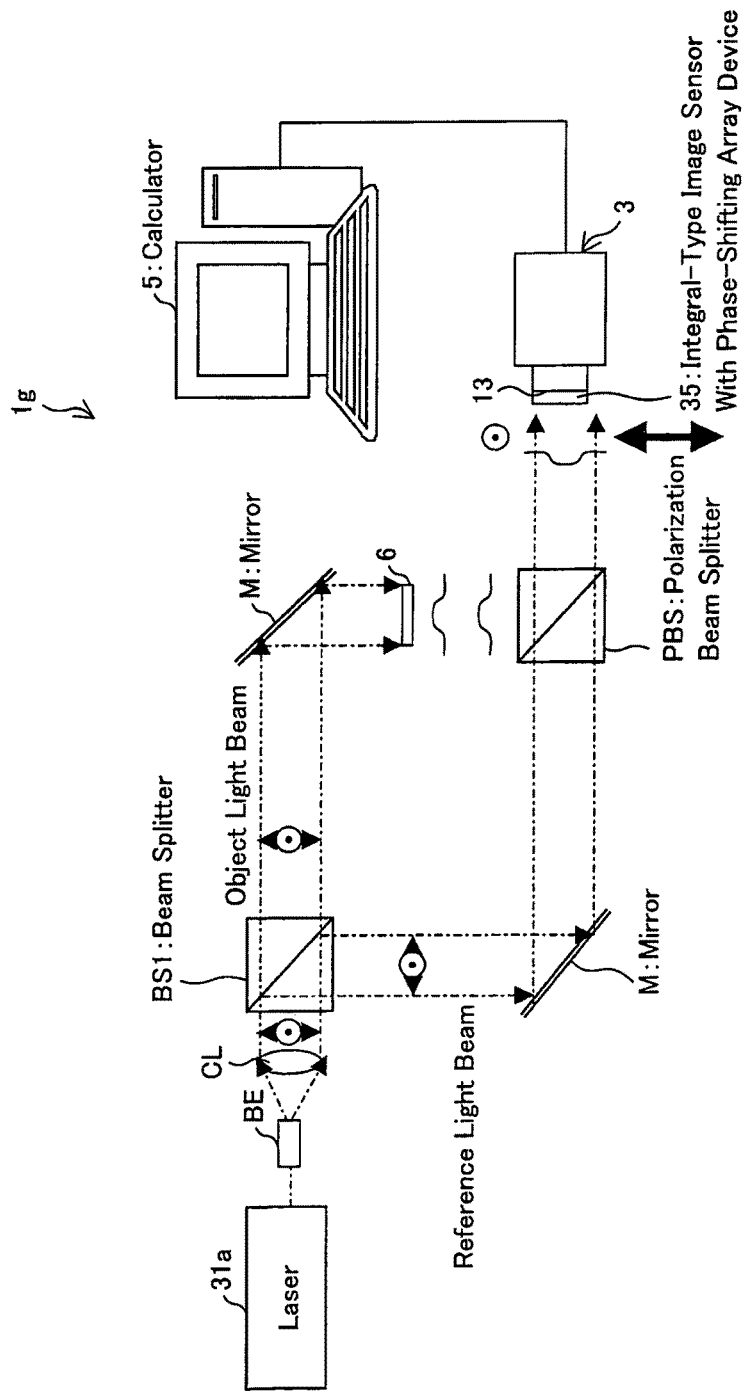
FIG. 28 is an explanatory diagram showing the configuration of another digital holography device according to Fourth Embodiment.

FIG. 28 is an explanatory diagram showing the configuration of a digital holography device 1g according to Fourth Embodiment. Components that are the same as those described previously are given the same reference numerals, and detailed explanations thereof are omitted here.

FIG. 28 shows an exemplary optical system where a phase-shifting array device 35 having a wavelength-plate optical-medium array device 36 and a polarizer 37 is affixed onto an image-capturing plane 13 of a CCD camera 3. The optical system shown in FIG. 28 will be described. First, laser light emitted from a light source 31a is assumed to be linearly polarized light having vertically polarized light components and horizontally polarized light components. The light emitted from the light source 31a is collimated by an objective lens and a lens that forms collimated light to turn into enlarged collimated light. The collimated light is split into object light beams and reference light beams by a beam splitter BS1. The object light beams are scattered from an object, the resultant scattered light beams are reflected from a polarization beam splitter PBS to turn into vertically polarized light components only, and the vertically polarized light components reach the CCD camera 3 that is integral with the phase-shifting array device 35. Note that the object light beam is not phase-shifted as it passes through the phase-shifting array device 35. Meanwhile, the reference light beams pass through the polarization beam splitter PBS to turn into horizontally polarized light components only, and the horizontally polarized light components reach the CCD camera 3 that is integral with the phase-shifting array device 35.

Figure 29:
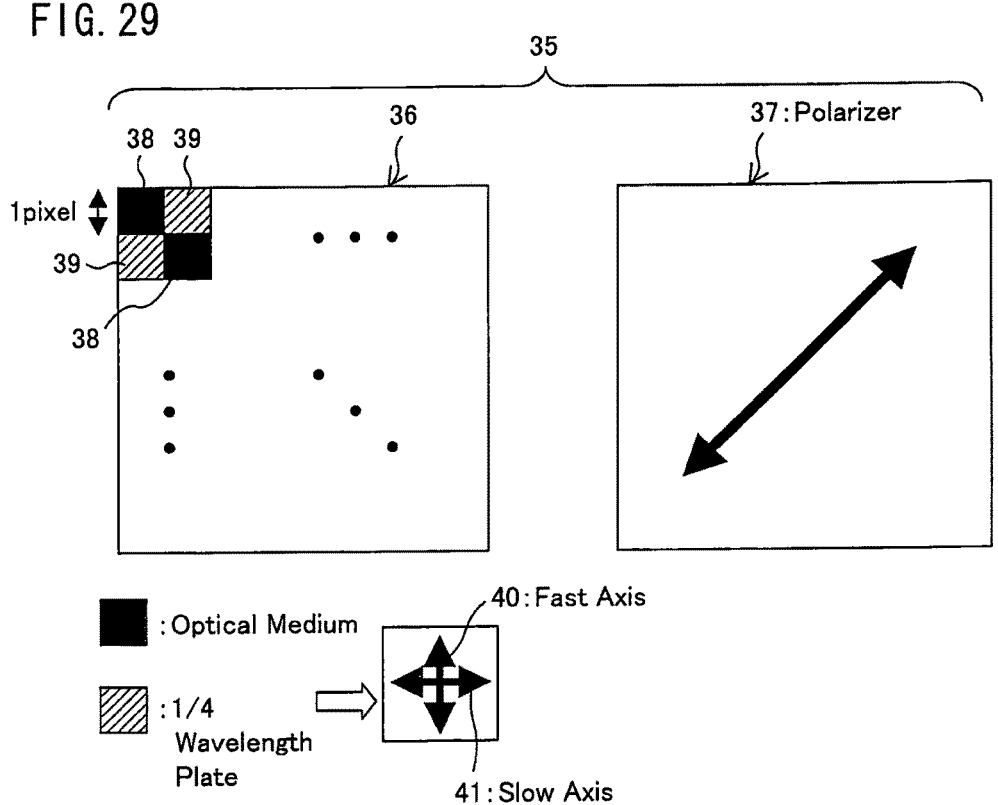
FIG. 29 is an explanatory view showing the configuration of the phase-shifting array device provided in the other digital holography device.

FIG. 29 is an explanatory view showing the configuration of the phase-shifting array device 35 which is provided in the digital holography device 1g. FIG. 29 shows a general outline of the phase-shifting array device 35 that has the wavelength-plate optical-medium array device 36 and the polarizer 37 and is affixed onto an image-capturing plane 13 of a CCD camera 3. In this case, the phase-shifting array device is constituted by the wavelength-plate optical-medium array device 36 and the polarizer 37, as shown in FIG. 29. An optical medium 38 is designed with the use of an isotropic material that has a refractive index equal to that of a fast axis 40 of a wavelength plate, has a thickness equal to that of the wavelength plate, and absorbs no light beams. The wavelength plate required in the present method is not limited to the ¼ wavelength plate 39. However, the ¼ wavelength plate 39 is used as an exemplary wavelength plate since the phase shifts in amounts of 0 and by $-\pi/2$ are described herein. Further, an arrow of the polarizer 37 shown in FIG. 29 indicates that only a light beam polarized in the direction of the arrow shown in FIG. 29 can pass through the polarizer 37. A size of one segment of the wavelength-plate optical-medium array device 36 corresponds to a size of one pixel of the image sensor of the CCD camera 3. The wavelength-plate optical-medium array device 36 and the polarizer 37 are affixed onto the image-capturing plane 13 of the CCD camera 3.

Figure 30:
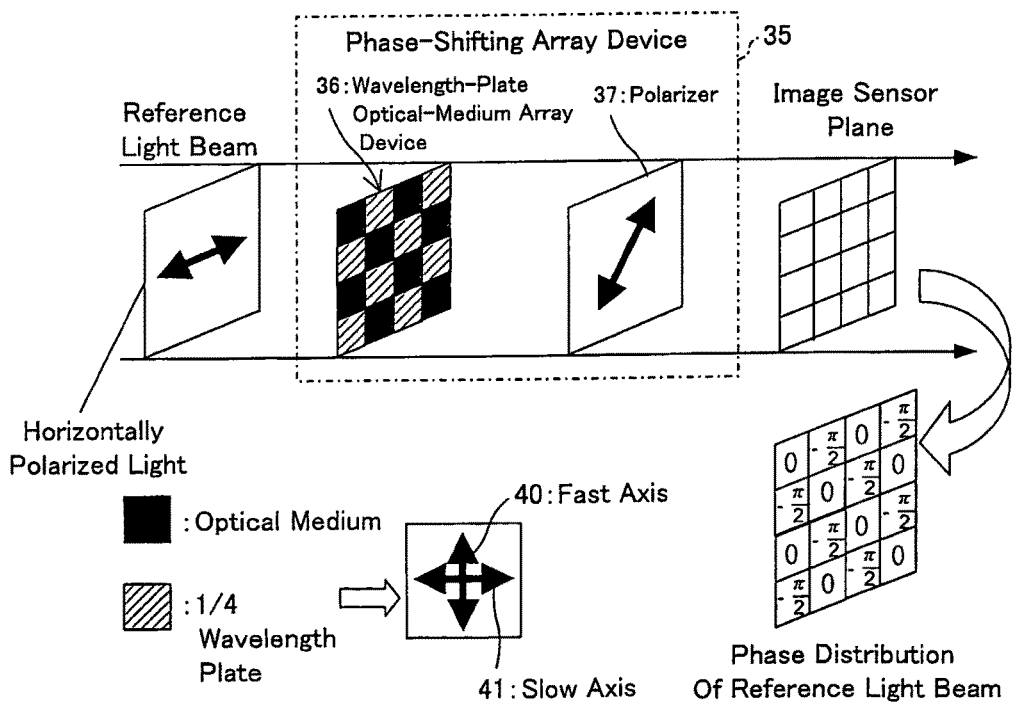
FIG. 30 is an explanatory view showing phase shifting of the reference light beam and changes in polarization direction of the reference light beam in the phase-shifting array device.

FIG. 30 is an explanatory view showing phase shifting of the reference light beam and changes in polarization direction of the reference light beam in the phase-shifting array device 1g, and shows phase shifting of the reference light beam directing from the polarization beam splitter PBS toward the image-capturing plane 13 of the CCD camera 3. The reference light beams having horizontally polarized light components only are phase-shifted by $-\pi/2$ as they pass through wavelength plates (¼ wavelength plates 39) provided in the wavelength-plate optical-medium array device 36 and each having a fast axis 40 and a slow axis 41. Thereafter, the reference light beams pass through the polarizer 37, so that the reference light beams polarized in a fixed direction and having phases of two levels are recorded on the image-capturing plane 13.

Figure 31:
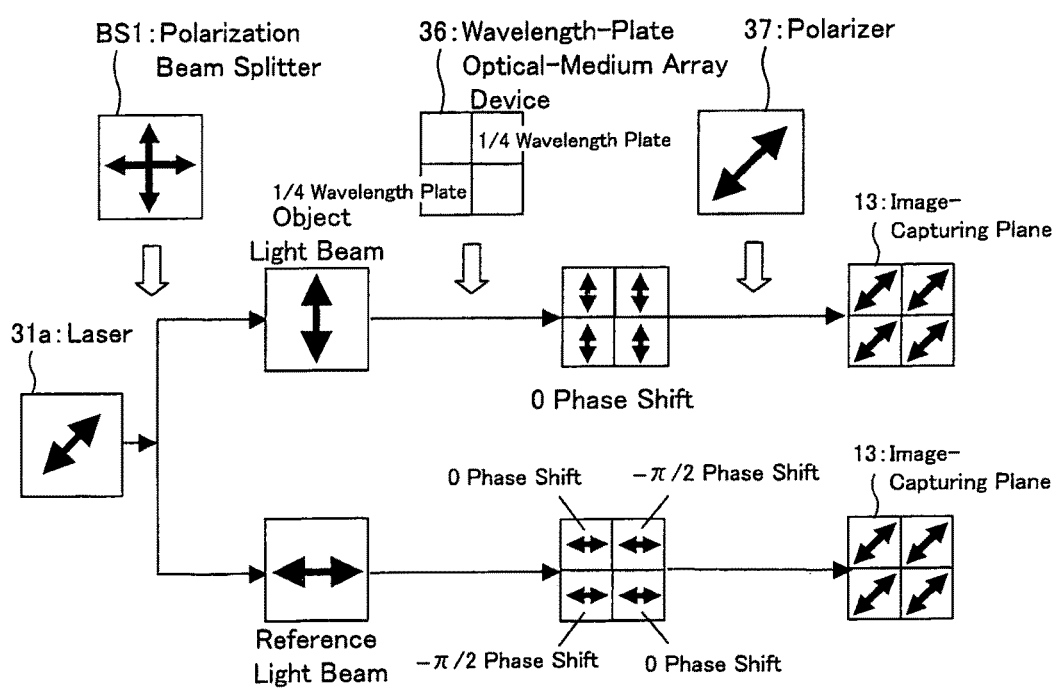
FIG. 31 is an explanatory view showing changes in phase and polarization direction of the object light beam and reference light beam in each element of the other digital holography device.

FIG. 31 is an explanatory view showing changes in phase and polarization direction of the object light beam and reference light beam in each element of the digital holography device 1g. The linearly polarized light having vertically polarized light components and horizontally polarized light components, emitted from the light source 31a (laser), passes through the polarization beam splitter BS1, so that the object light beam is turned into vertically polarized or horizontally polarized light components only. The reference light beams are turned into only components polarized vertically to the object light beams, before directing toward the CCD camera 3 that is integral with the phase-shifting array device 35. If the fast axis 40 and the slow axis 41 of the wavelength plate are the ones as shown in FIG. 29, the object light beams are vertically polarized light beams, and the reference light beams are horizontally polarized light beams. When passing through the wavelength-plate optical-medium array device 36, the object light beams are not phase-shifted in any of the segments in the wavelength-plate optical-medium array device 36. Then, when passing through the polarizer 37, the object light beams are polarized in a direction shown in FIG. 31 and recorded on each pixel of the image-capturing plane 13. The reference light beams having passed through the wavelength plate (¼ wavelength plate 39) of the wavelength-plate optical-medium array device 36 are phase-shifted by $-\pi/2$, and pass through the polarizing plate 37, so that the reference light beams polarized in the direction shown in FIG. 31 are recorded. On the image-capturing plane 13, interferences occur between the object light beams and the reference light beams due to a match in polarization direction therebetween, and information of two interference fringe patterns are recorded by a single shot.

In this manner, the light source 31a emits linearly polarized light having vertically polarized light components and horizontally polarized light components. Besides, the polarization beam splitter PBS is provided which converts the object light beams into light beams having vertically polarized light components and converts the reference light beams into light beams having horizontally polarized light components. The phase-shifting array device 35 has: the wavelength-plate optical-medium array device 36 that splits the light beams having the horizontally polarized light components into two kinds of reference light beams which have different phases in a plane perpendicular to the direction in which the light beams having the horizontally polarized light components travel; and the polarizer 37 that transmits the light components of the object light beam which components are polarized in a third direction, which are inclined $-45$ degrees relative to the vertical direction, and the light components of the two kinds of reference light beams which components are polarized in the third direction. The wavelength-plate optical-medium array device 36 has: the optical media 38 that transmit the light beams having the horizontally polarized light components; and the ¼ wavelength plates 39 that shift phases of the light beams having the horizontally polarized light components and transmit the light beams thus phase-shifted.

Fifth Embodiment

The following will describe a method for realizing image reconstruction digital holography using two interference fringe patterns that are obtained at different distances.

Figure 32:
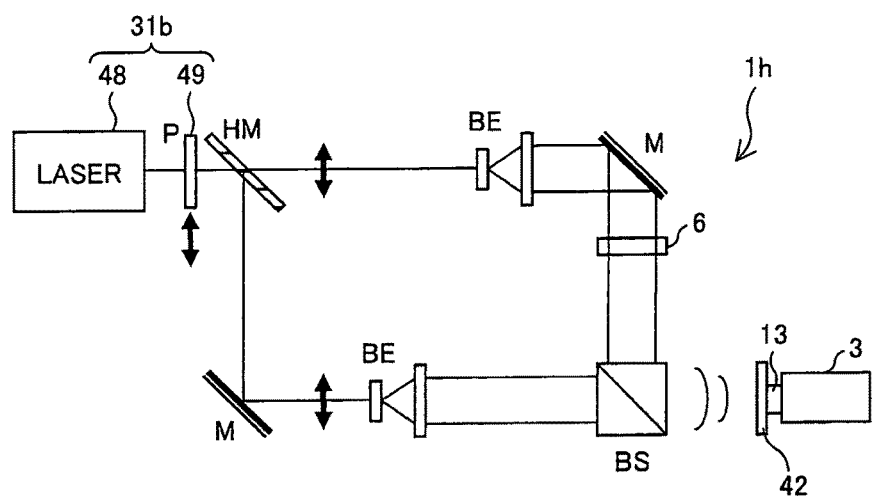
FIG. 32 is a diagram showing the configuration of a digital holography device according to Fifth Embodiment.
Figure 32:
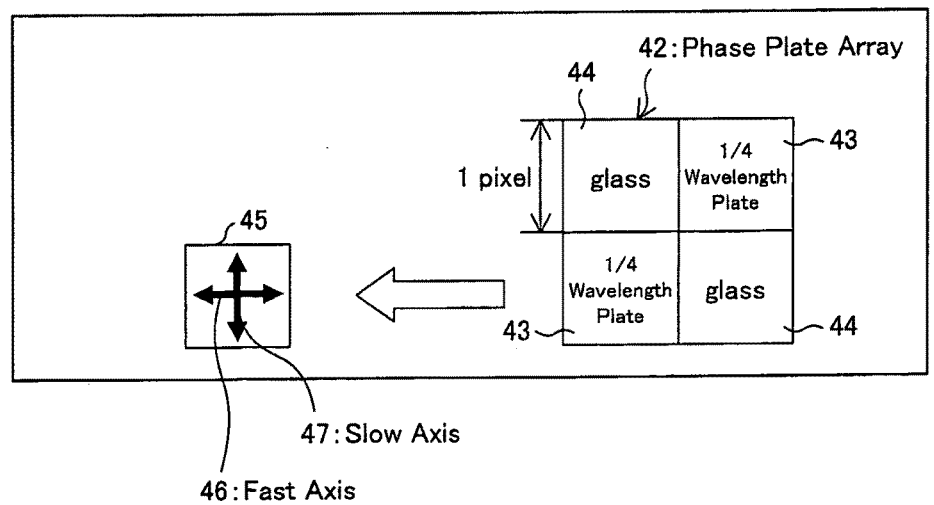

FIG. 32 is a diagram showing the configuration of a digital holography device 1h according to Fifth Embodiment. The following will describe a method for recording two interference fringe patterns using a device having phase plates arranged in an array. First, an optical system is shown in FIG. 32. Light emitted from a light source 48 enters a polarizing plate 49, which is provided immediately behind the light source 48, so that only vertically polarized light components are extracted therefrom. In such a manner that the polarization directions of the extracted vertically polarized component agree with fast axes 46 of ¼ wavelength plates 45, the ¼ wavelength plates 45 are arranged in regions 43 of a phase plate array 42, which is placed immediately in front of an image-capturing plane 13 of a CCD camera 3. The phase plate array 42 has the foregoing ¼ wavelength plates 45 and regions 44 where glasses that do not cause phase shift are provided. The foregoing ¼ wavelength plates 45 and regions 44 are arranged alternately in a checkerboard pattern so as to respectively correspond to pixels. This makes it possible to record, at one time, information of two interference fringe patterns with different phases.

The following takes two examples of the method of realizing the phase plate array 42 and production methods thereof.

[Device realization method 1: Method of realizing a ¼ wavelength plate with the use of photonic crystal]
  (1) Apply a photoresist onto glass or any other isotropic medium.
  (2) Perform exposure using a photomask which has a pattern made up of four squares arranged cyclically where upper-right and lower-left squares of the four squares transmit light but the others do not transmit light, or vice versa. Each of the squares is equal in size to the image sensor.
  (3) Perform etching to form concavities and convexities.
  (4) Form the photonic crystal in the concavities to make it function as the ¼ wavelength plate.

[Device realization method 2: Method of realizing a ¼ wavelength plate with a micro-periodic structure]
After the above steps (1) through (3), the following step (4) is carried out.

(4) Form, in the concavities, the micro periodic structure that is not greater than a wavelength of light used as a light source by structural birefringence, to make it function as the ¼ wavelength plate.

Figure 33:
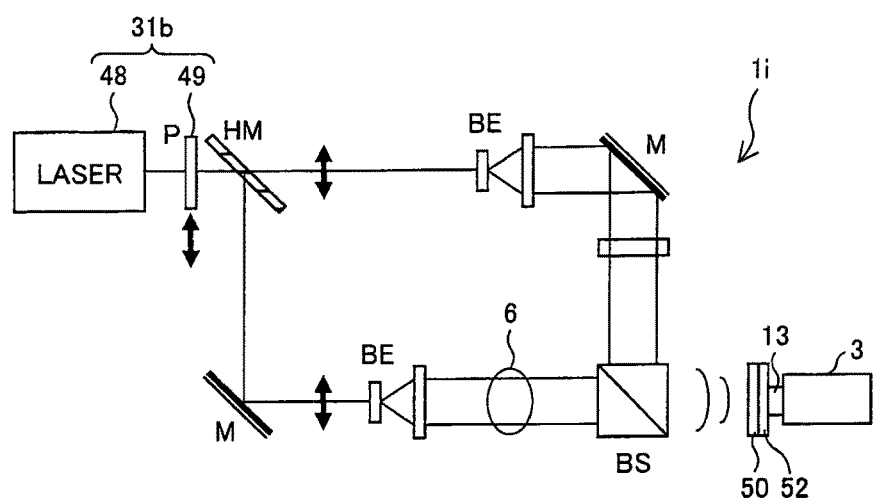
FIG. 33 is a diagram showing the configuration of another digital holography device according to Fifth Embodiment.
Figure 33:
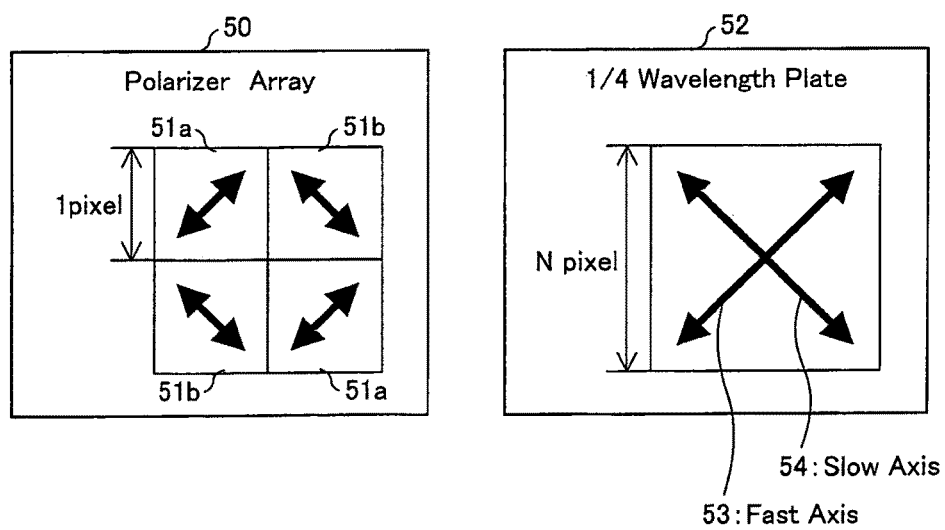

FIG. 33 is a diagram showing the configuration of a digital holography device 11 according to Fifth Embodiment. Components that are the same as those described previously are given the same reference numerals, and detailed explanations thereof are omitted here.

The following will describe how to record two interference fringe patterns using a device where polarizers are arranged in an array. First, an optical system is shown in FIG. 33. A light source unit 31b has a light source 48 and a polarizing plate 49. Light emitted from the light source 48 enters the polarizing plate 49, which is provided immediately behind the light source 48, so that only vertically polarized components are extracted therefrom. A polarizer array device 50 is placed immediately in front of an image-capturing plane 13. The polarizer array device 50 has polarizers 51a and polarizers 51b that are arranged alternately and inclined −45 degrees and +45 degrees, respectively, relative to the polarization direction of the extracted components. Immediately behind the polarizer array device 50 is arranged a ¼ wavelength plate 52 which is equal in size to the image-capturing plane 13. The ¼ wavelength plate 52 has: a fast axis 53 that agrees with such a direction that the polarizer 51a is inclined +45 degrees; and a slow axis 54 that agrees with such a direction that the polarizer 51a is inclined −45 degrees. Thus, it is possible to concurrently record both information of an interference fringe pattern with phase lag of π and information of an interference fringe pattern without phase lag.

Sixth Embodiment

Figure 34:
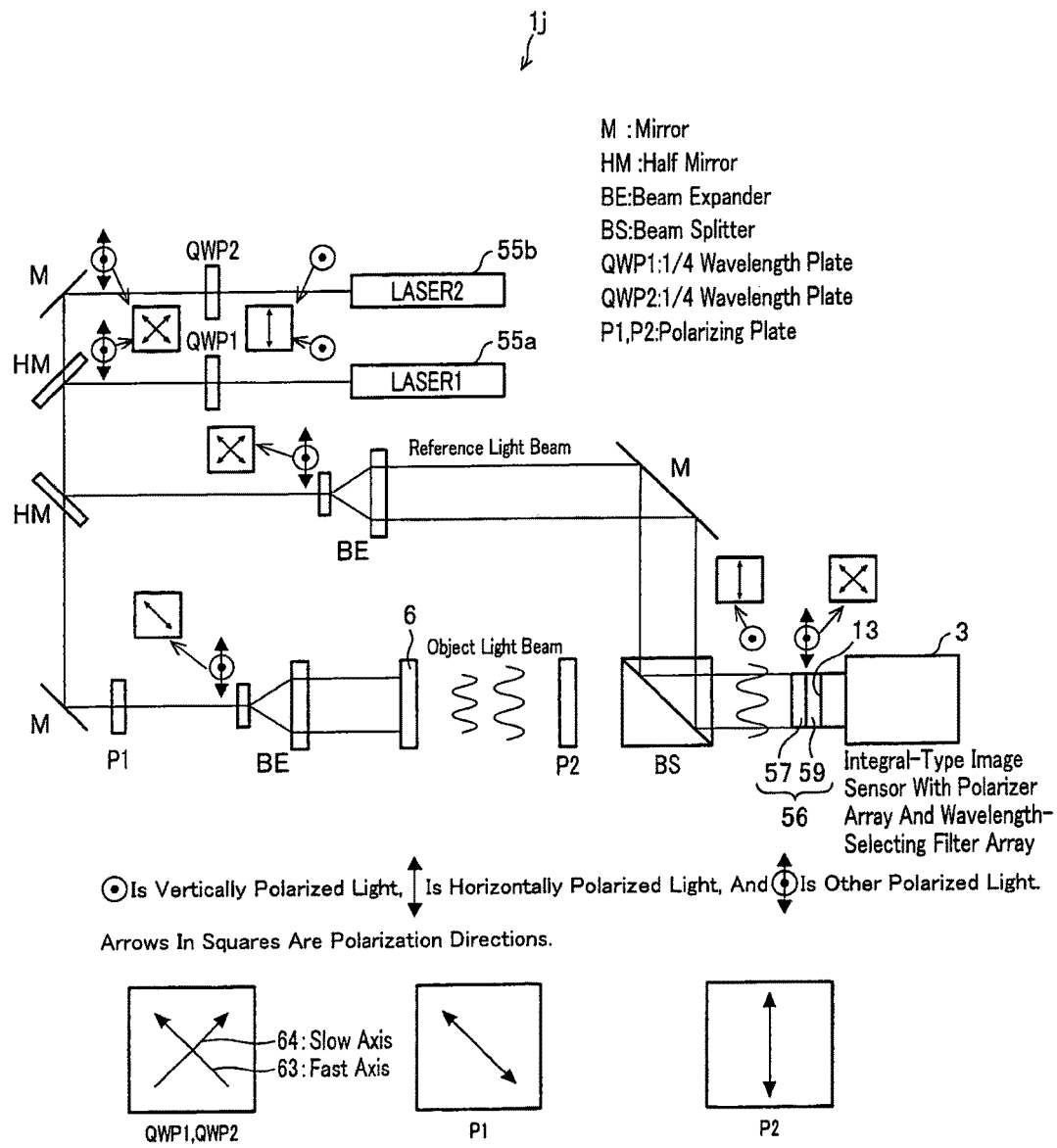
FIG. 34 is a diagram showing the configuration of a digital holography device according to Sixth Embodiment.
Figure 35:
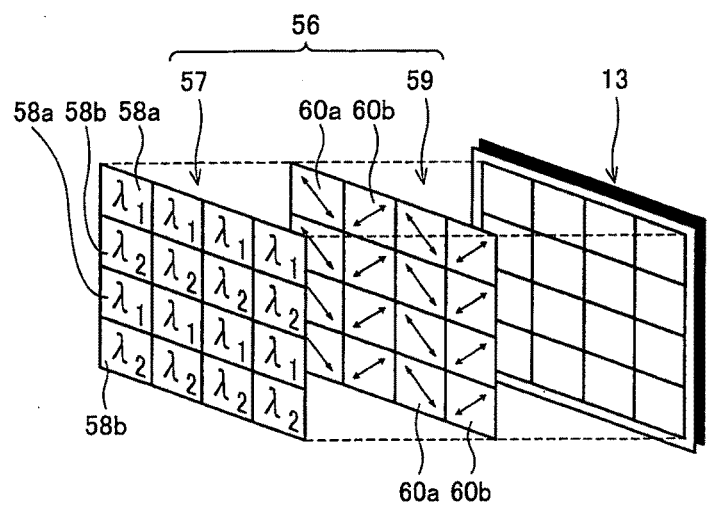
FIG. 35 is an explanatory oblique view schematically showing the configurations of a wavelength-selecting array device and a polarizer array both of which are provided in the digital holography device.
Figure 36:
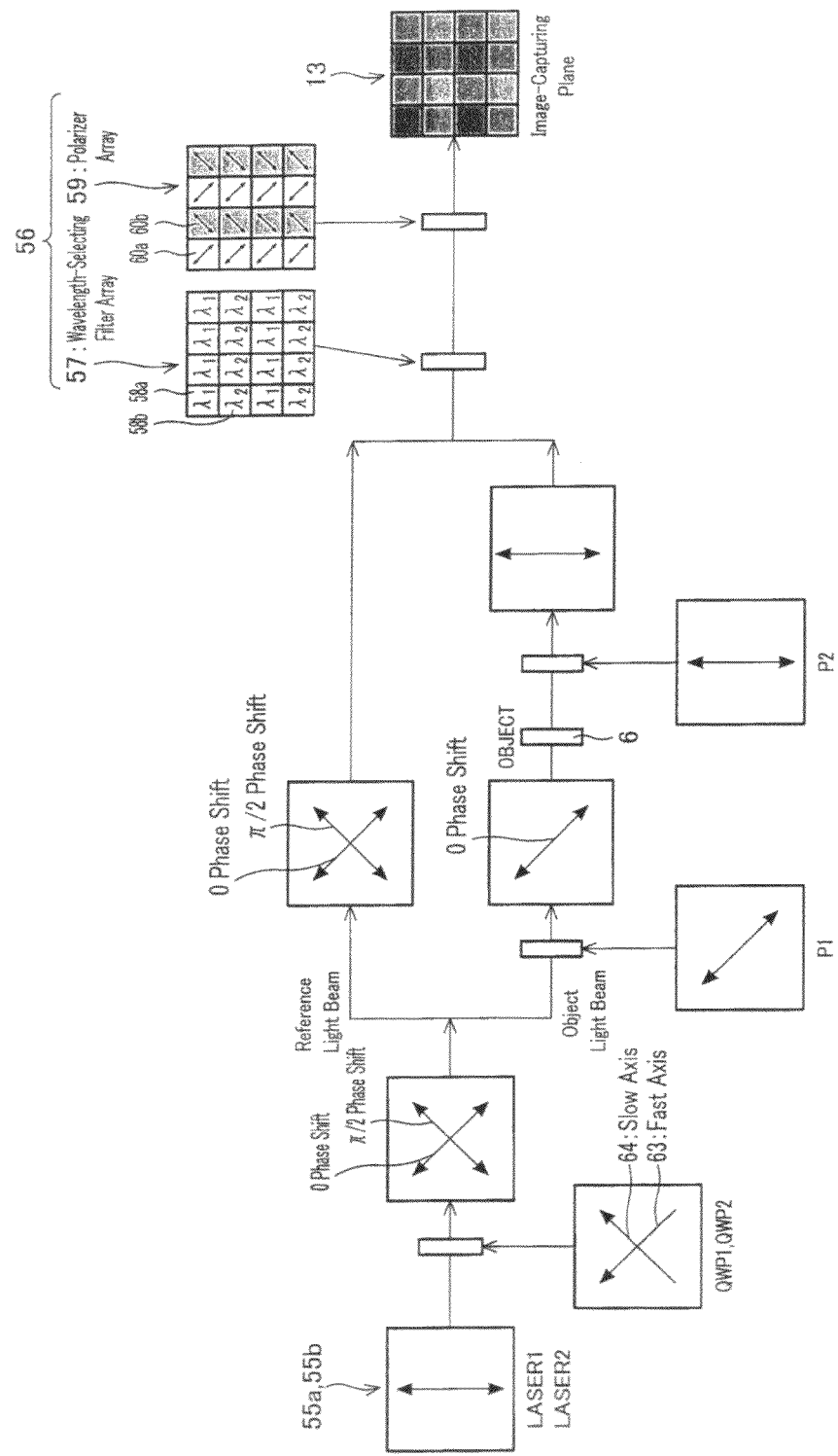
FIG. 36 is an explanatory view showing changes in polarization states in the digital holography device.

FIG. 34 is a diagram showing the configuration of a digital holography device 1j according to Sixth Embodiment. FIG. 35 is an explanatory oblique view schematically showing the configurations of a wavelength-selecting array device 57 and a polarizer array 59 both of which are provided in the digital holography device 1j. FIG. 36 is an explanatory view showing changes in polarization states in the digital holography device 1j. Components that are the same as those described previously are given the same reference numerals, and detailed explanations thereof are omitted here.

FIG. 34 shows an optical system that realizes parallel phase-shifting digital holography using two wavelengths. FIG. 35 shows the structure of an image-capturing plane 13 of a CCD camera 3 having provided therein a phase-shift wavelength-selecting element 56 that is integral with the polarizer array 59 and the wavelength-selecting array device 57. FIG. 36 shows polarization states at given stages.

Light beams with a wavelength λ1 emitted from a light source 55a (LASER 1) and light beams with a wavelength λ2 emitted from a light source 55b (LASER 2) are vertically polarized light beams. The light beams emitted from the light source 55a pass through a ¼ wavelength plate QWP1, are reflected from a first half mirror HM, and then enter a second half mirror HM to be split into reference light beams and object light beams. The light beams emitted from the light source 55b pass through a ¼ wavelength plate QWP2, are reflected from a first mirror M, pass through the first half mirror HM, and then enter the second half mirror HM to be split into reference light beams and object light beams. When the light beam passes through a slow axis 64 of the ¼ wavelength plate, a phase lag of π/2 occurs in a polarized beam of light parallel to the slow axis 64. On the other hand, no phase shift occurs in a polarized beam of light having passed through a fast axis 63 of the ¼ wavelength plate. The reference light beams are collimated, reflected from a third mirror M, reflected from a beam splitter BS, and enters the integral-type CCD camera 3.

As to the object light beams, only light beams polarized in the same direction as the polarization direction of the light beam that has passed through the fast axis 63 of the wavelength plate, pass through a polarizing plate P1, are collimated, and then pass through the subject 6. Thereafter, only vertically polarized light beams pass through a polarizing plate P2, pass through the beam splitter BS, and then enter the integral-type CCD camera 3.

Onto the image-capturing plane 13 of the integral-type CCD camera 3 are affixed the wavelength-selecting array device 57 and the polarizer array 59. The object light beams and reference light beams pass through filters of the wavelength-selecting array device 57 corresponding to their respective wavelengths. Thereafter, the object light beams pass through the polarizer array 59 as polarized light beams parallel to the slow axis 64 of the wavelength plate and polarized light beams parallel to the fast axis 63 of the wavelength plate, and interfere with the reference light beams polarized in the same direction as the polarization directions of the object light beams passing through the polarizer array 59. Then, interference fringe patterns formed by the interferences are recorded on the image-capturing plane 13, and the intensity of the interference is captured by the image sensor (CCD camera 3).

The wavelength-selecting array device 57 has arranged therein wavelength regions 58a that transmit first wavelength light beams emitted from the light source 55a and wavelength regions 58b that transmit second wavelength light beams emitted from the light source 55b. The polarizer array 59 has: fast axis transmission regions 60a that transmit polarized light beams parallel to the fast axis 63; and slow axis transmission regions 60b that transmit polarized light beams parallel to the slow axis 64.

Figure 37:
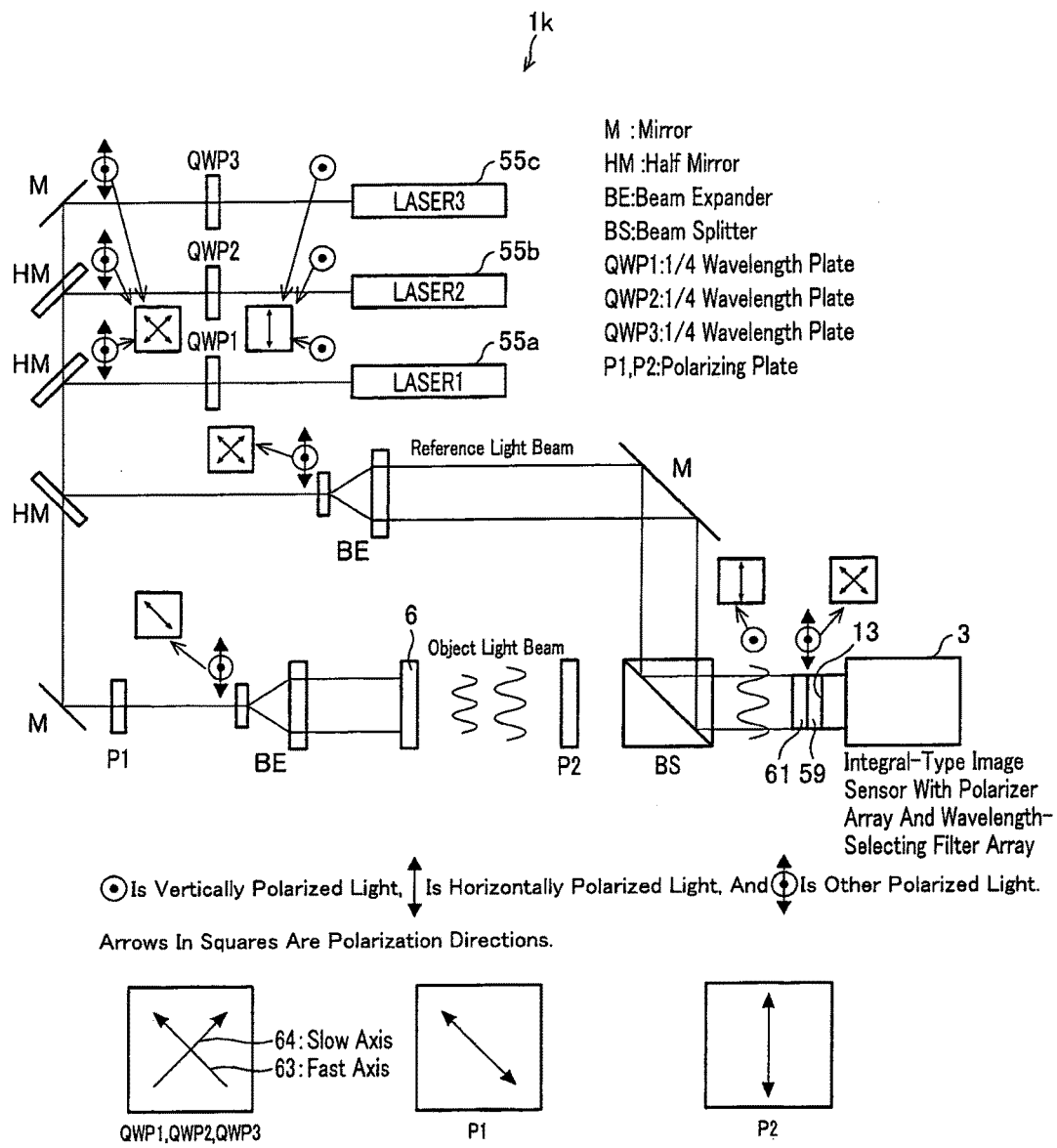
FIG. 37 is a diagram showing the configuration of another digital holography device according to Sixth Embodiment.
Figure 38:
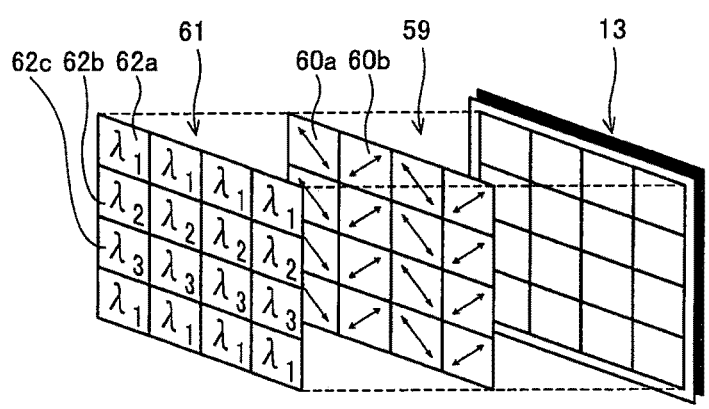
FIG. 38 is an explanatory oblique view schematically showing the configurations of a wavelength-selecting array device and a polarizer array both of which are provided in the other digital holography device.
Figure 39:
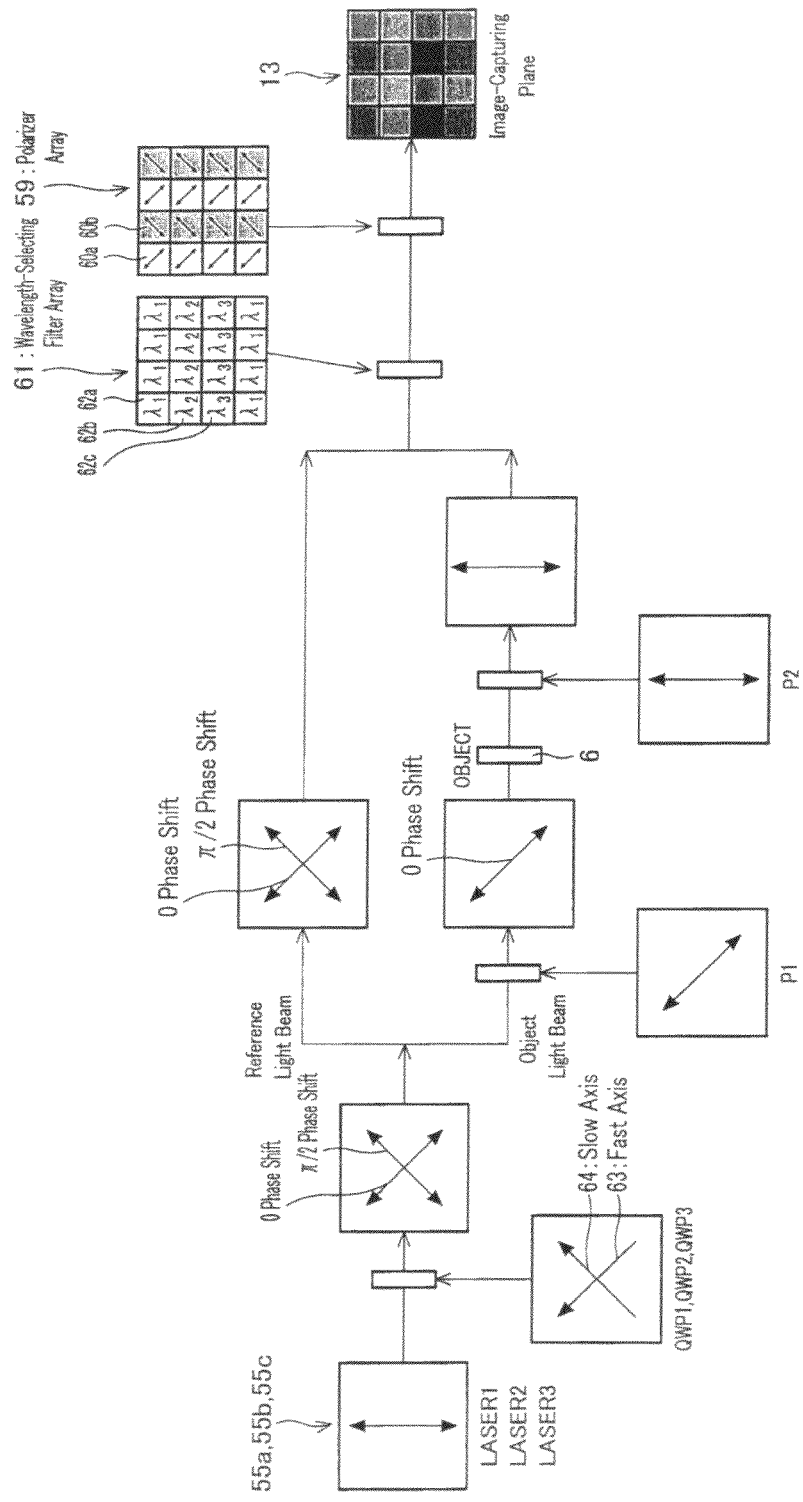
FIG. 39 is an explanatory view showing changes in polarization states in the other digital holography device.

FIG. 37 is a diagram showing the configuration of a digital holography device 1k according to Sixth Embodiment. FIG. 38 is an explanatory oblique view schematically showing the configurations of a wavelength-selecting array device 61 and a polarizer array 59 both of which are provided in the digital holography device 1k. FIG. 39 is an explanatory view showing changes in polarization states in the digital holography device 1k. Components that are the same as those described previously are given the same reference numerals, and detailed explanations thereof are omitted here.

FIG. 37 shows an optical system that realizes parallel phase-shifting digital holography using three wavelengths. FIG. 38 shows the structure of an image-capturing plane 13 of a CCD camera 3 which is integral with the polarizer array 59 and the wavelength-selecting array device 61. FIG. 39 shows polarization states at given stages. The differences from the foregoing optical system using two wavelengths are in that light source 55c (LASER 3) and ¼ wavelength plate QWP3 are additionally provided and a wavelength-selecting array device is changed (filters corresponding to a wavelength λ3 are additionally provided thereto).

Light beams with a wavelength λ1 emitted from a light source 55a (LASER 1), light beams with a wavelength λ2 emitted from a light soured 55b (LASER 2), and light beams with a wavelength λ3 emitted from a light source 55c (LASER 3) are all vertically polarized light beams. The light beams emitted from the light source 55a pass through a ¼ wavelength plate QWP1, are reflected from a first half mirror HM, and then enter a second half mirror HM to be split into reference light beams and object light beams. The light beams emitted from the light source 55*b* pass through a ¼ wavelength plate QWP2, are reflected from a third half mirror HM, pass through the first half mirror HM, and then enter the second half mirror HM to be split into reference light beams and object light beams. The light beams emitted from the light source 55*c* pass through a ¼ wavelength plate QWP3, are reflected from a first mirror M, pass through the third half mirror HM, pass through the first half mirror HM, and enter the second half mirror HM to be split into reference light beams and object light beams. When these light beams emitted from the light sources pass through slow axes 64 of the respective wavelength plates, a phase lag of π/2 occurs in polarized beams of light parallel to the slow axes 64, but no phase shift occurs in polarized beams of light having passed through fast axes 63 of the wavelength plate. The reference light beams are collimated, reflected from a third mirror M, reflected from a beam splitter BS, and enters the integral-type CCD camera 3.

As to the object light beams, only light beams polarized in the same direction as the polarization direction of the light beam that has passed through the fast axis 63 of the wavelength plate, pass through a polarizing plate P1, are collimated, and then pass through the subject 6. Thereafter, only vertically polarized light beams pass through a polarizing plate P2, pass through the beam splitter BS, and then enter the integral-type CCD camera 3.

Onto the integral-type CCD camera 3 are affixed the wavelength-selecting array device 61 and the polarizer array 59. The object light beams and reference light beams pass through filters of the wavelength-selecting array device 61 corresponding to their respective wavelengths. Thereafter, the object light beams pass through the polarizer array 59 as polarized light beams parallel to the slow axis 64 of the wavelength plate and polarized light beams parallel to the fast axis 63 of the wavelength plate, and interfere with the reference light beams polarized in the same direction as the polarization directions of the object light beams passing through the polarizer array 59. Then, the intensity of the interference is captured by the image sensor CCD camera 3).

Figure 40:
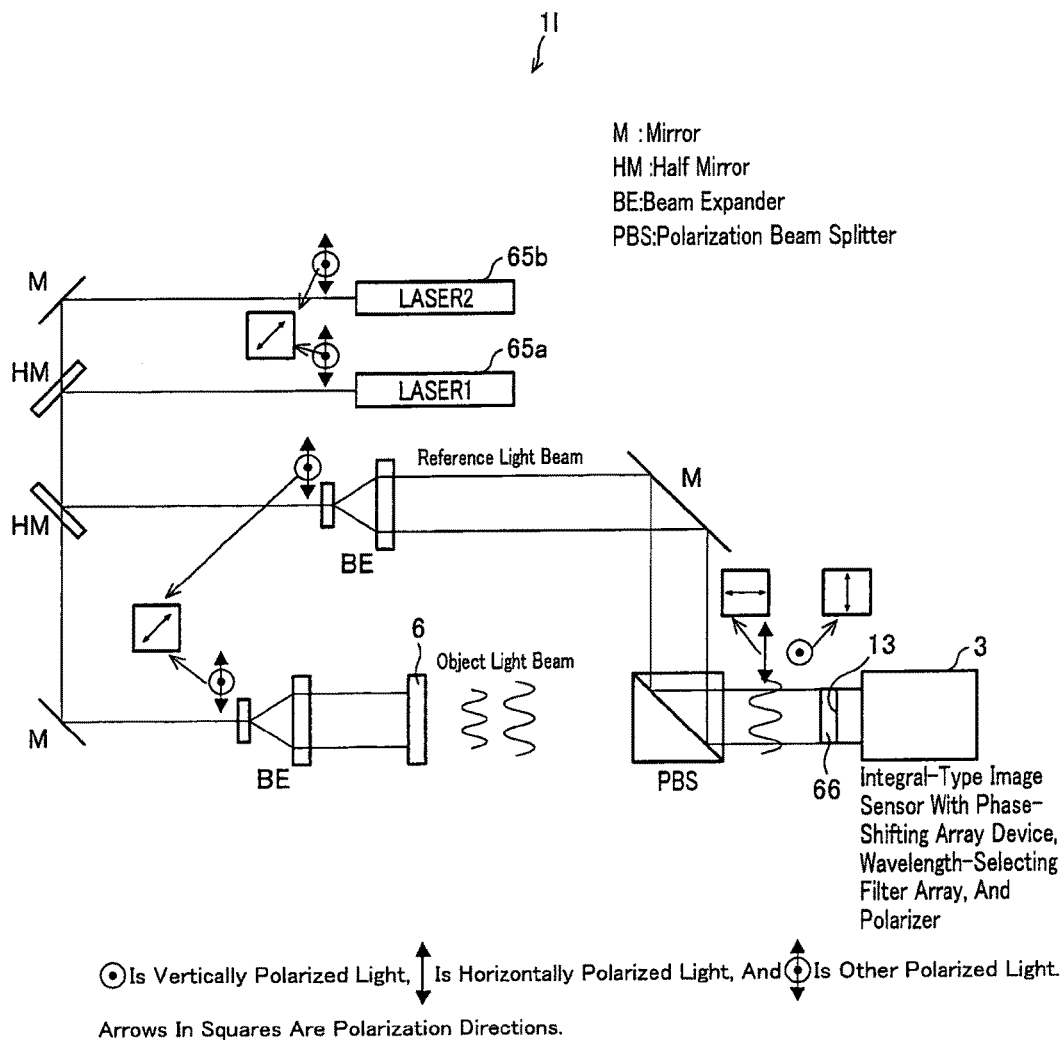
FIG. 40 is a diagram showing the configuration of still another digital holography device according to Sixth Embodiment.
Figure 41:
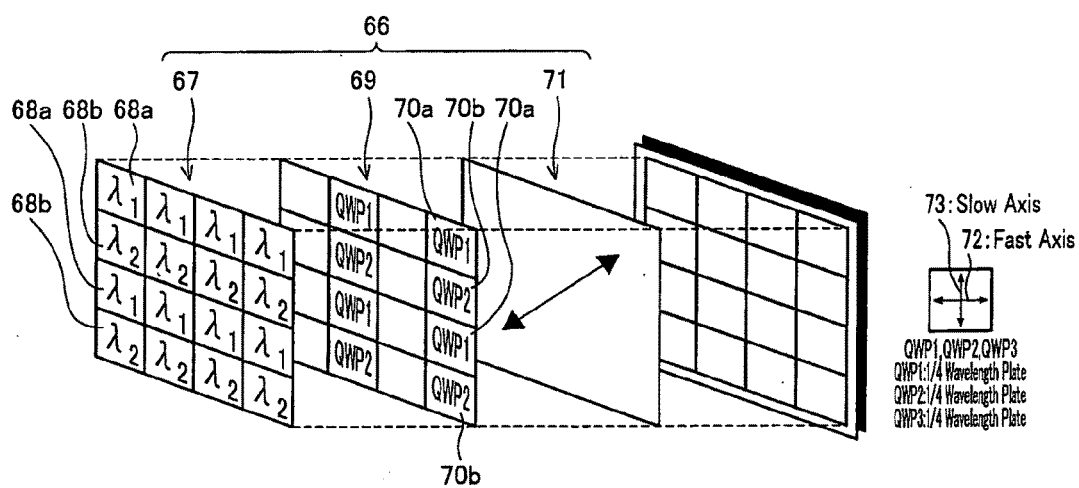
FIG. 41 is an explanatory oblique view schematically showing the configurations of a phase-shifting wavelength-selecting element provided in the still other digital holography device 11.
Figure 42:
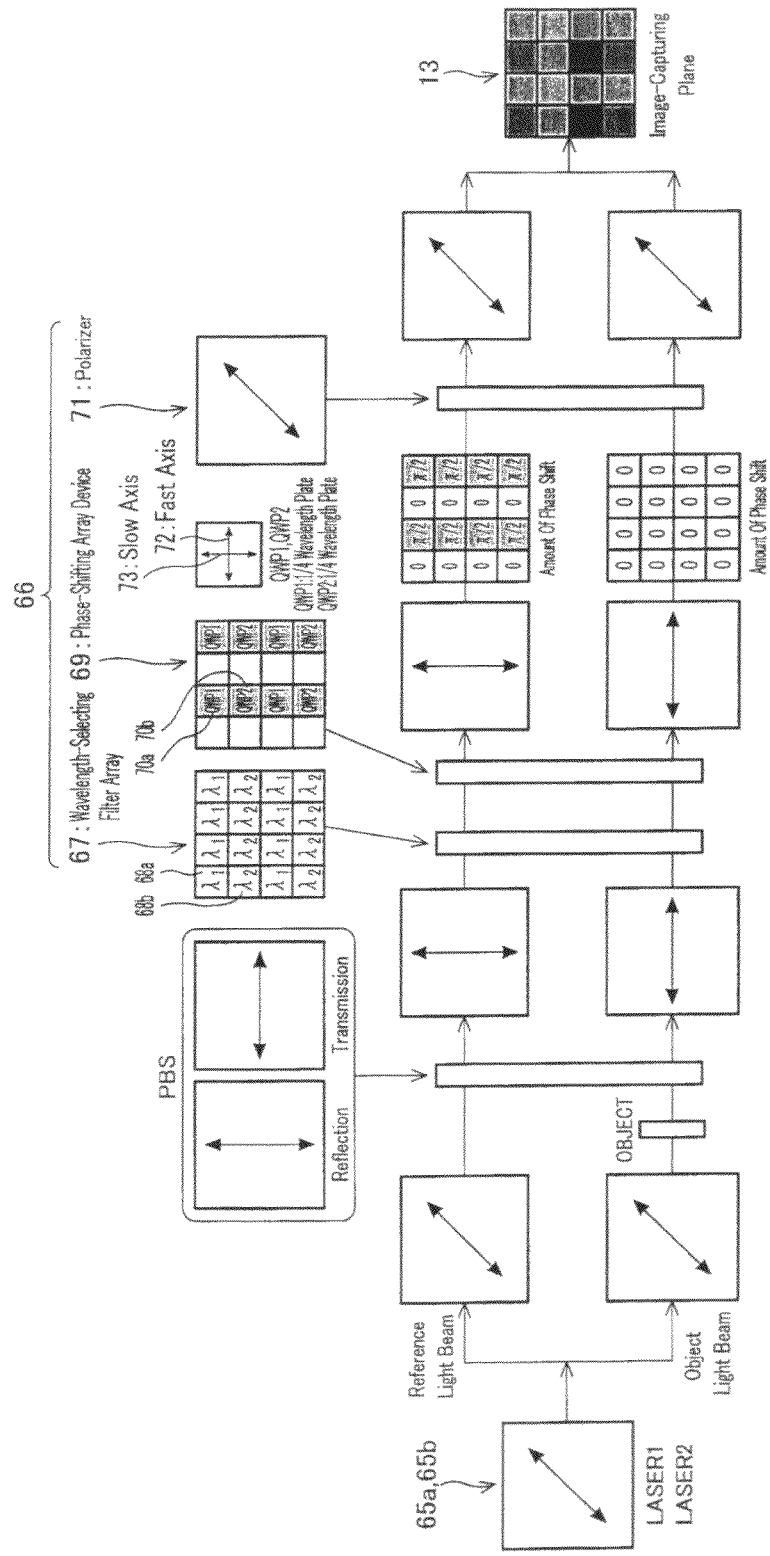
FIG. 42 is an explanatory view showing changes in polarization states in the still other digital holography device.

FIG. 40 is a diagram showing the configuration of a digital holography device 11 according to Sixth Embodiment. FIG. 41 is an explanatory oblique view schematically showing the configurations of a phase-shifting wavelength-selecting element 66 provided in the digital holography device 11. FIG. 42 is an explanatory view showing changes in polarization states in the digital holography device 11. Components that are the same as those described previously are given the same reference numerals, and detailed explanations thereof are omitted here.

FIG. 40 shows an optical system that realizes parallel phase-shifting digital holography using two wavelengths. FIG. 41 shows the structure of a CCD camera 3 which is integral with a phase-shifting array device 69, a wavelength-selecting array device 67, and a polarizer 71. FIG. 42 shows polarization states at given stages.

Light beams reflected from a polarization beam splitter PBS become vertically polarized light beams, whereas light beams passing through the polarization beam splitter PBS become horizontally polarized light beams. Light beams with a wavelength λ1 emitted from a light source 65*a* and light beams with a wavelength λ2 emitted from a light source 65*b* are polarized light beams that are inclined −45 degrees relative to the vertical direction. The light beams emitted from the light source 65*a* are reflected from a first half mirror HM and then enter a second half mirror HM to be split into reference light beams and object light beams. The light beams emitted from the light source 65*b* are reflected from a first mirror M, pass through the first half mirror HM, and then enter the second half mirror HM to be split into reference light beams and object light beams. The reference light beams are collimated, reflected from a second mirror M and the polarization beam splitter PBS to turn into vertically polarized light beams, before entering an integral-type CCD camera 3. The object light beams are collimated, pass through a subject 6, and then pass through the polarization beam splitter PBS, before entering the integral-type CCD camera 3.

The integral-type CCD camera 3 includes a wavelength-selecting filter array, a polarizer array, and an image sensor. The object light beams and reference light beams pass through filters of a wavelength-selecting array device 67 corresponding to their respective wavelengths, and then pass through a phase-shifting array device 69. The object light beams, which are horizontally polarized light beams, pass through the phase-shifting array device 69 without occurrence of phase lag. The reference light beams, which are vertically polarized light beams, pass through pixels arranged on a ¼ wavelength plate 70*a* for λ1 and a ¼ wavelength plate 70*b* for λ2, with a phase lag of π/2. Thereafter, when passing through a polarizer 71, the object light beams and reference light beams interfere with each other. Then, the intensity of the interference is captured by the image sensor (CCD camera 3).

Figure 43:
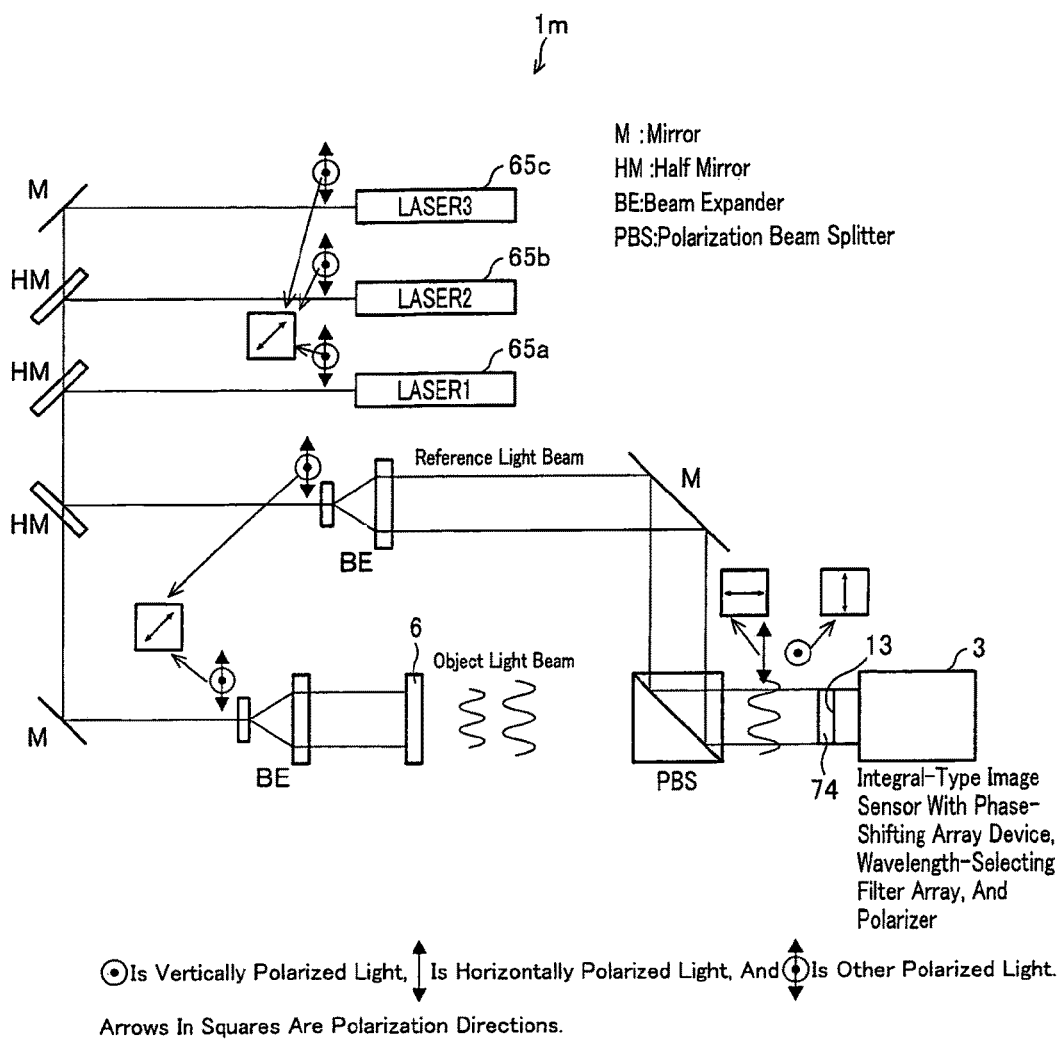
FIG. 43 is a diagram showing the configuration of yet another digital holography device according to Sixth Embodiment.
Figure 44:
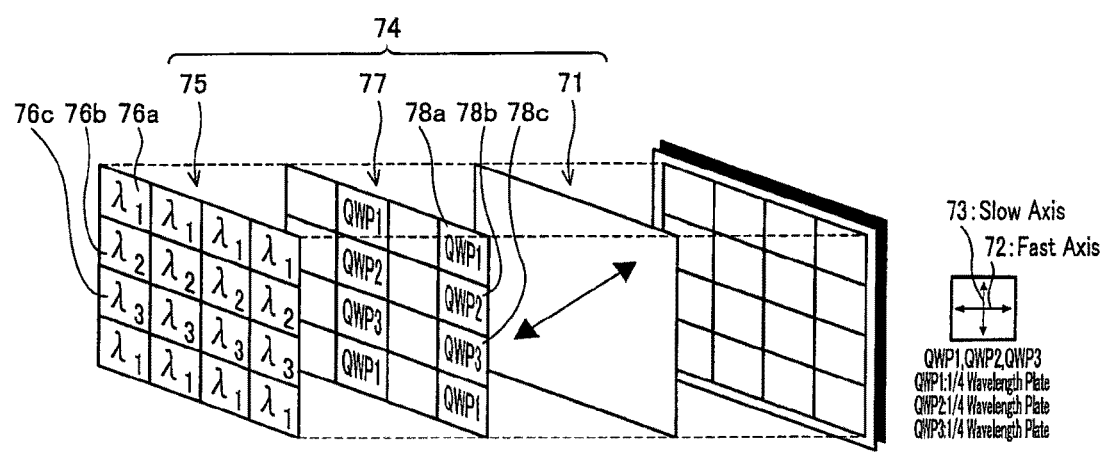
FIG. 44 is an explanatory oblique view schematically showing the configuration of a phase-shifting wavelength-selecting element provided in the yet other digital holography device.
Figure 45:
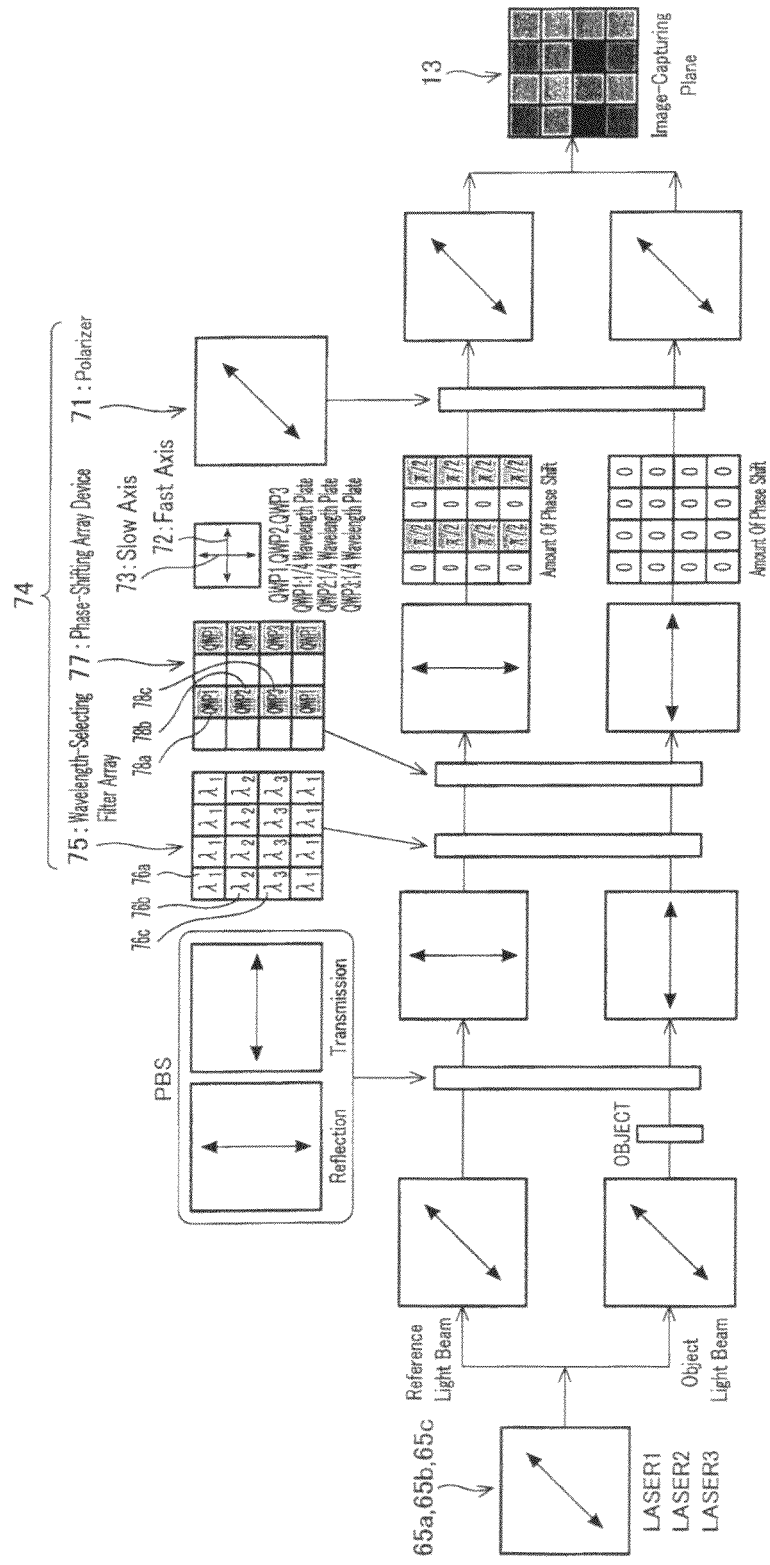
FIG. 45 is an explanatory view showing changes in polarization states in the yet other digital holography device.

FIG. 43 is a diagram showing the configuration of a digital holography device 1*m* according to Sixth Embodiment. FIG. 44 is an explanatory oblique view schematically showing the configuration of a phase-shifting wavelength-selecting element 74 provided in the digital holography device 1*m*. FIG. 45 is an explanatory view showing changes in polarization states in the digital holography device 1*m*.

FIG. 43 shows an optical system that realizes a parallel phase-shifting digital holography using three wavelengths. FIG. 44 shows the structure of an integral-type CCD camera 3 with a phase-shifting array device 77, a wavelength-selecting array device 75, and a polarizer 71. FIG. 45 shows polarization states at given stages. The differences from the optical system using two wavelengths are in that a light source 65*c* (LASER 3) is additionally provided, the wavelength-selecting array device 75 is changed (filters corresponding to a wavelength λ3 are additionally provided thereto), and the phase-shifting array device 77 is changed (¼ wavelength plate QWP3 for λ3 is additionally provided thereto).

Light beams reflected from a polarization beam splitter PBS become vertically polarized light beams, whereas light beams passing through the polarization beam splitter PBS become horizontally polarized light beams. Light beams with a wavelength λ1 emitted from a light source 65*a* (LASER 1), light beams with a wavelength λ2 emitted from a light source 65*b* (LASER 2), and light beams with a wavelength λ3 emitted from the light source 65*c* (LASER 3) are polarized light beams that are inclined −45 degrees relative to the vertical direction. The light beams emitted from the light source 65*a* (LASER 1) are reflected from a first half mirror HM and then enter a second half mirror HM to be split into reference light beams and object light beams. The light beams emitted from the light source 65*b* (LASER 2) are reflected from a third half mirror HM, pass through the first half mirror HM, and then enter the second half mirror HM to be split into reference light beams and object light beams. The light beams emitted from the light source 65*c* (LASER 3) are reflected from a first mirror M, pass through the third half mirror HM, pass through the first half mirror HM, and then enter the second half mirror HM to be split into reference light beams and object light beams. The reference light beams are collimated, reflected from a second mirror M and the polarization beam splitter PBS to turn into vertically polarized light beams, before entering an integral-type CCD camera 3. The object light beams are collimated, pass through a subject, and then pass through the polarization beam splitter PBS to turn into horizontally polarized light beams, before entering the integral-type CCD camera 3.

Onto the integral-type CCD camera 3 are affixed the wavelength-selecting array device 75, the polarizer 71, and the phase-shifting array device 77. The object light beams and reference light beams pass through filters of the wavelength-selecting array device 75 corresponding to their respective wavelengths, and then pass through a phase-shifting array device 77. The object light beams, which are horizontally polarized light beams, pass through the phase-shifting array device 77 without occurrence of phase lag. The reference light beams, which are vertically polarized light beams, pass through pixels arranged on a ¼ wavelength plate for λ1, a ¼ wavelength plate for λ2, and a ¼ wavelength plate for λ3, with a phase lag of π/2. Thereafter, when passing through the polarizer 71, the object light beams and reference light beams interfere with each other. Then, the intensity of the interference is captured by the image sensor CCD camera 3).

Note that the present embodiment is applicable to spectral measurement. The concurrent use of a plurality of wavelengths enables instantaneous measurement of three-dimensional structure and spectral image, and measurement of three-dimensional moving image and spectral image. The wavelengths used are selected as appropriate.

For example, the concurrent use of three wavelengths λ1, λ2, and λ3 enables concurrent measurements of (i) three-dimensional forms of a subject with respect to the respective wavelengths λ1, λ2, and λ3 and (ii) reflectance or absorption coefficient distributions at the respective wavelengths. It is possible to use undulations of various kinds of light beams including x-rays, gamma rays, ultraviolet rays, visible light, infrared rays, terahertz rays, microwaves, millimeter waves, and radio waves. This approach enables instantaneous measurements of three-dimensional structure of a subject and functional distribution.

Seventh Embodiment

In Seventh Embodiment, the following will describe a digital holography device that includes a wavelength plate array device 80 and a polarizer 83.

Figure 46:
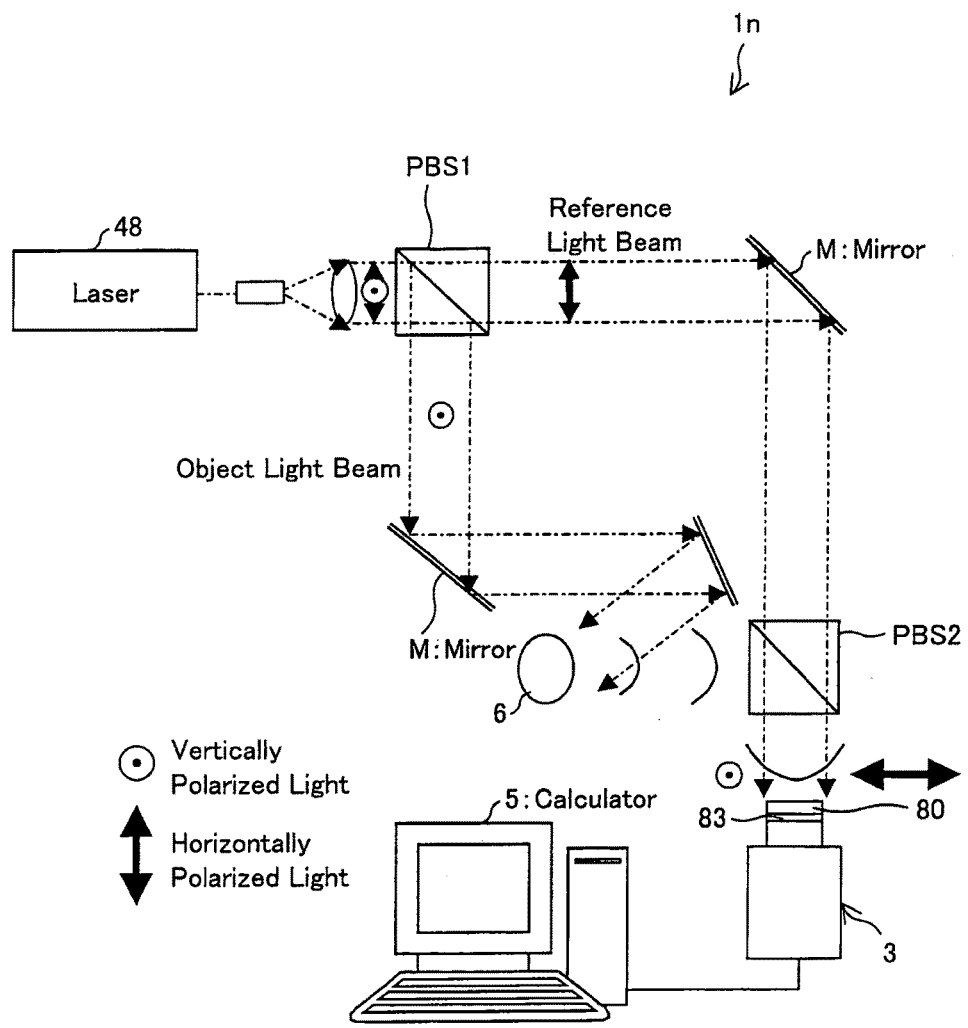
FIG. 46 is a diagram showing the configuration of a digital holography device according to Seventh Embodiment.

FIG. 46 is a diagram showing the configuration of a digital holography device 1n according to Seventh Embodiment. Components that are the same as those described previously are given the same reference numerals, and detailed explanations thereof are omitted here. The digital holography device 1n includes a light source unit 48. The light source unit 48 projects laser light beams having vertically polarized light components and horizontally polarized light components through a lens toward a polarization beam splitter PBS1. The vertically polarized light components are reflected from the polarization beam splitter PBS1 and then reflected from a first mirror M and a second mirror M, before illuminating a subject 6. Then, the vertically polarized light components are reflected from the subject 6 to turn into object light beams (scattered light beams). The object light beams are reflected from a polarization beam splitter PBS2 to enter a CCD camera 3 in vertical polarization. The horizontally polarized light components pass through the polarization beam splitter PBS1, are reflected from a third mirror M to turn into reference light beams. The reference light beams passes through a polarization beam splitter PBS2 to enter the CCD camera 3 in horizontal polarization.

Figure 47:
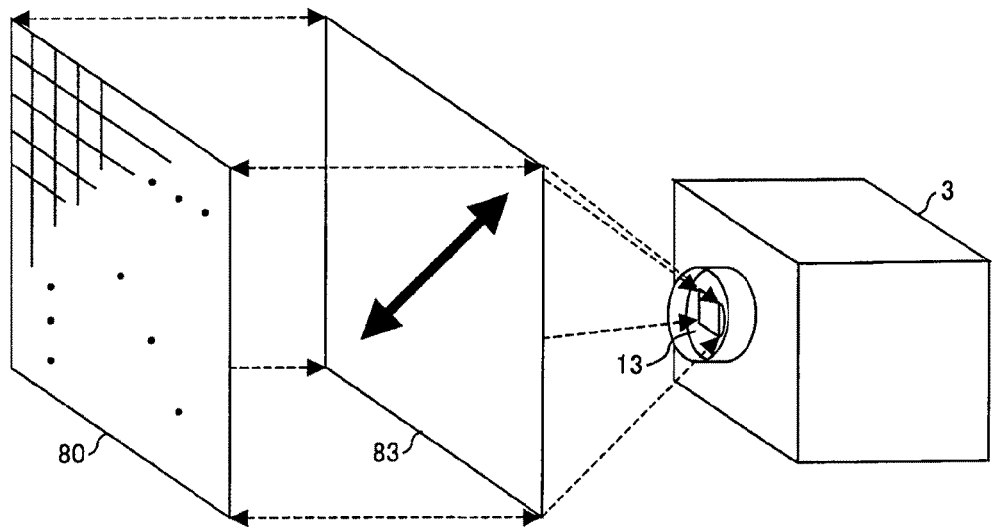
FIG. 47 is a diagram showing the configurations of a wavelength plate array device, a polarizer, and a CCD camera all of which are provided in the digital holography device.

FIG. 47 is a diagram showing the configurations of a wavelength plate array device 80, a polarizer 83, and a CCD camera 3 all of which are provided in the digital holography device 1n. Onto an image-capturing plane 13 of the CCD camera 3, the polarizer 83 and the wavelength plate array device 80 are affixed in this order.

Figure 48:
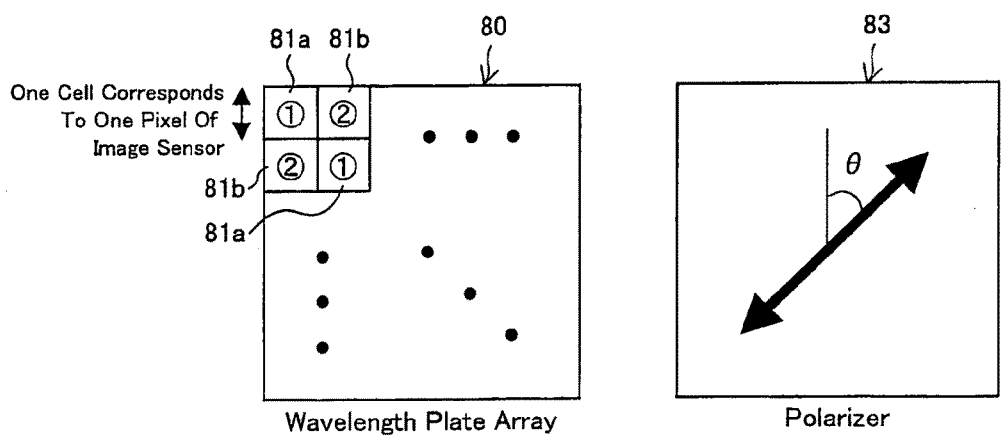
FIG. 48 is a diagram showing the configurations of the wavelength plate array device and the polarizer.
Figure 48:
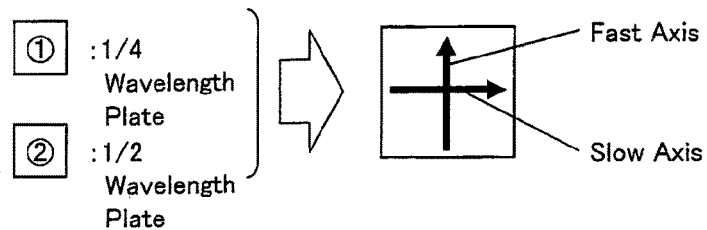

FIG. 48 is a diagram showing the configurations of the wavelength plate array device 80 and the polarizer 83. The wavelength plate array device 80 has ¼ wavelength plates 81a and ½ wavelength plates 81b arranged alternately in a checkerboard pattern. Each of the wavelength plates is set to have such a dimension that corresponds to one pixel of an image sensor. A direction of a fast axis of the ¼ wavelength plate 81a is the same as a direction of a fast axis of the ½ wavelength plate 81b, and a direction of a slow axis of the ¼ wavelength plate 81a is the same as a direction of a slow axis of the ½ wavelength plate 81b. In an example shown in FIG. 48, the fast axis is directed in the vertical direction, and the slow axis is directed in the horizontal direction. The polarization direction of the polarizer 83 is inclined at an angle θ relative to the vertical direction. The angle θ may take any values other than 0, 90, 180, and 270 degrees.

On the image-capturing plane of the CCD camera 3, a first interference fringe pattern and a second interference fringe pattern are recorded. The first interference fringe pattern is formed by the interferences between the object light beams and the reference light beams both of which have passed through the ¼ wavelength plates 81a. The second interference fringe pattern is formed by the interferences between the object light beams and the reference light beams both of which have passed through the ½ wavelength plates 81b.

Figure 49:
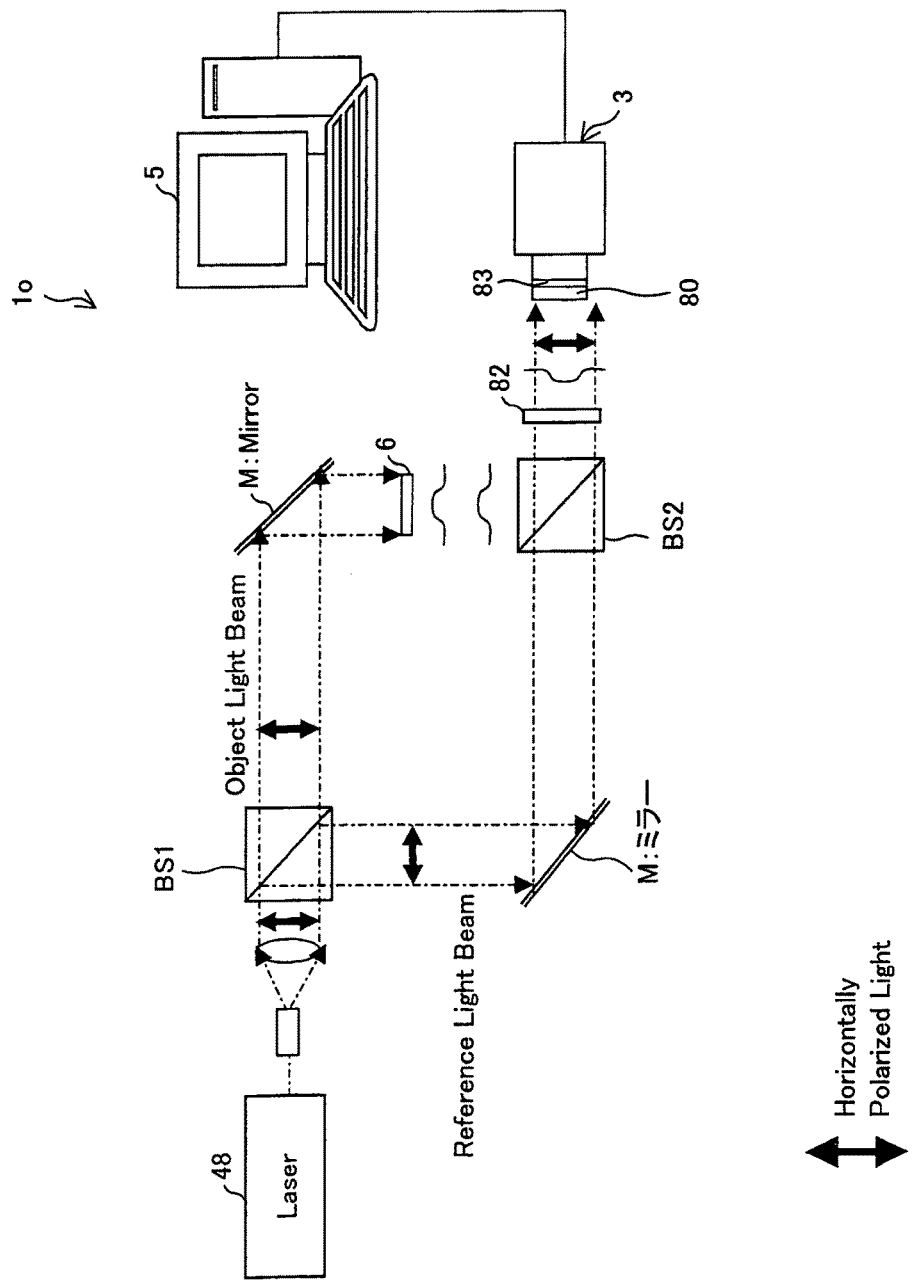
FIG. 49 is a diagram showing the configuration of another digital holography device according to Seventh Embodiment.

FIG. 49 is a diagram showing the configuration of a digital holography device 1o according to Seventh Embodiment. Components that are the same as those described previously are given the same reference numerals, and detailed explanations thereof are omitted here. The digital holography device 1o is an example of realization of an optical system using a measurement algorithm of such digital holography that two interference fringe pattern images obtained at two different distances from a subject are recorded by single exposure. The digital holography device to includes a light source unit 48. The light source unit 48 projects laser light beams having horizontally polarized light components through a lens toward a beam splitter BS1.

The laser light beams having passed through the beam splitter BS1 are reflected from a first mirror M, pass through a subject 6 to turn into object light beams (scattered light beams). The object light beams are reflected from a beam splitter BS2.

The laser light beams having been reflected from the beam splitter BS1 are reflected from a second mirror M, and pass through the beam splitter BS2 as reference light beams.

Interference light beams, which are produced by interferences between the object light beams and the reference light beams, pass through the polarizing plate 82. The polarizing plate 82 is set so as to transmit horizontally polarized light beams only. The interference light beams pass through the wavelength plate array device 80 and the polarizer 83 and then reach the CCD camera 3. By passage through the wavelength plate array device 80 and the polarizer 83, it is possible to concurrently record two kinds of holograms.

According to the arrangements in Seventh Embodiment, it is possible to provide a camera that can be used for measurement algorisms of both the parallel phase-shifting digital holography and such digital holography that two interference fringe pattern images obtained at two different distances from a subject are recorded by single exposure. This makes it possible to carry out measurements with a more suitable system that accommodates to a target object for measurement.

Further, it is possible to obtain a compact digital holography device that effectively utilizes optical energy, and such a digital holography device can be put to a wide variety of uses such as a microscope.

Eighth Embodiment

Figure 50:
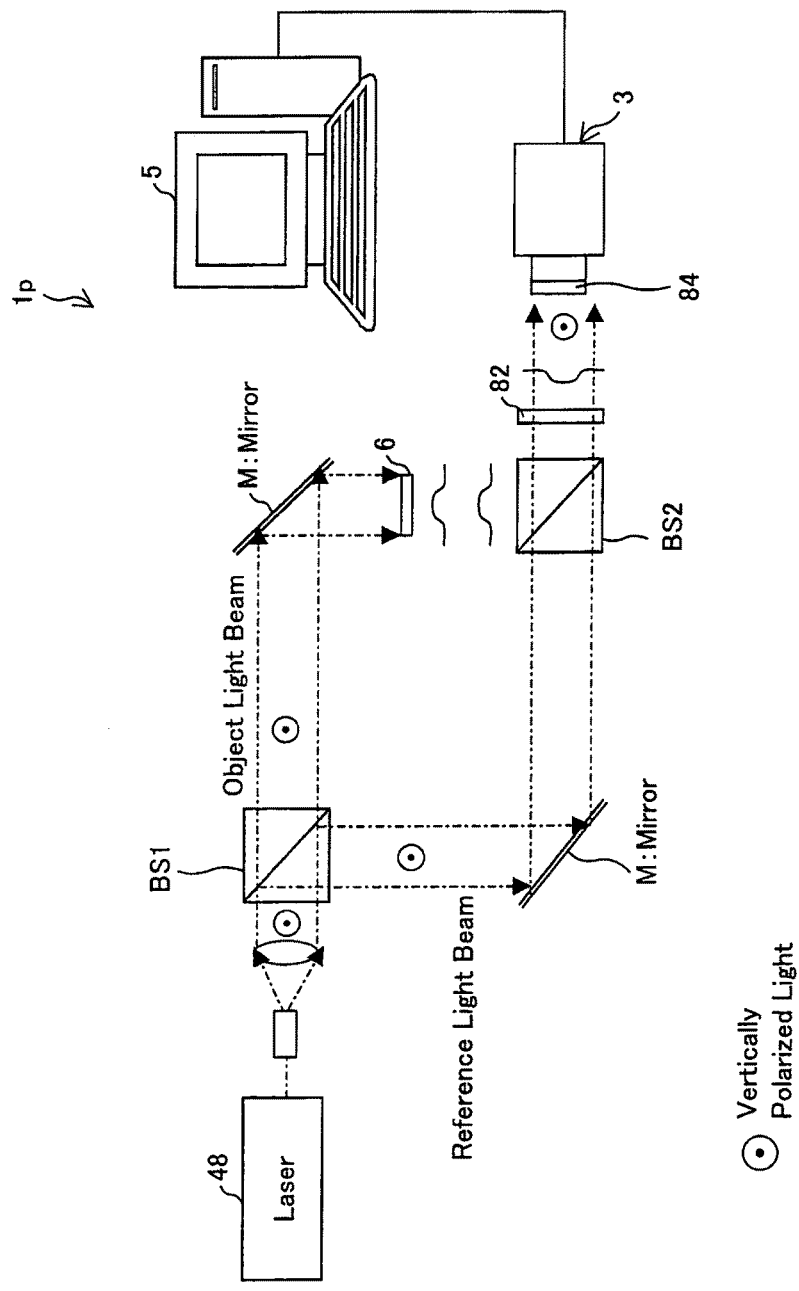
FIG. 50 is a diagram showing the configuration of a digital holography device according to Eighth Embodiment.

FIG. 50 is a diagram showing the configuration of a digital holography device 1p according to Eighth Embodiment. Components that are the same as those described previously are given the same reference numerals, and detailed explanations thereof are omitted here. The digital holography device 1p is an example of realization of an optical system using a measurement algorithm of such digital holography that two interference fringe pattern images obtained at two different distances from a subject are recorded by single exposure. The digital holography device 1p includes a light source unit 48. The light source unit 48 projects laser light beams having vertically polarized light components through a lens toward a beam splitter BS1.

The laser light beams having passed through the beam splitter BS1 are reflected from a first mirror M, pass through a subject 6 to turn into object light beams (scattered light beam). The object light beams are reflected from a beam splitter BS2.

The laser light beams having been reflected from the beam splitter BS1 are reflected from a second mirror M, and pass through the beam splitter BS2 as reference light beams.

An interference light beam, which is produced by interference between the object light beam and the reference light beam, passes through a polarizing plate 82. The polarizing plate 82 is set so as to transmit vertically polarized light beams only. The interference light beam passes through a ¼ wavelength plate array 84 and then reaches a CCD camera 3. By passage through the ¼ wavelength plate array 84, it is possible to concurrently record two kinds of holograms.

Figure 51:
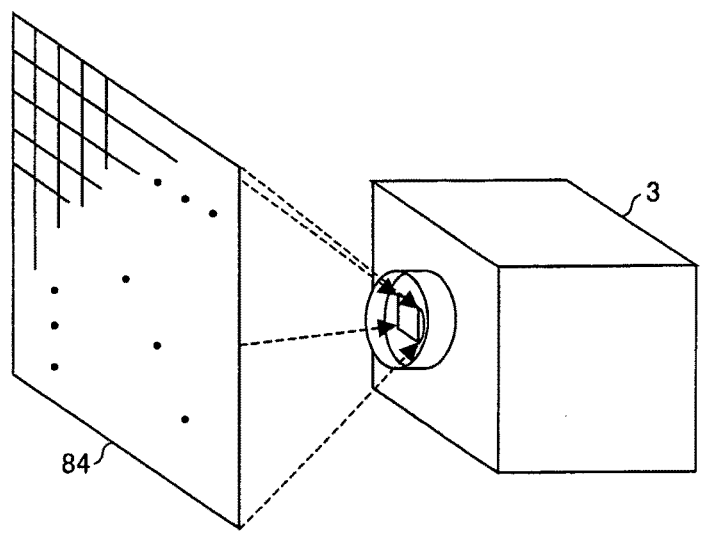
FIG. 51 is a diagram showing the configurations of a ¼ wavelength plate array and a CCD camera both of which are provided in the digital holography device.

FIG. 51 is a diagram showing the configurations of the ¼ wavelength plate array 84 and the CCD camera 3 both of which are provided in the digital holography device 1p. Onto the image-capturing plane of the CCD camera 3 is affixed the ¼ wavelength plate array 84.

Figure 52:
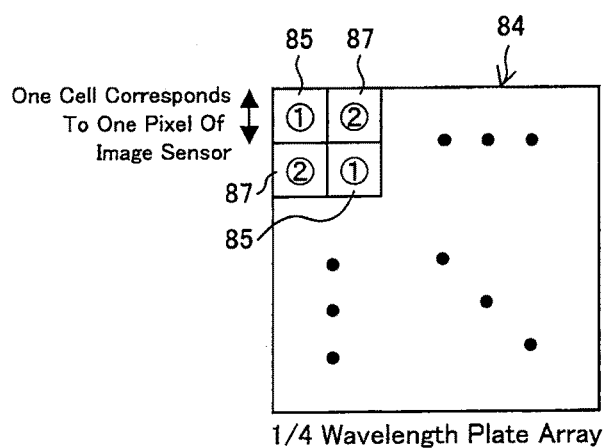
FIG. 52 is a diagram showing the configuration of the ¼ wavelength plate array.
Figure 52:
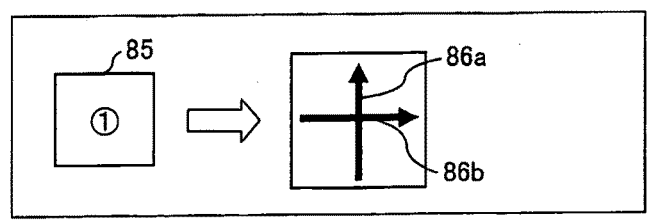
Figure 52:
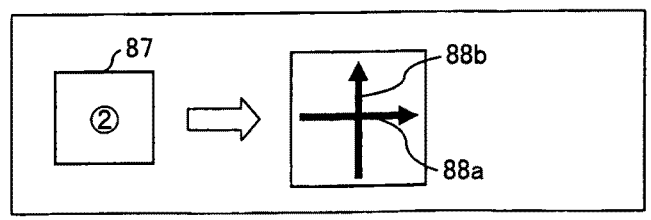

FIG. 52 is a diagram showing the configuration of the ¼ wavelength plate array 84. The ¼ wavelength plate array 84 has first wavelength plate elements 85 and second wavelength plate elements 87 both arranged alternately. Each of the first wavelength plate elements 85 has a first fast axis 86a and a first slow axis 86b that are orthogonal to each other. Each of the second wavelength plate elements 87 has a second slow axis 88b, which is parallel to the first fast axis 86a, and a second fast axis 88a, which is parallel to the first slow axis 86b. Thus, the ¼ wavelength plate array 84 is such that the fast axis and the slow axis in adjacent pixels are orthogonal to each other. The first wavelength plate elements 85 and the second wavelength plate elements 87 can be realized by the same wavelength plates arranged in such a manner that their respective orientations are changed by 90 degrees to each other. The first wavelength plate element 85 can be set to have such a dimension that corresponds to one pixel of an image sensor.

As used herein, the fast axis refers to an axis of a wavelength plate which axis transmits incident light without a phase lag. The slow axis refers to an axis, which is orthogonal to the fast axis, transmitting incident light with a phase lag. Taking a ¼ wavelength plate as a specific example, a phase of a light beam having passed through the slow axis lags π/2 radians (90 degrees) behind the phase of a light beam having passed through the fast axis.

On the image-capturing plane of the CCD camera 3 are recorded a first interference fringe pattern formed by interferences between the object light beams and the reference light beams both of which have passed through the first wavelength plate elements 85 and a second interference fringe pattern formed by interferences between the object light beams and the reference light beams both of which have passed through the second wavelength plate elements 87.

The array device used in Eighth Embodiment is easier to manufacture. This allows the array device to be manufactured with higher precision, and a higher degree of measurement accuracy can be therefore expected.

The embodiment shown in FIG. 50 can also be implemented with the use of such a device that the polarizing plate 82 is set to transmit horizontally polarized light beams only, and laser light beams having horizontally polarized light components are further used, without changes in the other arrangements.

Eighth Embodiment illustrates an example of the use of laser light beams having vertically polarized light components. However, this is not the only possibility of the present invention. Laser light beams having horizontal polarization can be alternatively used to realize the present invention.

Ninth Embodiment

Figure 53:
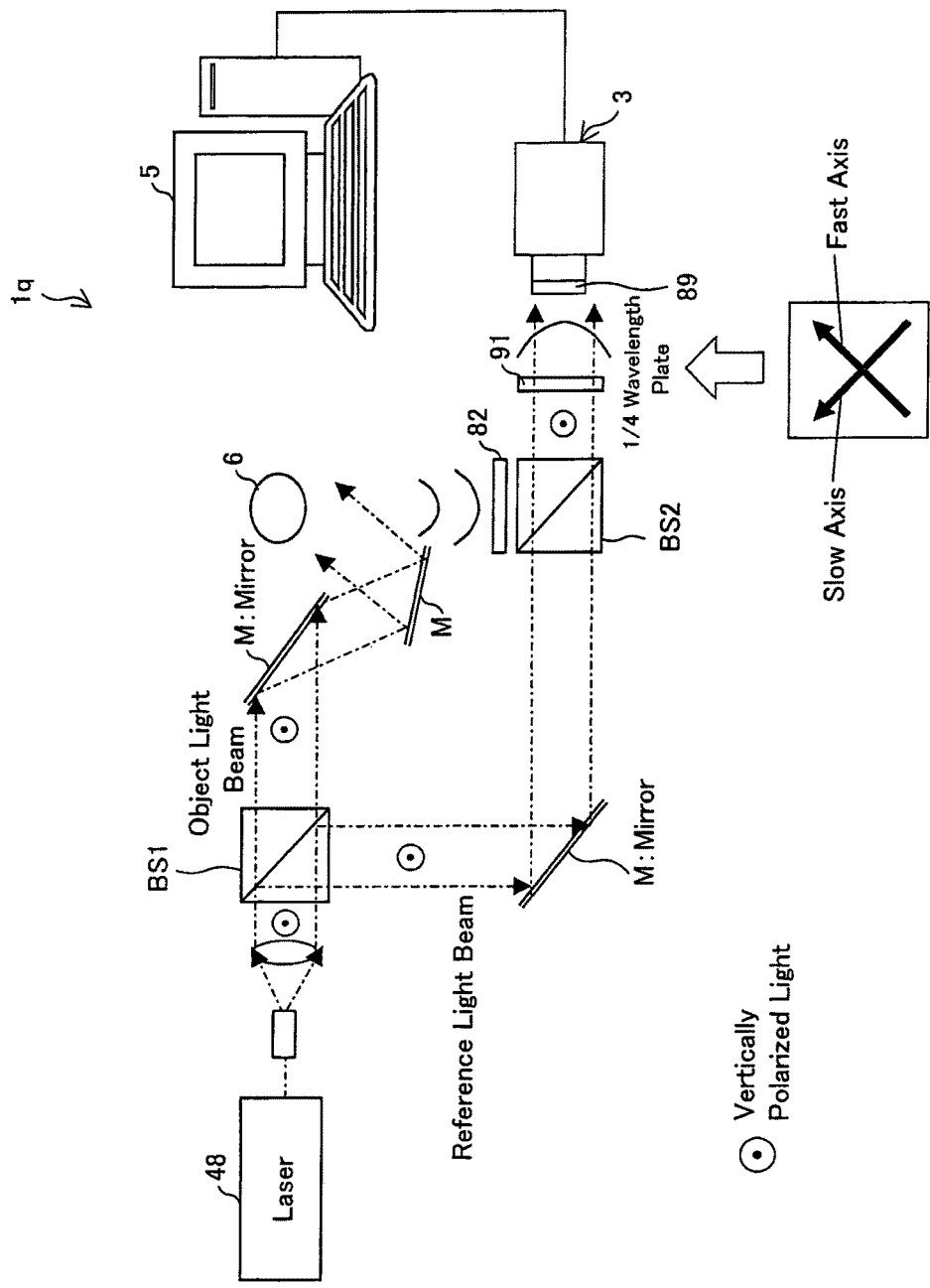
FIG. 53 is a diagram showing the configuration of a digital holography device according to Ninth Embodiment.

FIG. 53 is a diagram showing the configuration of a digital holography device 1q according to Ninth Embodiment. Components that are the same as those described previously are given the same reference numerals, and detailed explanations thereof are omitted here. The digital holography device 1q includes a light source unit 48. The light source unit 48 projects laser light beams having vertically polarized light components through a lens toward a beam splitter BS1. The laser light beams having passed through the beam splitter BS1 are reflected from two mirrors, first and second mirrors M. The reflected light beams illuminate a subject 6 and are reflected from the subject 6 to turn into object light beams (scattered light beams). The scattered light beams pass through a polarizing plate 82 to turn into vertically polarized light beams. Thereafter, the vertically polarized light beams are reflected from a beam splitter BS2. Meanwhile, the light beams having been reflected from the beam splitter BS1 are reflected as reference light beams by a third mirror M. Then, the reference light beams pass through the beam splitter BS2 as they are. Thereafter, interference light beams formed by the object light beams and the reference light beams pass through a ¼ wavelength plate 91. Directions of fast and slow axes of the ¼ wavelength plate 91 are set so as to be equal to a direction in which the polarizer array device 89 transmits polarized light beams. The interference light beams pass through the polarizer array device 89 and reach a CCD camera 3. With the use of the ¼ wavelength plate 91 and the polarizer array device 89, it is possible to concurrently record two kinds of holograms.

Figure 54:
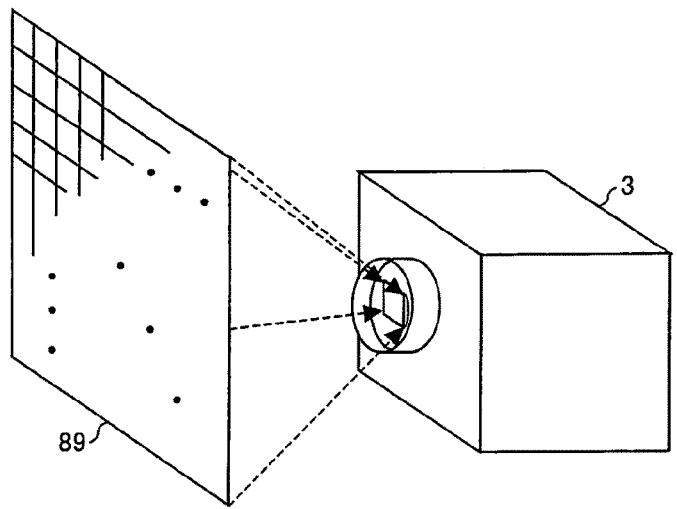
FIG. 54 is a diagram showing the configurations of a polarizer array device and a CCD camera both of which are provided in the digital holography device.

FIG. 54 is a diagram showing the configurations of the polarizer array device 89 and CCD camera 3 both of which are provided in the digital holography device 1q. FIG. 55 is a diagram showing the configuration of the polarizer array device 89.

Onto an image-capturing plane of the CCD camera 3 is affixed the polarizer array device 89. The polarizer array device 89 has first polarizers 90a and second polarizers 90b, both of which are arranged alternately. Each of the first polarizers 90a has a first polarization direction, and each of the second polarizers 90b has a second polarization direction that is orthogonal to the first polarization direction. In the example shown in FIG. 55, the first polarization direction of the first polarizer 90a is inclined 45 degrees relative to the vertical direction, and the second polarization direction of the second polarizer 90b is inclined −45 degrees relative to the vertical direction. Thus, the polarizer array device 89 is such that transmitting polarized light beams in adjacent pixels are orthogonal to each other. The first polarizer 90a is set to have such a dimension that corresponds to one pixel of an image sensor. The same goes for the dimension of the second polarizer 90b.

On the image-capturing plane of the CCD camera 3 are recorded a first interference fringe pattern formed by interferences between the object light beams and the reference light beams both of which have passed through the first polarizers 90a and a second interference fringe pattern formed by interferences between the object light beams and the reference light beams both of which have passed through the second polarizers 90b.

According to Ninth Embodiment, the polarizer array device 89 is singly used. This eliminates the need for alignment, unlike the arrangement of Seventh Embodiment where the wavelength plate array device 80 and the polarizer 83 are used in combination. Further, it is possible to provide a camera that can be used for measurement algorisms of both the parallel phase-shifting digital holography and such digital holography that two interference fringe pattern images obtained at two different distances from a subject are recorded by single exposure. This makes it possible to carry out measurements with a more suitable system that accommodates to a target object for measurement.

The present invention is not limited to the aforementioned embodiments and is susceptible of various changes within the scope of the accompanying claims. Also, an embodiment obtained by suitable combinations of technical means disclosed in the different embodiments are also included within the technical scope of the present invention.

The embodiment shown in FIG. 53 can also be implemented with the use of such a device that the polarizing plate 82 is set to transmit horizontally polarized light beams only, and laser light beams having horizontally polarized light components are used, without changes in the other arrangements.

Ninth Embodiment illustrates an example of the use of laser light beams having vertically polarized light components. However, this is not the only possibility of the present invention. Laser light beams having horizontal polarization can be alternatively used to realize the present invention.

INDUSTRIAL APPLICABILITY

The present invention is applicable to a digital holography device that generates a reconstructed image of a subject according to interference fringes formed by interferences between object light beams and reference light beams.

The invention claimed is:

1. A digital holography device comprising:
a light source to emit light, the light source being provided for supply of an object light beam formed by at least one of radiation, transmission, scattering, reflection, and diffraction from a subject according to the emitted light;
a phase-shifting element to split the light emitted from the light source into two kinds of reference light beams having different phases in a plane perpendicular to a direction in which the light emitted from the light source travels;
image-capturing device including an image-capturing plane on which two kinds of interference fringe patterns are recorded, the interference fringe patterns being formed by interferences between the two kinds of reference light beams and the object light beam; and
an image reconstruction device to generate a reconstructed image of the subject according to the two kinds of interference fringe patterns recorded on the image-capturing plane and intensity distribution of the reference light beams, wherein
intensities of the reference light beams are higher than an intensity of the object light beam.

2. The digital holography device according to claim 1, wherein
the phase-shifting element is an array device that has two kinds of regions arranged in a checkerboard pattern in the plane perpendicular to the direction in which the light emitted from the light source travels.

3. The digital holography device according to claim 2, wherein
the image-capturing device is a CCD camera or a CMOS image sensor camera, and
the two kinds of regions are arranged to respectively correspond to pixels of the image-capturing device.

4. The digital holography device according to claim 1, wherein
the phase-shifting element is configured to split the light into a first reference light beam having a phase that serves as a reference phase and a second reference light beam that is out of phase with the first reference light beam in an amount of more than 0 and less than or equal to π radians.

5. The digital holography device according to claim 1, wherein
the light source is configured to emit light polarized in a first direction,
one of the two kinds of reference light beams is polarized in a second direction, and the other reference light beam is polarized in a third direction,
the digital holography device further comprises a polarizer array device to transmit the object light beam and the two kinds of reference light beams, and
the polarizer array device includes,
first regions to each transmit the one reference light beam polarized in the second direction and a component of the object light beam which is orthogonally projected in the second direction, and
second regions to each transmit the other reference light beam polarized in the third direction and a component of the object light beam which is orthogonally projected in the third direction.

6. The digital holography device according to claim 5, wherein
the polarizer array device is integral with the image-capturing device.

7. The digital holography device according to claim 5, wherein
the phase-shifting element is a ¼ wavelength plate.

8. A digital holography device comprising:
a light source to emit light, the light source being provided for supply of an object light beam formed by at least one of radiation, transmission, scattering, reflection, and diffraction from a subject according to the emitted light;

a phase-shifting element to split the light emitted from the light source into two kinds of reference light beams having different phases in a plane perpendicular to a direction in which the light emitted from the light source travels;

image-capturing device including an image-capturing plane on which two kinds of interference fringe patterns are recorded, the interference fringe patterns being formed by interferences between the two kinds of reference light beams and the object light beam; and an image reconstruction device to generate a reconstructed image of the subject according to the two kinds of interference fringe patterns recorded on the image-capturing plane, wherein the light source is configured to emit linearly polarized light having first-direction polarized components and second-direction polarized components, the digital holography device further includes a polarization beam splitter to convert the object light beam into light beams having the first-direction polarized components, and to convert the light emitted from the light source into light beams having the second-direction polarized components, and the phase-shifting element includes, a wavelength-plate optical-medium array device to split the light beams having the second-direction polarized components into two kinds of reference light beams having different phases in a plane perpendicular to a direction in which the light beams having the second-direction polarized components travel, and a polarizer to transmit third-direction polarized light components of the object light beam and third-direction polarized light components of the two kinds of reference light beams.

9. The digital holography device according to claim 8, wherein the phase-shifting element is integral with the image-capturing device.

10. The digital holography device according to claim 8, wherein the wavelength-plate optical-medium array device includes, optical media to transmit the light beams having the second-direction polarized components, and $\frac{1}{4}$ wavelength plates to shift phases of the light beams having the second-direction polarized components and transmit the light beams thus phase-shifted.

* * * * *